US012791768B2

(12) United States Patent
Su et al.

(10) Patent No.: US 12,791,768 B2
(45) Date of Patent: Nov. 10, 2026

(54) IMAGING LENS ASSEMBLY, CAMERA MODULE AND ELECTRONIC DEVICE

(71) Applicant: LARGAN PRECISION CO., LTD., Taichung City (TW)

(72) Inventors: Heng-Yi Su, Taichung City (TW); Ming-Ta Chou, Taichung City (TW); Cheng-Feng Lin, Taichung City (TW)

(73) Assignee: LARGAN PRECISION CO., LTD., Taichung City (TW)

( * ) Notice: Subject to any disclaimer, the term of this patent is extended or adjusted under 35 U.S.C. 154(b) by 279 days.

(21) Appl. No.: 18/604,592

(22) Filed: Mar. 14, 2024

(65) Prior Publication Data

US 2024/0310607 A1 Sep. 19, 2024

Related U.S. Application Data

(60) Provisional application No. 63/490,016, filed on Mar. 14, 2023.

(51) Int. Cl.
*G02B 5/00* (2006.01)
*G02B 13/00* (2006.01)

(52) U.S. Cl.
CPC ............. *G02B 5/005* (2013.01); *G02B 5/003* (2013.01); *G02B 13/0045* (2013.01)

(58) Field of Classification Search
None
See application file for complete search history.

(56) References Cited

U.S. PATENT DOCUMENTS

| | | | | |
|---|---|---|---|---|
| 10,436,954 | B2 | 10/2019 | Shih | |
| 10,473,879 | B2 | 11/2019 | Choi | |
| 10,545,334 | B2 | 1/2020 | Yatsu | |
| 10,834,300 | B2 | 11/2020 | Yang | |
| 10,996,420 | B2 | 5/2021 | Yang | |
| 10,996,421 | B2 | 5/2021 | Yang | |
| 11,169,352 | B2 * | 11/2021 | Tsai | G02B 7/02 |
| 11,327,270 | B2 | 5/2022 | Yang | |
| 11,460,692 | B2 | 10/2022 | Yang | |
| 12,164,170 | B2 * | 12/2024 | Yang | G02B 5/005 |
| 12,429,635 | B2 * | 9/2025 | Yang | G02B 7/02 |
| 2018/0003916 | A1 | 1/2018 | Lin | |
| 2019/0018171 | A1 * | 1/2019 | Chang | G02B 5/0284 |

(Continued)

*Primary Examiner* — Darryl J Collins
(74) *Attorney, Agent, or Firm* — McClure, Qualey & Rodack, LLP

(57) ABSTRACT

An imaging lens assembly has an optical axis, and includes a plurality of optical elements. The optical axis passes through the optical elements, and the optical elements include a radial reduction lens element and a radial reduction light blocking element. The radial reduction lens element includes an optical effective portion and a peripheral portion. The peripheral portion is disposed around the optical effective portion along a circumferential direction of the optical axis. The radial reduction light blocking element includes a central opening and a radial reduction part. The optical axis passes through the central opening. The radial reduction part is reduced towards the optical axis along a direction vertical to the optical axis, so that the central opening is non-circular. The radial reduction part includes a plurality of light blocking structures. The light blocking structures are arranged along the direction vertical to the optical axis.

25 Claims, 67 Drawing Sheets

(56) References Cited

U.S. PATENT DOCUMENTS

| | | | | |
|---|---|---|---|---|
| 2019/0324172 | A1* | 10/2019 | Chou | G02B 1/111 |
| 2021/0247592 | A1 | 8/2021 | Yoo | |
| 2021/0364725 | A1 | 11/2021 | Chang | |
| 2022/0043325 | A1* | 2/2022 | Huang | G02B 27/0018 |
| 2022/0082735 | A1 | 3/2022 | Yang | |
| 2022/0350108 | A1 | 11/2022 | Shin | |
| 2022/0350115 | A1 | 11/2022 | Yoo | |
| 2022/0365321 | A1* | 11/2022 | Su | G02B 13/0015 |
| 2023/0221620 | A1* | 7/2023 | Liang | G03B 11/04 359/601 |
| 2023/0247273 | A1* | 8/2023 | Tung | G02B 5/005 396/439 |

* cited by examiner

121

121

121

20

225

225

423

424

424

50

9D

IMAGING LENS ASSEMBLY, CAMERA MODULE AND ELECTRONIC DEVICE

RELATED APPLICATIONS

This application claims priority to U.S. Provisional Application Ser. No. 63/490,016, filed Mar. 14, 2023, which is herein incorporated by reference.

BACKGROUND

Technical Field

The present disclosure relates to an imaging lens assembly and a camera module. More particularly, the present disclosure relates to an imaging lens assembly and a camera module applicable to portable electronic devices.

Description of Related Art

In recent years, portable electronic devices have developed rapidly. For example, intelligent electronic devices and tablets have been filled in the lives of modern people, and camera modules and imaging lens assemblies mounted on portable electronic devices have also prospered. However, as technology advances, the quality requirements of the imaging lens assembly are becoming higher and higher. Therefore, an imaging lens assembly, which can control the dimension of the light through hole, needs to be developed.

SUMMARY

According to one aspect of the present disclosure, an imaging lens assembly has an optical axis, and includes a plurality of optical elements. The optical axis passes through the optical elements, and the optical elements include a radial reduction lens element and a radial reduction light blocking element. An appearance of the radial reduction lens element is non-circular observed along a direction parallel to the optical axis. The radial reduction lens element includes an optical effective portion and a peripheral portion. The optical axis passes through the optical effective portion. The peripheral portion extends from the optical effective portion towards a direction away from the optical axis, and is disposed around the optical effective portion along a circumferential direction of the optical axis. An appearance of the radial reduction light blocking element is non-circular observed along the direction parallel to the optical axis. The radial reduction light blocking element includes a central opening and a radial reduction part. The optical axis passes through the central opening. The radial reduction part is reducing from a surface of the radial reduction light blocking element towards the optical axis along a direction vertical to the optical axis, so that the central opening is non-circular. The radial reduction part includes a plurality of light blocking structures. The light blocking structures are arranged along the direction vertical to the optical axis, and each of the light blocking structures extends toward a direction close to the optical axis. A number of the light blocking structures is Nr, and the following condition is satisfied: $50<Nr<250$.

According to another aspect of the present disclosure, a camera module includes the imaging lens assembly of the aforementioned aspect and an image sensor. The image sensor is disposed on an image surface of the imaging lens assembly.

According to another aspect of the present disclosure, an electronic device includes the camera module of the aforementioned aspect.

According to another aspect of the present disclosure, an imaging lens assembly, has an optical axis, and includes a plurality of optical elements. The optical axis passes through the optical elements, and the optical elements include a first radial reduction lens element, a first radial reduction light blocking element and a second radial reduction light blocking element. An appearance of the first radial reduction lens element is non-circular observed along a direction parallel to the optical axis. The first radial reduction lens element includes a first optical effective portion and a first peripheral portion. The optical axis passes through the first optical effective portion. The first peripheral portion extends from the first optical effective portion towards a direction away from the optical axis, and is disposed around the first optical effective portion along a circumferential direction of the optical axis. The first peripheral portion includes a first diameter contact surface. The first diameter contact surface is disposed around the first peripheral portion. An appearance of the first radial reduction light blocking element is non-circular observed along the direction parallel to the optical axis. The first radial reduction light blocking element includes a first central opening and a first radial reduction part. The optical axis passes through the first central opening. The first radial reduction part is reducing from a surface of the first radial reduction light blocking element towards the optical axis along a direction vertical to the optical axis, so that the first central opening is non-circular. The first radial reduction part includes a plurality of first light blocking structures. The first light blocking structures are arranged along the direction vertical to the optical axis, and each of the first light blocking structures extends toward a direction close to the optical axis. The second radial reduction light blocking element is configured to load the first radial reduction lens element, and the second radial reduction light blocking element includes a second central opening, a second radial reduction part and a first receiving side wall surface. The optical axis passes through the second central opening. The second radial reduction part is reducing from a surface of the second radial reduction light blocking element towards the optical axis along the direction vertical to the optical axis, so that the second central opening is non-circular. The second radial reduction part includes a plurality of second light blocking structures. The second light blocking structures are arranged along the direction vertical to the optical axis, and each of the second light blocking structures extends toward the direction close to the optical axis. The first receiving side wall surface is directly contacted with the first diameter contact surface of the first radial reduction lens element. A number of the first light blocking structures is Nr1, a number of the second light blocking structures is Nr2, and the following conditions are satisfied: $10<Nr1<250$; and $10<Nr2<250$.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1A:
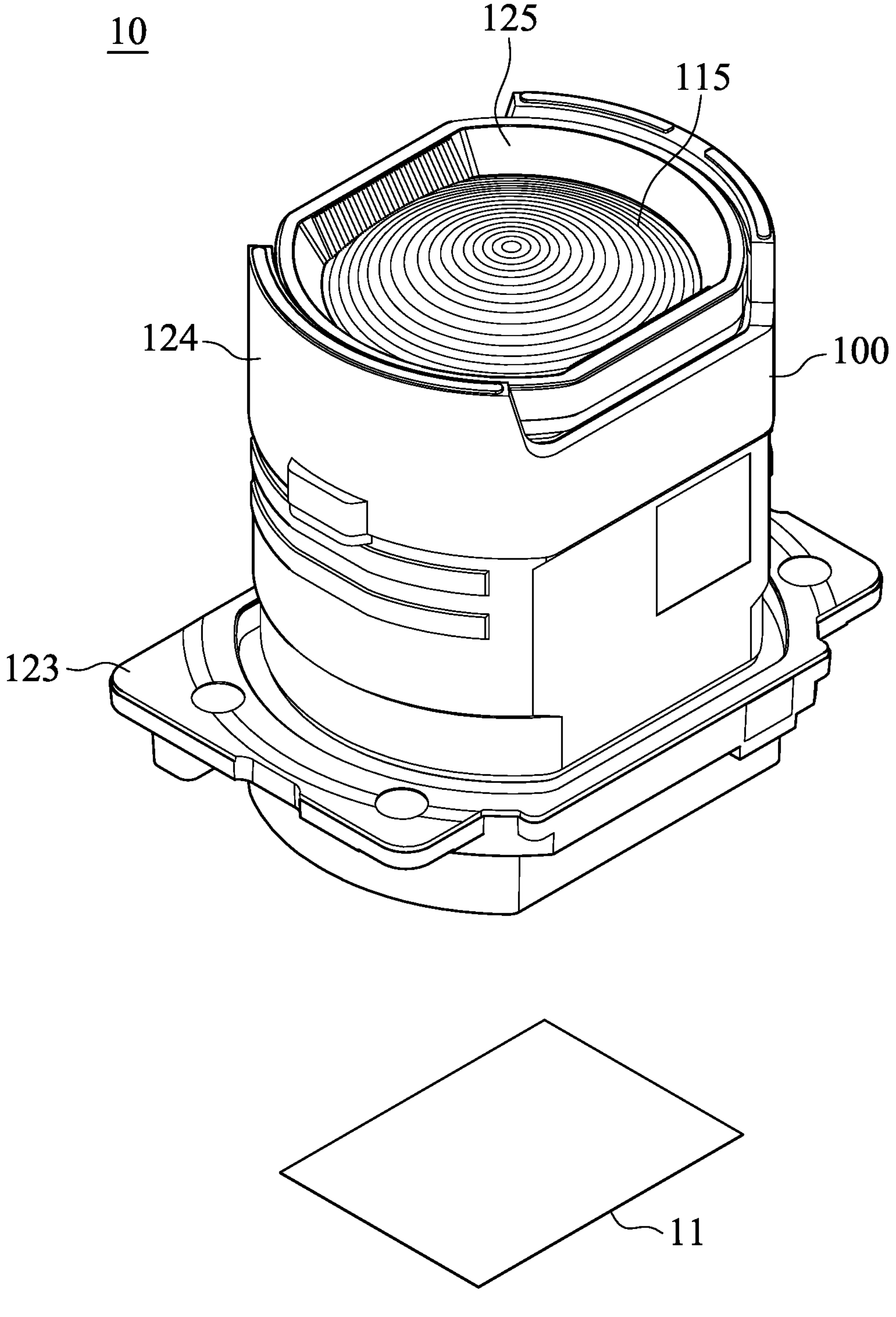
FIG. 1A is a schematic view of a camera module according to the 1st example of the 1st embodiment of the present disclosure.

The present disclosure provides an imaging lens assembly having an optical axis, and including a plurality of optical elements. The optical axis passes through the optical elements, and the optical elements include a radial reduction lens element and a radial reduction light blocking element. An appearance of the radial reduction lens element is non-circular observed along a direction parallel to the optical axis. The radial reduction lens element includes an optical effective portion and a peripheral portion. The optical axis passes through the optical effective portion. The peripheral portion extends from the optical effective portion towards a direction away from the optical axis, and is disposed around the optical effective portion along a circumferential direction of the optical axis. An appearance of the radial reduction light blocking element is non-circular observed along the direction parallel to the optical axis. The radial reduction light blocking element includes a central opening and a radial reduction part. The optical axis passes through the central opening. The radial reduction part is reduced from a surface of the radial reduction light blocking element towards the optical axis along a direction vertical to the optical axis, so that the central opening is non-circular. The radial reduction part includes a plurality of light blocking structures. The light blocking structures are arranged along the direction vertical to the optical axis, and each of the light blocking structures extends toward a direction close to the optical axis. A number of the light blocking structures is Nr, and the following condition is satisfied: $50<Nr<250$. Therefore, it is favorable for reducing the non-imaging light reflected from the radial reduction part effectively by disposing a plurality of light blocking structures on the radial reduction part, so as to enhance the image quality.

In detail, the aforementioned "non-circular" can be an I-CUT, a D-CUT, a playground shaped, a tangent line shaped etc., but the present disclosure is not limited thereto. When the direction parallel to the optical axis is the Z-axis, a direction vertical to the optical axis is an arbitrary direction on an X-Y plane defined by the X-axis and the Y-axis. Moreover, a shape of the light blocking structures can be wedge-shaped, strip-shaped, semi-cylindrical shaped or wavy-shaped, but the present disclosure is not limited thereto. The aforementioned “radial reduction” can be formed by the mold design of the injection molding or the cutting of the product after molding, but the present disclosure is not limited thereto.

A V-shaped groove is formed between each two of the light blocking structures, the V-shaped groove has an angle θ, and the following condition can be satisfied: 0 degrees<θ<90 degrees. Therefore, it is favorable for ensuring both of the light blocking efficiency and the life of the cutting tool of molding by satisfying the aforementioned angle setting range. In detail, the radial reduction light blocking element can be a plastic injection molding spacer or retainer, and the wedge-shaped of each of the light blocking structures can be fabricated by transfer molding. An appearance of the V-shaped groove closest to the optical axis is arranged in curvature along the direction vertical to the optical axis, while observing along the direction parallel to the optical axis. Moreover, the following condition can be satisfied: 30 degrees<θ<65 degrees. Thus, it is favorably for ensuring both of the light blocking efficiency and the life of the cutting tool of molding by satisfying the aforementioned angle setting range.

A radius structure is formed between each two of the light blocking structures, the radius structure has a radius R, and the following condition can be satisfied: 0 mm<R<0.3 mm. Thus, it is favorable for providing better light blocking efficiency. Furthermore, the radial reduction light blocking element can be a light blocking sheet manufactured by a punching process, and a wavy-shaped appearance of each of the light blocking structures can be cut by molding, but the present disclosure is not limited thereto. Moreover, the following condition can be satisfied: 0 mm<R<0.15 mm. Thus, it is favorable for providing better light blocking efficiency.

The radial reduction light blocking element can further include a receiving portion. The receiving portion includes a receiving surface directly contacted with one of the optical elements adjacent thereto. The receiving surface can fix the radial reduction light blocking element in the image lens assembly to reduce the assembly tolerance.

The receiving portion of the radial reduction light blocking element can further include a plurality of auxiliary light blocking structures, and the receiving surface is farther away from the central opening than each of the auxiliary light blocking structures from the central opening. It is favorable for eliminating the flare in a specific angle by extending the light blocking range of the light blocking structure via the auxiliary light blocking structures so as to keep the clarity of the image.

An auxiliary V-shaped groove can be formed between each two of the auxiliary light blocking structures, the auxiliary V-shaped groove has an angle θ', and the following condition can be satisfied: 0 degrees<θ'<90 degrees. Therefore, it is favorable for ensuring both of the light blocking efficiency and the life of the cutting tool of molding by satisfying the aforementioned angle setting range. Moreover, the following condition can be satisfied: 30 degrees<θ'<65 degrees.

An air gap can be between the light blocking structures and one of the optical elements adjacent thereto. Therefore, it is favorable for preventing the interference between the radial reduction light blocking element and the optical elements adjacent thereto, so as to ensure the assembling quality.

In detail, the radial reduction light blocking element can be made of black plastic. In specific, the radial reduction light blocking element can be a composite light blocking sheet, which includes a first surface layer, a second surface layer and an inner substrate layer. The first surface layer has a first outer surface. The second surface layer has a second outer surface. The inner substrate layer is located between the first surface layer and the second surface layer, and connected to the first surface layer and the second surface layer. A material of the inner substrate layer can be PC, PET or PMMA etc., the first surface layer and the second surface layer can be black carbon material layer or carbon fiber material layer etc., but the present disclosure is not limited thereto.

The radial reduction light blocking element is made of black plastic, and has at least one gate trace. Thus, it is favorable for reducing the weight of the imaging lens assembly by using the plastic material. Moreover, the radial reduction light blocking element can have two or more gate traces, but the present disclosure is not limited thereto.

The radial reduction light blocking element and the light blocking structures can be formed integrally. Thus, it is favorable for providing better manufacturing efficiency of the imaging lens assembly.

The present disclosure provides an imaging lens assembly, has an optical axis, and includes a plurality of optical elements. The optical axis passes through the optical elements, and the optical elements include a first radial reduction lens element, a first radial reduction light blocking element and a second radial reduction light blocking element. An appearance of the first radial reduction lens element is non-circular observed along a direction parallel to the optical axis. The first radial reduction lens element includes a first optical effective portion and a first peripheral portion. The optical axis passes through the first optical effective portion. The first peripheral portion extends from the first optical effective portion towards a direction away from the optical axis, and is disposed around the first optical effective portion along a circumferential direction of the optical axis. The first peripheral portion includes a first diameter contact surface. The first diameter contact surface is disposed around the first peripheral portion. An appearance of the first radial reduction light blocking element is non-circular observed along the direction parallel to the optical axis. The first radial reduction light blocking element includes a first central opening and a first radial reduction part. The optical axis passes through the first central opening. The first radial reduction part is reduced from a surface of the first radial reduction light blocking element towards the optical axis along a direction vertical to the optical axis, so that the first central opening is non-circular. The first radial reduction part includes a plurality of first light blocking structures. The first light blocking structures are arranged along the direction vertical to the optical axis, and each of the first light blocking structures extends toward a direction close to the optical axis. The second radial reduction light blocking element is configured to load the first radial reduction lens element, and the second radial reduction light blocking element includes a second central opening, a second radial reduction part and a first receiving side wall surface. The optical axis passes through the second central opening. The second radial reduction part is reduced from a surface of the second radial reduction light blocking element towards the optical axis along the direction vertical to the optical axis, so that the second central opening is non-circular. The second radial reduction part includes a plurality of second light blocking structures. The second light blocking structures are arranged along the direction vertical to the optical axis, and each of the second light blocking structures extends toward the direction close to the optical axis. The first receiving side wall surface is directly contacted with the first diameter contact surface of the first radial reduction lens element. A number of the first light blocking structures is Nr1, a number of the second light blocking structures is Nr2, and the following conditions are satisfied: 10<Nr1<250; and 10<Nr2<250. It is favorable for reducing the non-imaging light reflected from the image lens assembly effectively by the configuration of the first light blocking structures and the second light blocking structures, so as to enhance the image quality.

Further, the second radial reduction light blocking element can be a barrel, but the present disclosure is not limited thereto. The aforementioned second radial reduction light blocking element is configured to "load" the first radial reduction lens element, that is, the second radial reduction light blocking element can receive, accommodate, physical contact or fix with retaining material to fix the first radial reduction lens element, but the present disclosure is not limited thereto. For example, the first radial reduction lens element can be received in the second radial reduction light blocking element, and a part of the first radial reduction lens element can be protruded or exposed out of the second radial reduction light blocking element. Or, the first diameter contact surface of the first radial reduction lens element can physically contact with a first receiving side wall surface of the second radial reduction light blocking element, and accommodate in the second radial reduction light blocking element. Or, the first radial reduction lens element is packaged in the second radial reduction light blocking element via a retaining material. For instance, the first radial reduction lens element can be stuck with the second radial reduction light blocking element via an adhesive dispensing process, or fix with the second radial reduction light blocking element via a retainer.

A radius structure is formed between each two of the first light blocking structures, the radius structure has a radius R, and the following condition can be satisfied: 0 mm<R<0.3 mm. Thus, it is favorable for providing a better light blocking efficiency of the first light blocking structures. Moreover, the following condition can be satisfied: 0 mm<R<0.15 mm.

A V-shaped groove is formed between each two of the second light blocking structures, the V-shaped groove has an angle θ, and the following condition can be satisfied: 0 degrees<θ<90 degrees. Therefore, it is favorable for ensuring both of the light blocking efficiency of the second light blocking structures and the life of the cutting tool of molding by satisfying the aforementioned angle setting range. Moreover, the following condition can be satisfied: 30 degrees<θ<65 degrees.

The second radial reduction light blocking element can load the first radial reduction lens element and the first radial reduction light blocking element at the same time.

The number of the first light blocking structures is Nr1, and the following condition can be satisfied: 50<Nr1<250. Thus, it is favorable for ensuring both of the light blocking efficiency of the first light blocking structures and the transfer molding quality of injection molding by satisfying the aforementioned amount setting range.

The number of the second light blocking structures is Nr2, and the following condition can be satisfied: 50<Nr2<250. Thus, it is favorable for ensuring both of the light blocking efficiency of the second light blocking structures and the transfer molding quality of injection molding by satisfying the aforementioned amount setting range.

The optical elements can further include a second radial reduction lens element and a third radial reduction light blocking element. An appearance of the second radial reduction lens element is non-circular observed along the direction parallel to the optical axis. The second radial reduction lens element includes a second optical effective portion and a second peripheral portion. The optical axis passes through the second optical effective portion. The second peripheral portion extends from the second optical effective portion towards a direction away from the optical axis, disposed around the second optical effective portion along the circumferential direction of the optical axis. The second peripheral portion includes a second diameter contact surface. The second diameter contact surface is disposed around the second peripheral portion. The third radial reduction light blocking element is configured to load the second radial reduction lens element, and includes a third central opening, a third radial reduction part and a second receiving side wall surface. The optical axis passes through the third central opening. The third radial reduction part reduces from a surface of the third radial reduction light blocking element towards the optical axis along the direction vertical to the optical axis, so that the third central opening is non-circular, and the third radial reduction part includes a plurality of third light blocking structures. The third light blocking structures are arranged along the direction vertical to the optical axis, and each of the third light blocking structures extends toward the direction close to the optical axis. The second receiving side wall surface is directly contacted with the second diameter contact surface of the second radial reduction lens element. A number of the third light blocking structures is Nr3, and the following condition is satisfied: 10<Nr3<250. Therefore, it is favorable for meeting optical requirements corresponding to different imaging lens assemblies, so that the design margin of the imaging lens assembly can be enhanced. In order to correspond to the auto-focusing requirement of the Voice Coil Motor (VCM), the imaging lens assembly can be assembled by a two-piece barrel.

The first radial reduction light blocking element is made of black plastic.

The second radial reduction light blocking element is made of black plastic, and has at least one gate trace. Thus, it is favorable for reducing the weight of the imaging lens assembly by using the plastic material.

Each of the aforementioned features of the imaging lens assembly can be utilized in various combinations for achieving the corresponding effects.

The present disclosure provides a camera module. The camera module includes the aforementioned imaging lens assembly and an image sensor. The image sensor is disposed on an image surface of the imaging lens assembly.

The present disclosure provides an electronic device. The electronic device includes the aforementioned camera module.

According to the aforementioned embodiment, specific embodiments and examples are provided, and illustrated via figures.

1st Embodiment

Figure 1B:
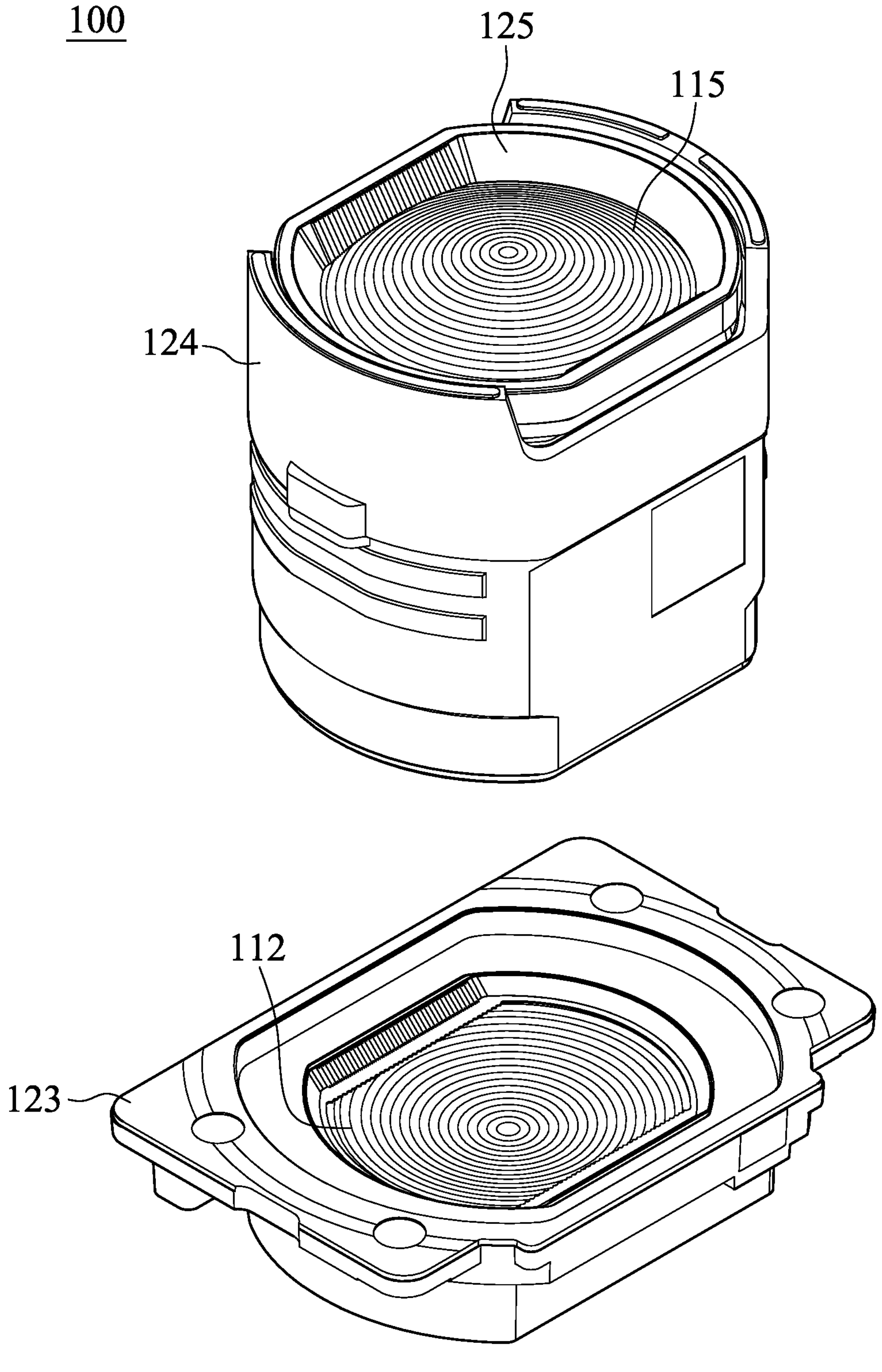
FIG. 1B is a breakdown view of an imaging lens assembly according to the 1st example of the 1st embodiment of FIG. 1A.
Figure 1C:
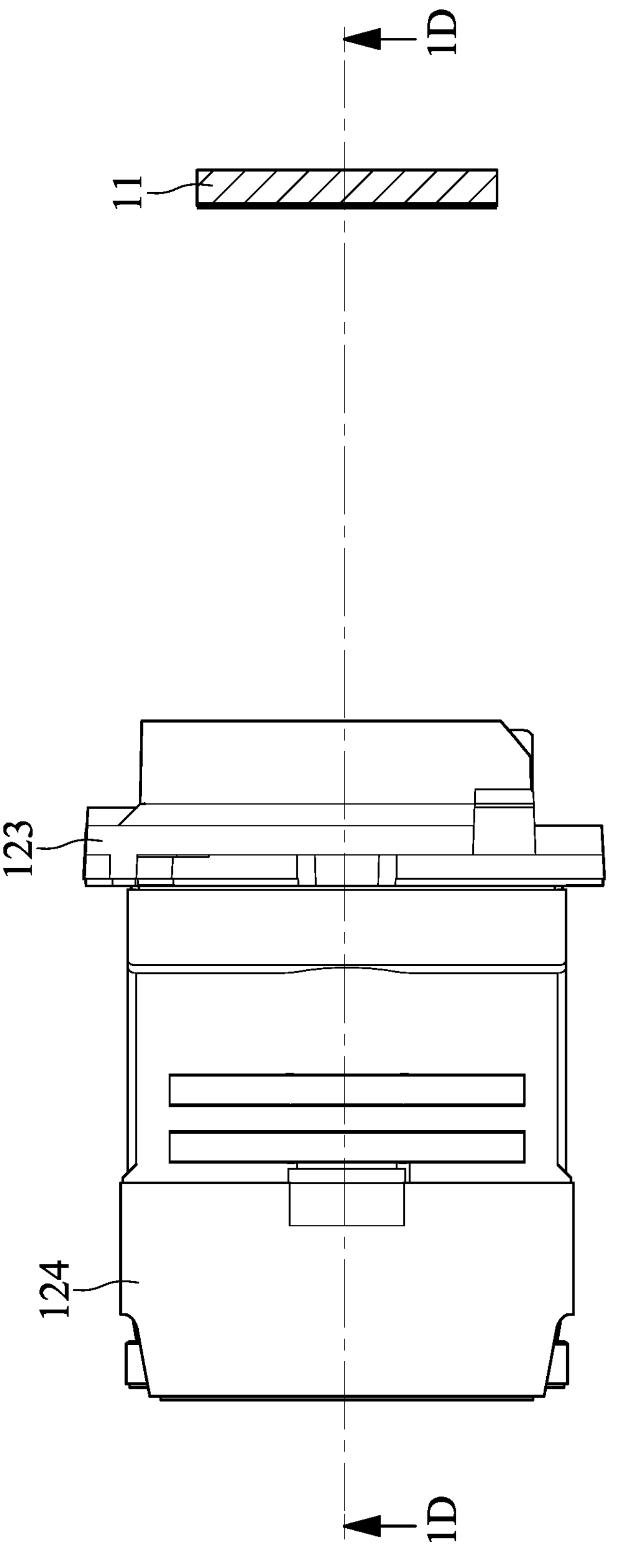
FIG. 1C is a plane view of the camera module according to the 1st example of the 1st embodiment of FIG. 1A.
Figure 1D:
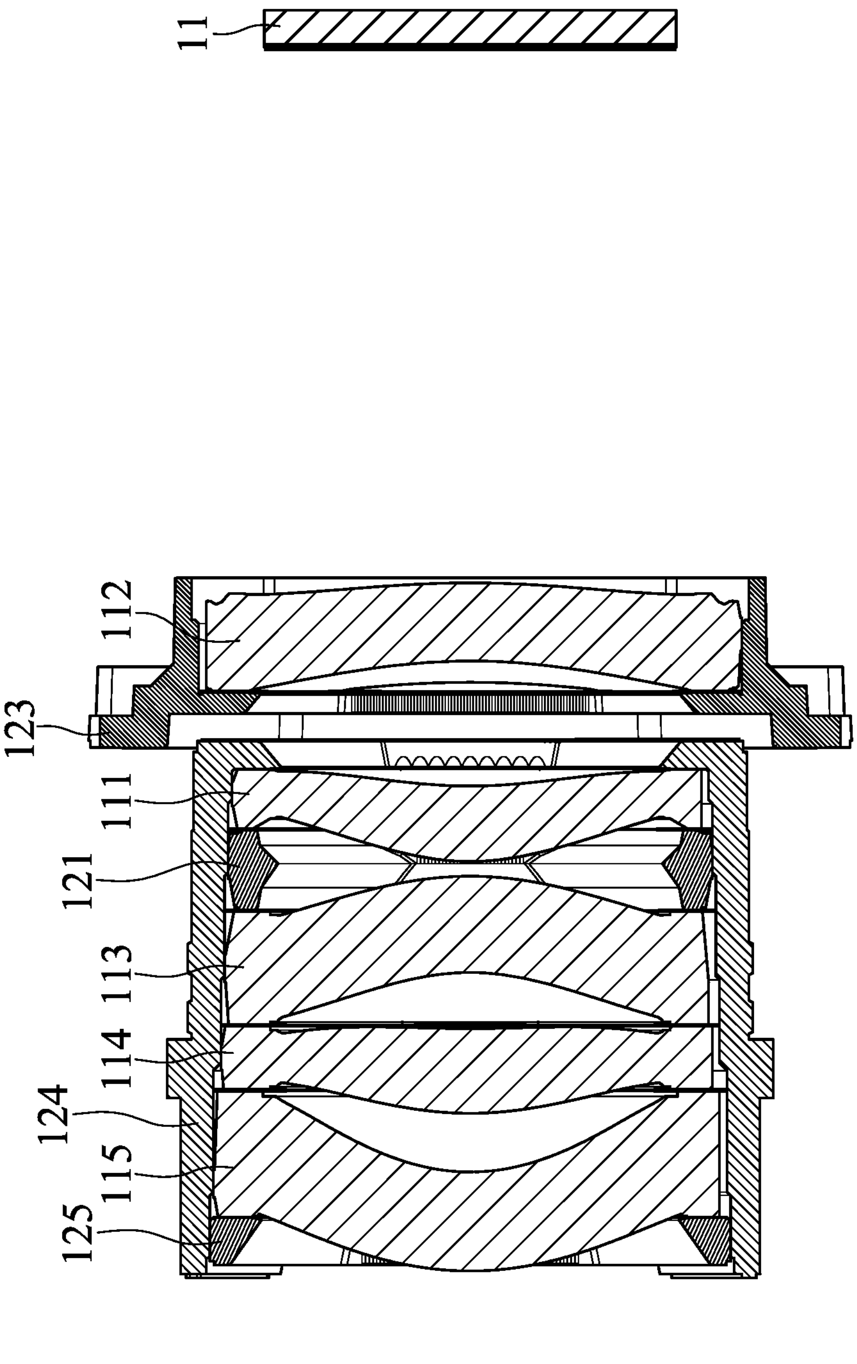
FIG. 1D is a cross-sectional view of the camera module according to the 1st example of the 1st embodiment along line 1D-1D in FIG. 1C.
Figure 1E:
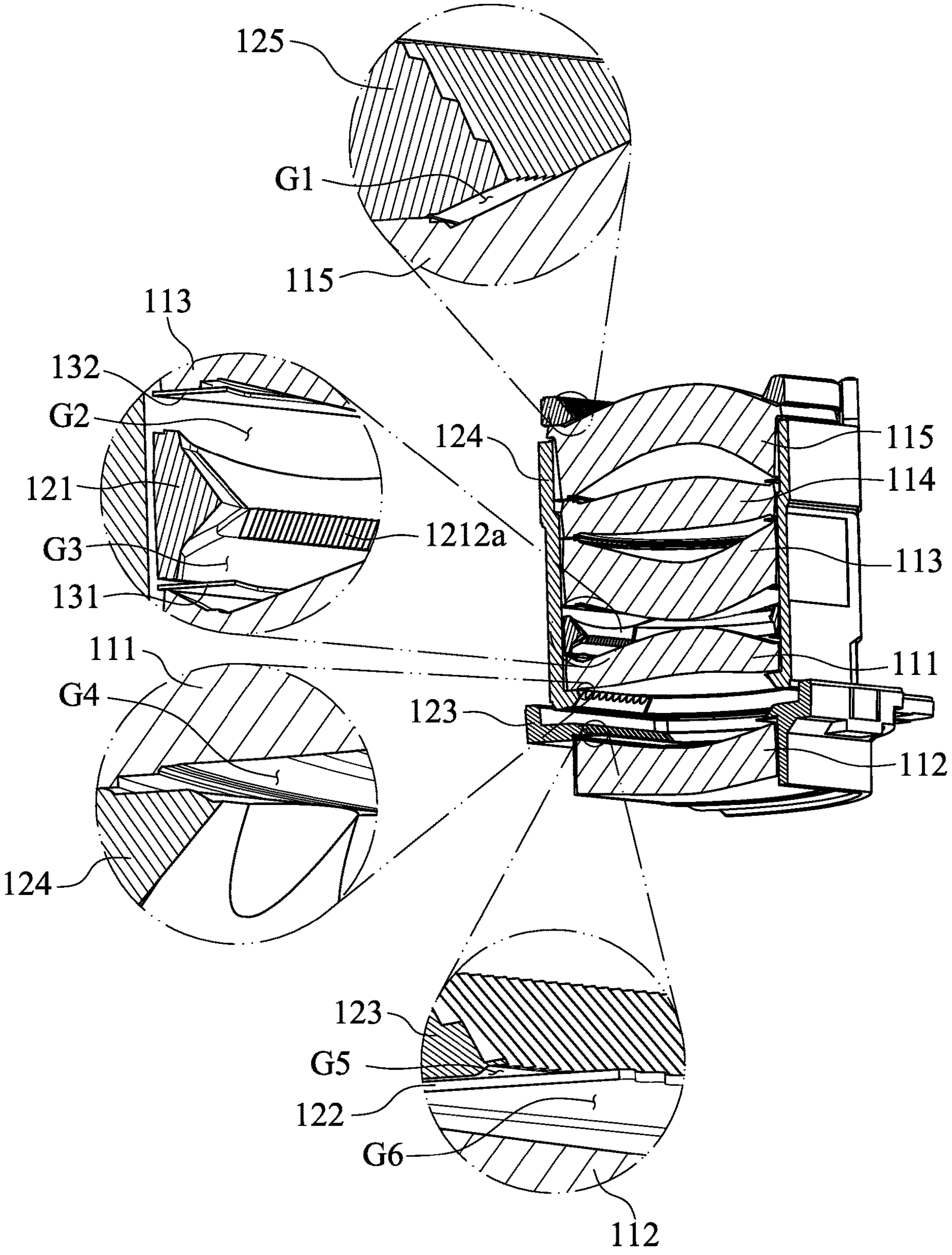
FIG. 1E is a partial enlarged view of the imaging lens assembly according to the 1st example of the 1st embodiment of FIG. 1D.
Figure 1F:
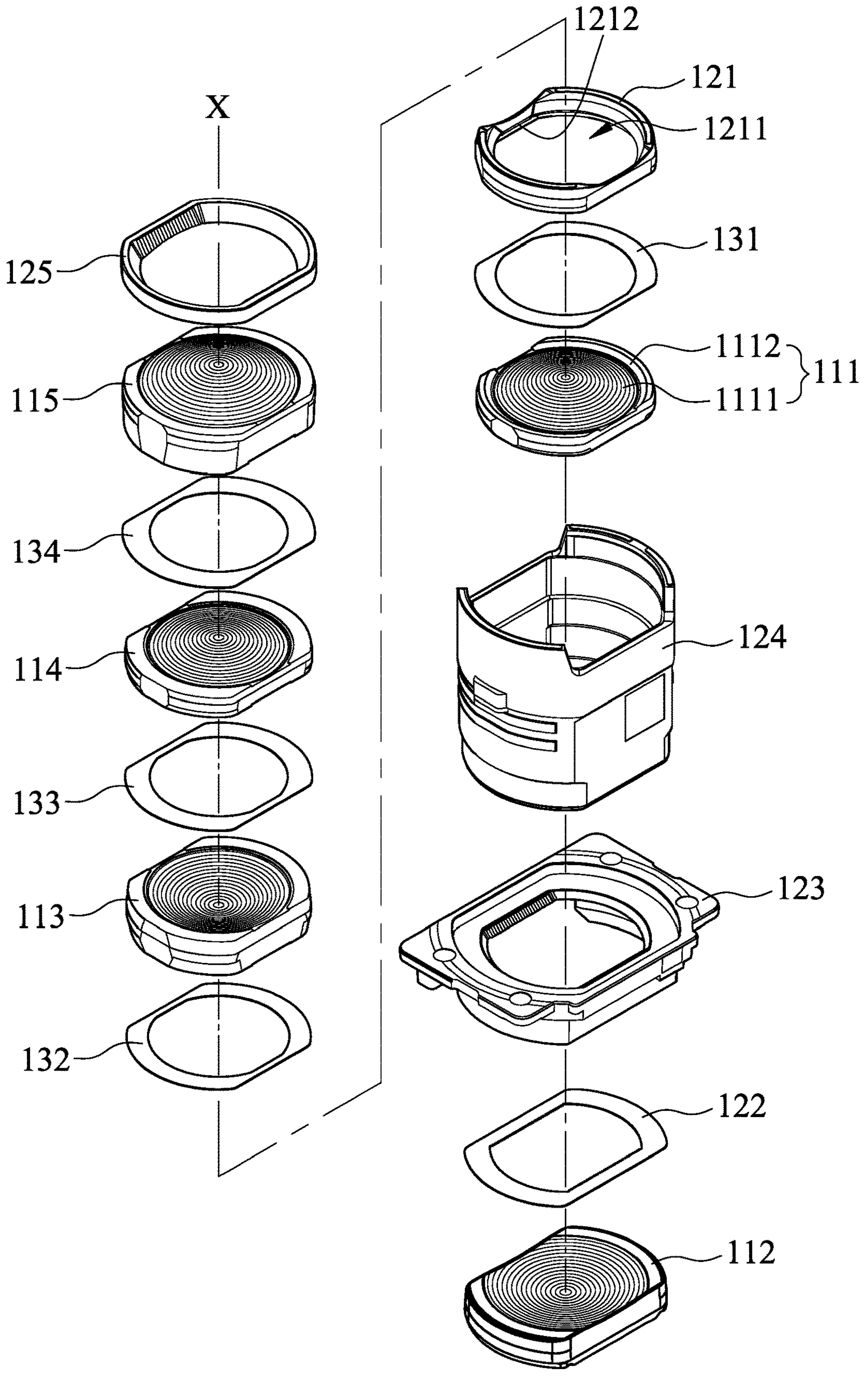
FIG. 1F is an exploded view of the imaging lens assembly according to the 1st example of the 1st embodiment of FIG. 1A.
Figure 1G:
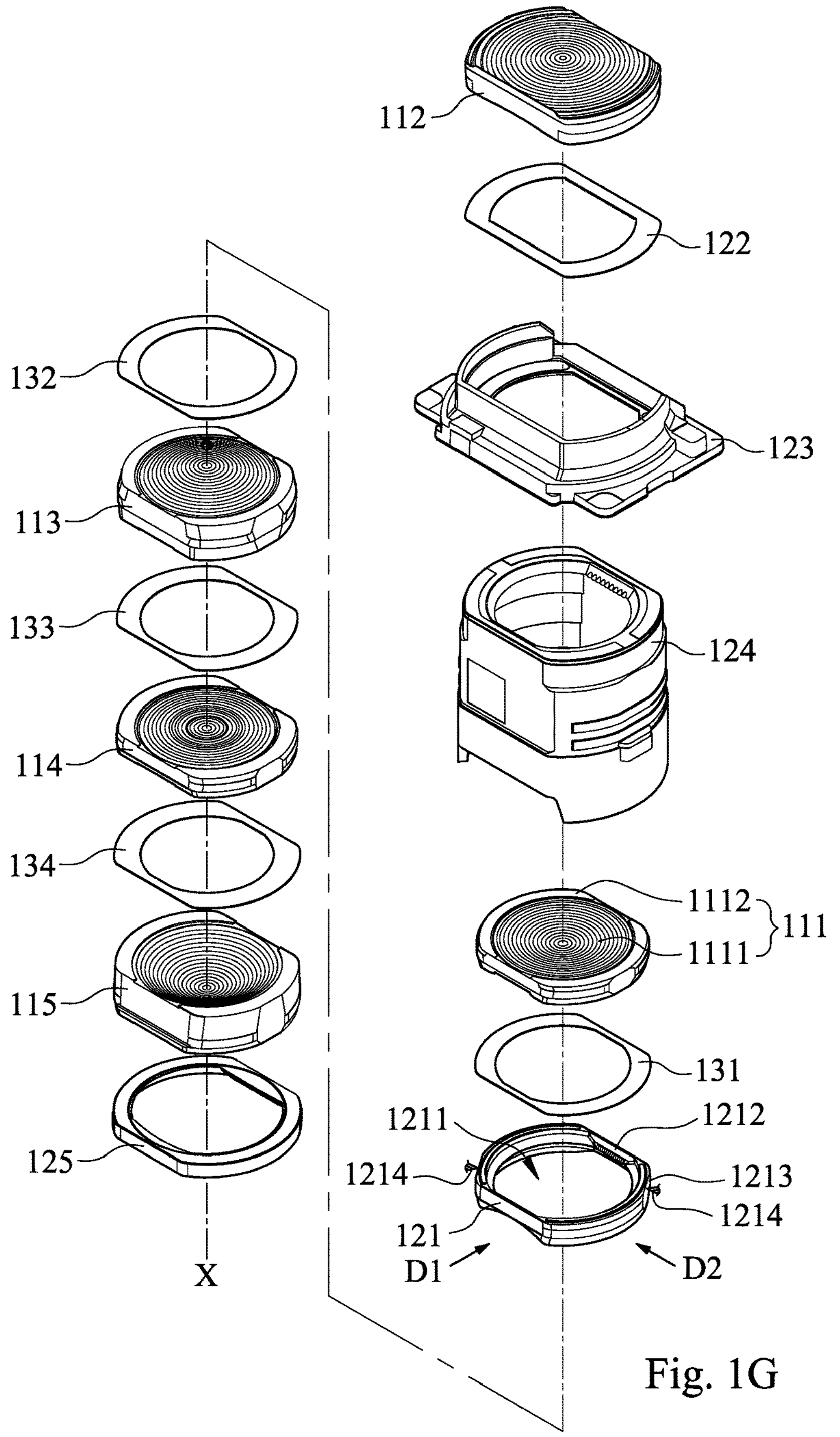
FIG. 1G is another exploded view of the imaging lens assembly according to the 1st example of the 1st embodiment of FIG. 1A.

Please refer to FIG. 1A to FIG. 1G. FIG. 1A is a schematic view of a camera module 10 according to the 1st example of the 1st embodiment of the present disclosure. FIG. 1B is a breakdown view of an imaging lens assembly 100 according to the 1st example of the 1st embodiment of FIG. 1A. FIG. 1C is a plane view of the camera module 10 according to the 1st example of the 1st embodiment of FIG. 1A. FIG. 1D is a cross-sectional view of the camera module 10 according to the 1st example of the 1st embodiment along line 1D-1D in FIG. 1C. FIG. 1E is a partial enlarged view of the imaging lens assembly 100 according to the 1st example of the 1st embodiment of FIG. 1D. FIG. 1F is an exploded view of the imaging lens assembly 100 according to the 1st example of the 1st embodiment of FIG. 1A. FIG. 1G is another exploded view of the imaging lens assembly 100 according to the 1st example of the 1st embodiment of FIG. 1A. In FIG. 1A to FIG. 1G, the camera module 10 includes the imaging lens assembly 100 and an image sensor 11. The image sensor 11 is disposed on an image surface (its reference numeral is omitted) of the imaging lens assembly 100. The imaging lens assembly 100 has an optical axis X, and includes a plurality of optical elements (their reference numerals are omitted). The optical axis X passes through the optical elements.

In FIG. 1D, FIG. 1E, FIG. 1F and FIG. 1G, the optical elements of the 1st example of the 1st embodiment includes a barrel 124, five radial reduction lens elements 111, 112, 113, 114, 115, four radial reduction light blocking elements 121, 122, 123, 125 and four light blocking sheets 131, 132, 133, 134. In detail, the radial reduction light blocking element 125 connects around an object side of the barrel 124, the radial reduction lens element 115, the light blocking sheet 134, the radial reduction lens element 114, the light blocking sheet 133, the radial reduction lens element 113, the light blocking sheet 132, the radial reduction light blocking element 121, the light blocking sheet 131, the radial reduction lens element 111 are disposed in the barrel 124 in order from the object side to an image side. The radial reduction light blocking element 122 and the radial reduction lens element 112 are accommodated in the radial reduction light blocking element 123, and the radial reduction light blocking element 123 is connected to the image side of the barrel 124. In particular, the optical features such as numbers, structures, surface shapes and so on of each of the optical elements can be disposed according to different imaging demand, and the optical features are not limited thereto.

An appearance of the radial reduction lens element 111 is non-circular observed along a direction parallel to the optical axis X. The radial reduction lens element 111 includes an optical effective portion 1111 and a peripheral portion 1112. The optical axis X passes through the optical effective portion 1111. The peripheral portion 1112 extends from the optical effective portion 1111 towards a direction away from the optical axis X, and is disposed around the optical effective portion 1111 along a circumferential direction of the optical axis X. An appearance of the radial reduction light blocking element 121 is non-circular observed along the direction parallel to the optical axis X. The radial reduction light blocking element 121 includes a central opening 1211 and a radial reduction part 1212. The radial reduction part 1212 is reduced from a surface of the radial reduction light blocking element 121 towards the optical axis X along a direction D1 vertical to the optical axis X, so that the central opening 1211 is non-circular. The radial reduction part 1212 includes a plurality of light blocking structures 1212*a*. The light blocking structures 1212*a* are arranged along the direction D2 vertical to the optical axis X, and each of the light blocking structures 1212*a* extends toward a direction close to the optical axis X.

The radial reduction light blocking element 121 can be made of black plastic, and has two gate traces 1214.

Please refer to FIG. 1E, an air gap G1 can be between the light blocking structures (their reference numerals are omitted) of the radial reduction light blocking element 125 and the radial reduction lens elements 115 adjacent thereto. An air gap G2 can be between the light blocking structures 1212*a* of the radial reduction light blocking element 121 and the light blocking sheet 132 adjacent thereto. An air gap G3 can be between the light blocking structures 1212*a* of the radial reduction light blocking element 121 and the light blocking sheet 131 adjacent thereto. An air gap G4 can be between the light blocking structures (their reference numerals are omitted) of the barrel 124 and the radial reduction lens elements 111 adjacent thereto. An air gap G5 can be between the light blocking structures (their reference numerals are omitted) of the radial reduction light blocking element 123 and the light blocking structures (their reference numerals are omitted) of the radial reduction light blocking element 122 adjacent thereto. An air gap G6 can be between the light blocking structures (their reference numerals are omitted) of the radial reduction light blocking element 122 and the radial reduction lens element 112 adjacent thereto.

Figure 1H:
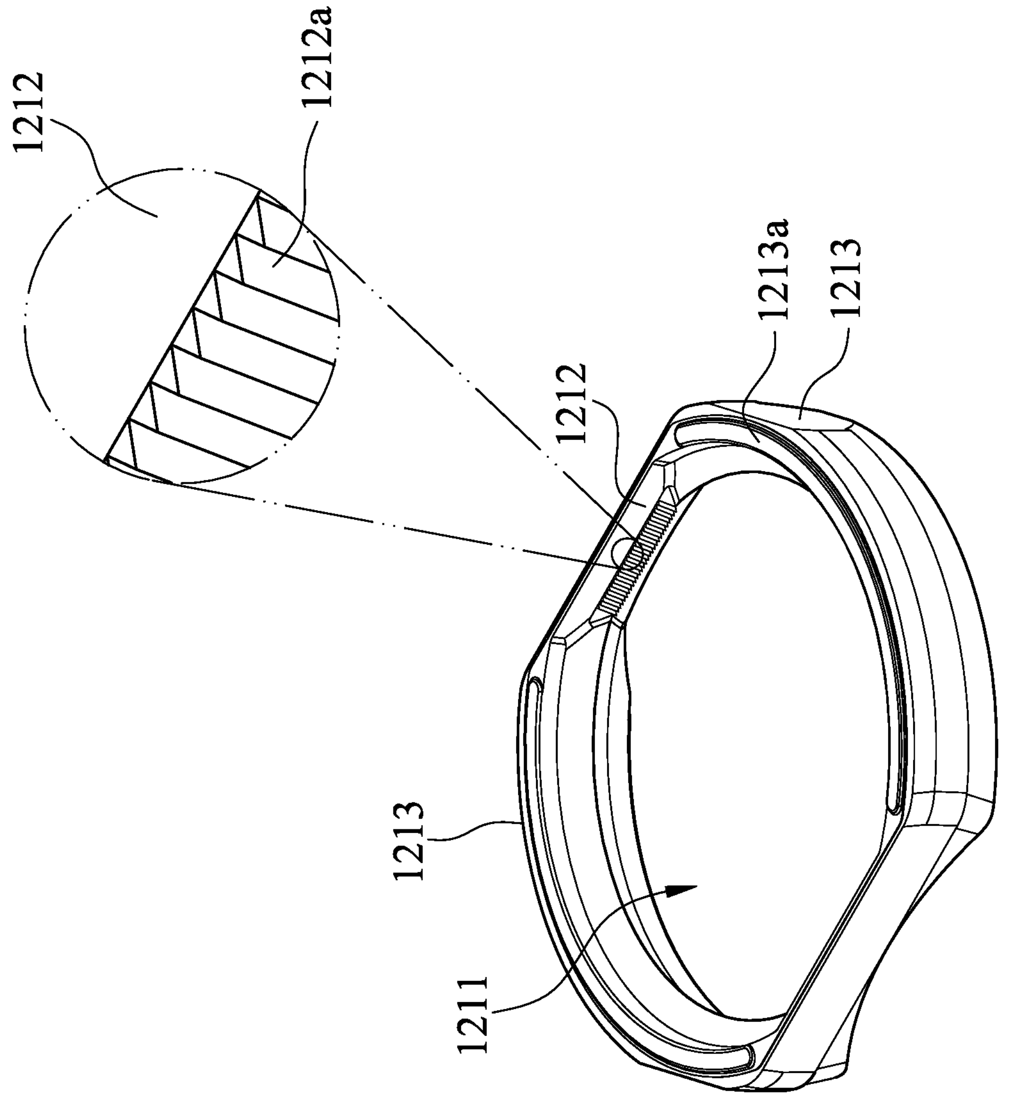
FIG. 1H is a schematic view of the radial reduction light blocking element according to the 1st example of the 1st embodiment of FIG. 1G.
Figure 1I:
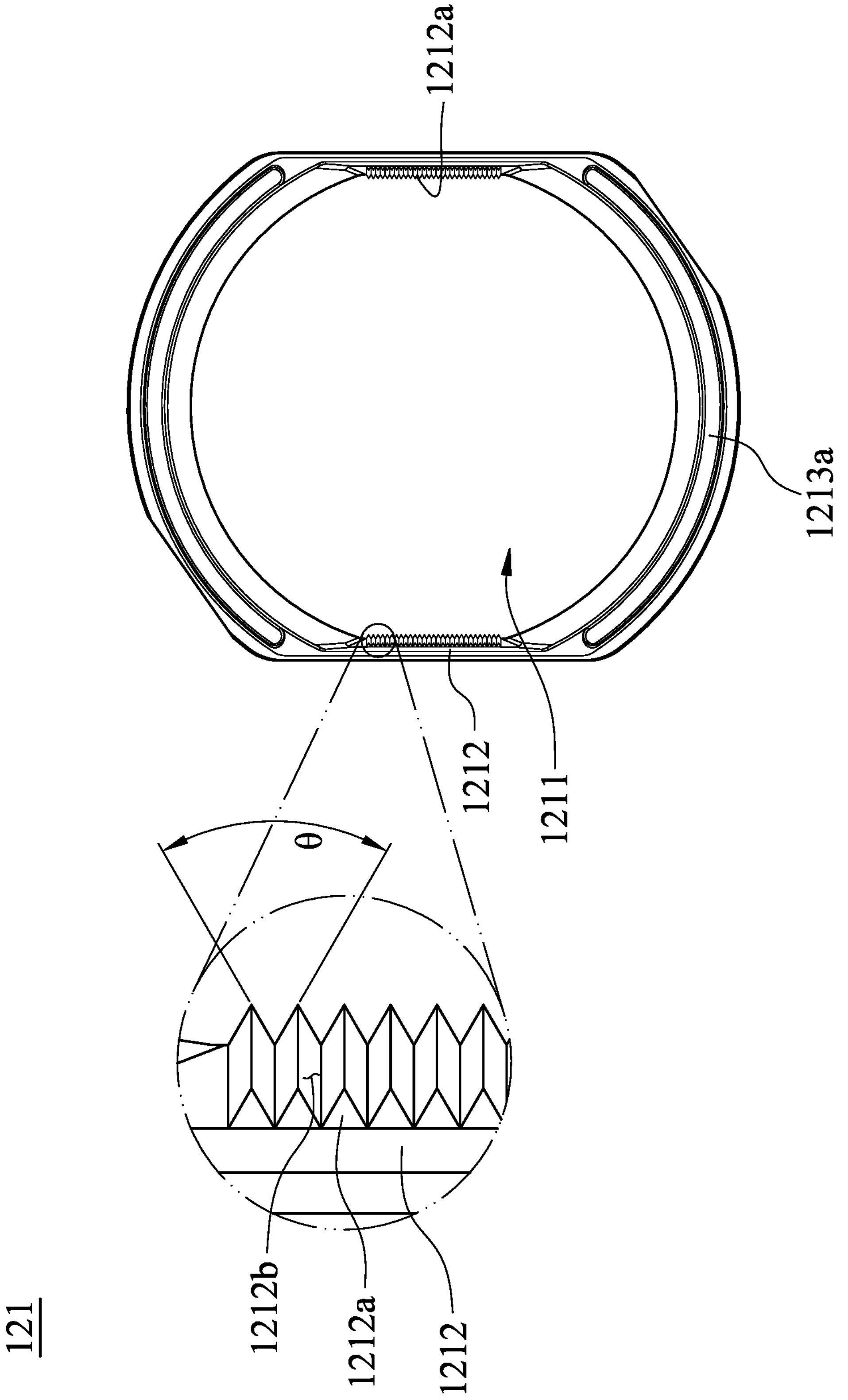
FIG. 1I is a partial enlarged view of the radial reduction light blocking element according to the 1st example of the 1st embodiment of FIG. 1H.
Figure 1K:
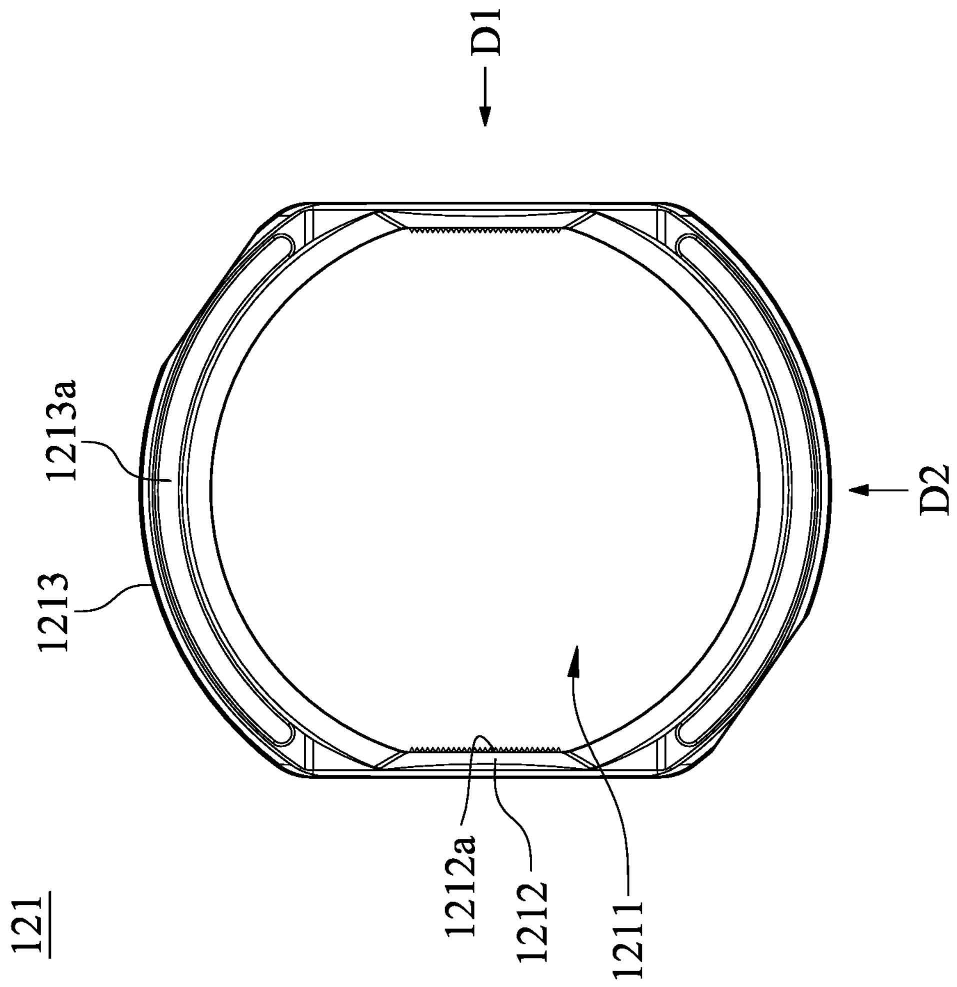
FIG. 1K is a plane view of the radial reduction light blocking element according to the 1st example of the 1st embodiment of FIG. 1H.
Figure 1J:
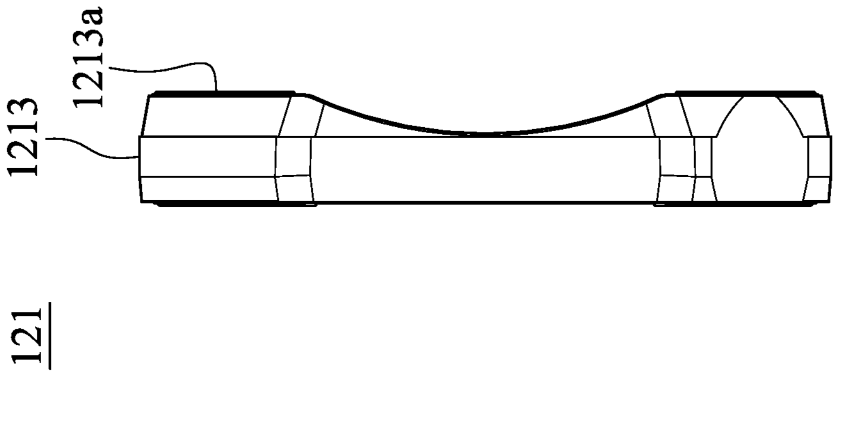
FIG. 1J is a side view of the radial reduction light blocking element according to the 1st example of the 1st embodiment of FIG. 1H.

Please refer to FIG. 1H to FIG. 1K. FIG. 1H is a schematic view of the radial reduction light blocking element 121 according to the 1st example of the 1st embodiment of FIG. 1G. FIG. 1I is a partial enlarged view of the radial reduction light blocking element 121 according to the 1st example of the 1st embodiment of FIG. 1H. FIG. 1J is a side view of the radial reduction light blocking element 121 according to the 1st example of the 1st embodiment of FIG. 1H. FIG. 1K is a plane view of the radial reduction light blocking element 121 according to the 1st example of the 1st embodiment of FIG. 1H. In FIG. 1H to FIG. 1K, the radial reduction light blocking element 121 and the light blocking structures 1212*a* are formed integrally.

Moreover, the radial reduction light blocking element 121 can further include a receiving portion 1213. The receiving portion 1213 includes a receiving surface 1213*a* directly contacted with one of the optical elements adjacent thereto. The receiving surface 1213*a* can fix the radial reduction light blocking element 121 in the image lens assembly 100.

In detail, the radial reduction light blocking element 121 can be a composite light blocking sheet, which includes a first surface layer, a second surface layer and an inner substrate layer. The first surface layer has a first outer surface. The second surface layer has a second outer surface. The inner substrate layer is located between the first surface layer and the second surface layer, and connected to the first surface layer and the second surface layer. A material of the inner substrate layer can be PC, PET or PMMA etc., the first surface layer and the second surface layer can be black carbon material layer or carbon fiber material layer etc., but the present disclosure is not limited thereto.

Further, a V-shaped groove 1212*b* is formed between each two of the light blocking structures 1212*a*, the radial reduction light blocking element 121 can be a plastic injection molding spacer or retainer, and the wedge-shaped of each of the light blocking structures 1212*a* can be fabricated by transfer molding. A number of the light blocking structures 1212*a* is Nr, the V-shaped groove 1212*b* has an angle θ. In detail, the following conditions of the Table 1 are satisfied.

TABLE 1

| 1st example of the 1st embodiment | | | |
|---|---|---|---|
| Nr | 58 | θ (degrees) | 60 |

Figure 1L:
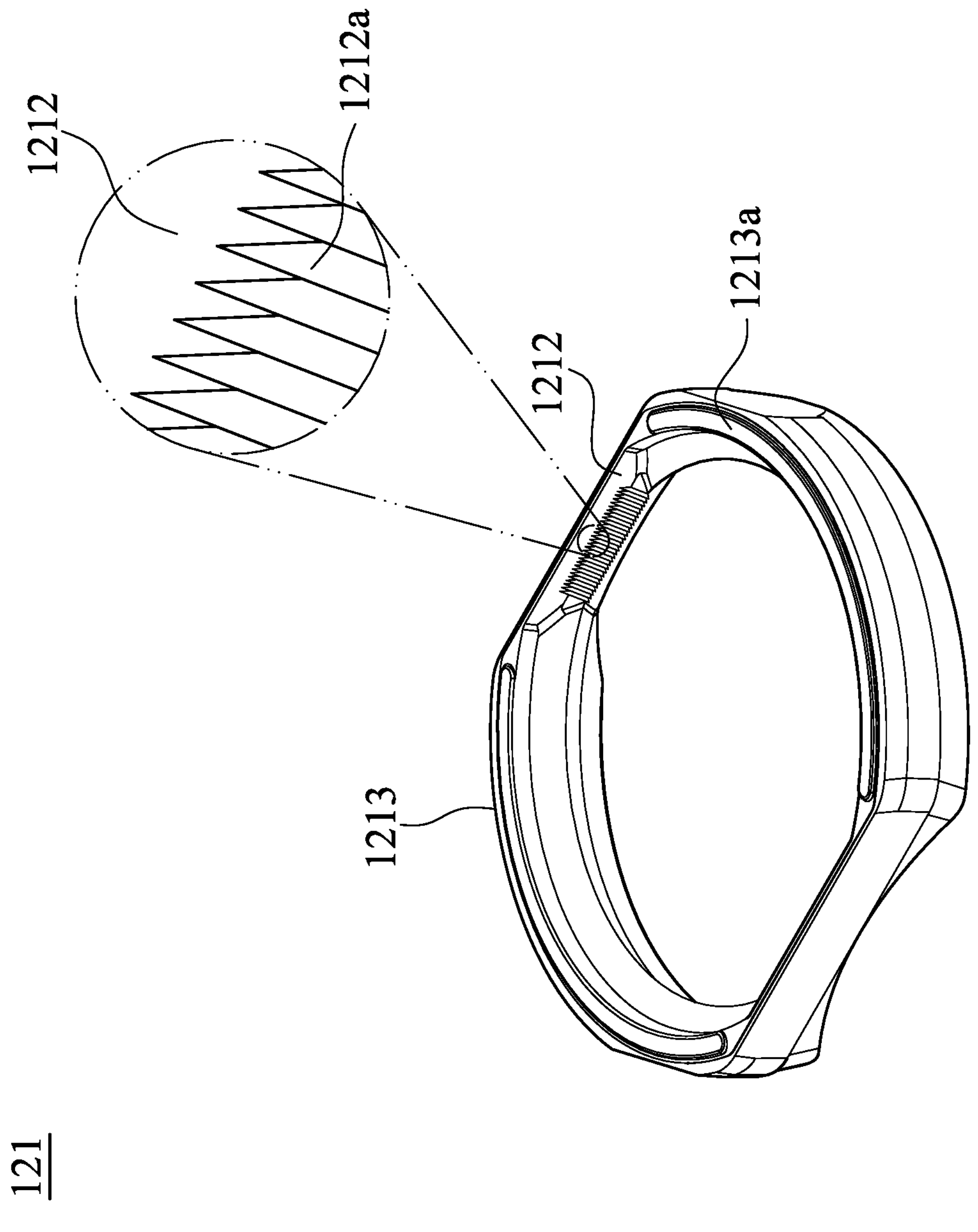
FIG. 1L is a partial enlarged view of the light blocking structures according to the 2nd example of the 1st embodiment of FIG. 1H.
Figure 1M:
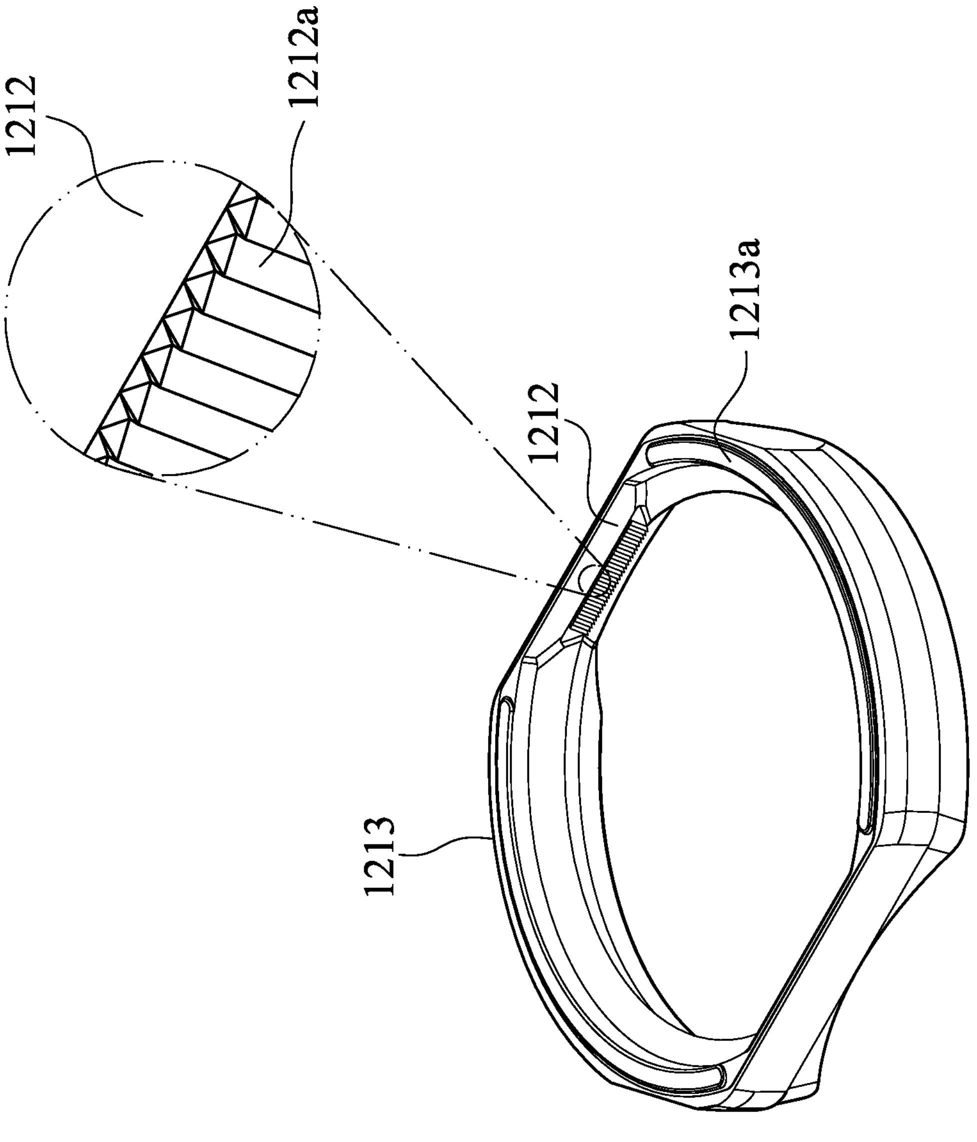
FIG. 1M is a partial enlarged view of the light blocking structures according to the 3rd example of the 1st embodiment of FIG. 1H.

Please refer to FIG. 1L and FIG. 1M. FIG. 1L is a partial enlarged view of the light blocking structures 1212*a* according to the 2nd example of the 1st embodiment of FIG. 1H. FIG. 1M is a partial enlarged view of the light blocking structures 1212*a* according to the 3rd example of the 1st embodiment of FIG. 1H. In FIG. 1L and FIG. 1M, the difference between the 2nd example, the 3rd example and the 1st example is the type of the end of the light blocking structures 1212*a*, other structures and features can be the same or similar to the 1st example, and will not be described again.

Figure 2A:
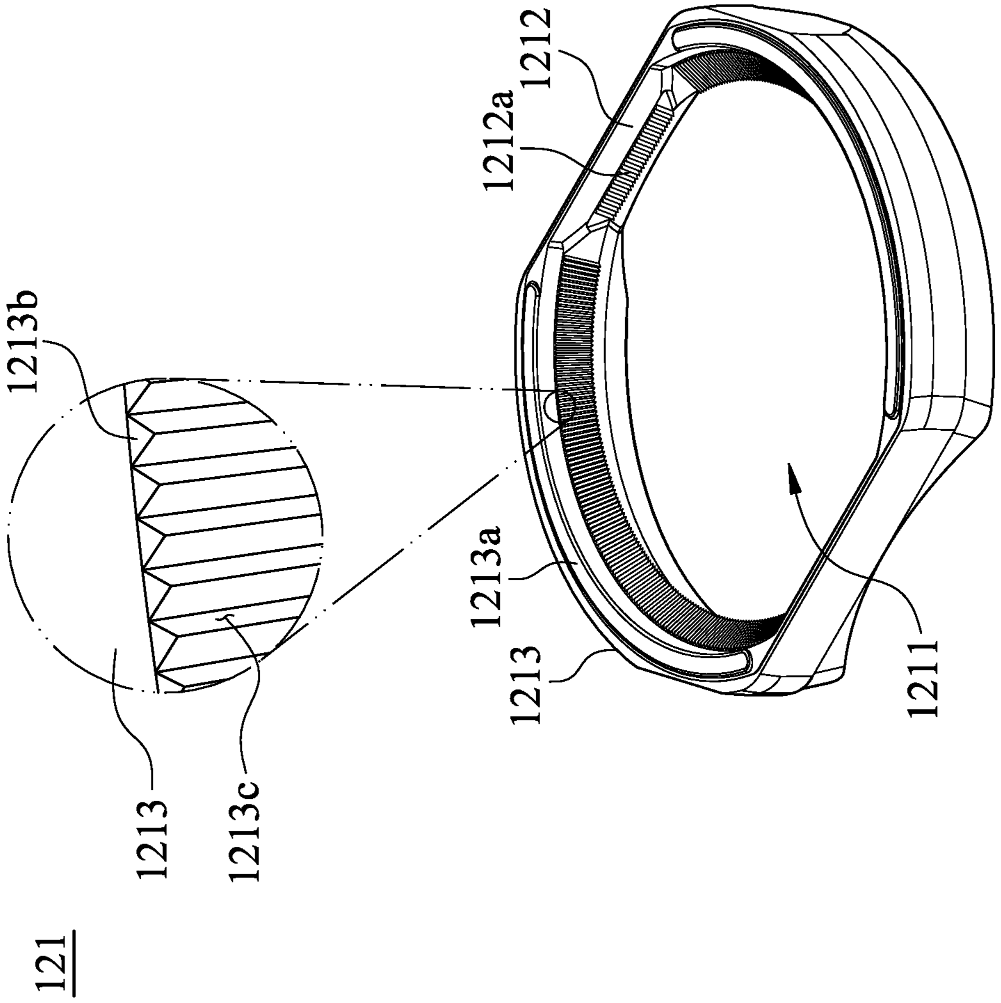
FIG. 2A is a schematic view of the radial reduction light blocking element according to the 4th example of the 1st embodiment of FIG. 1A.
Figure 2B:
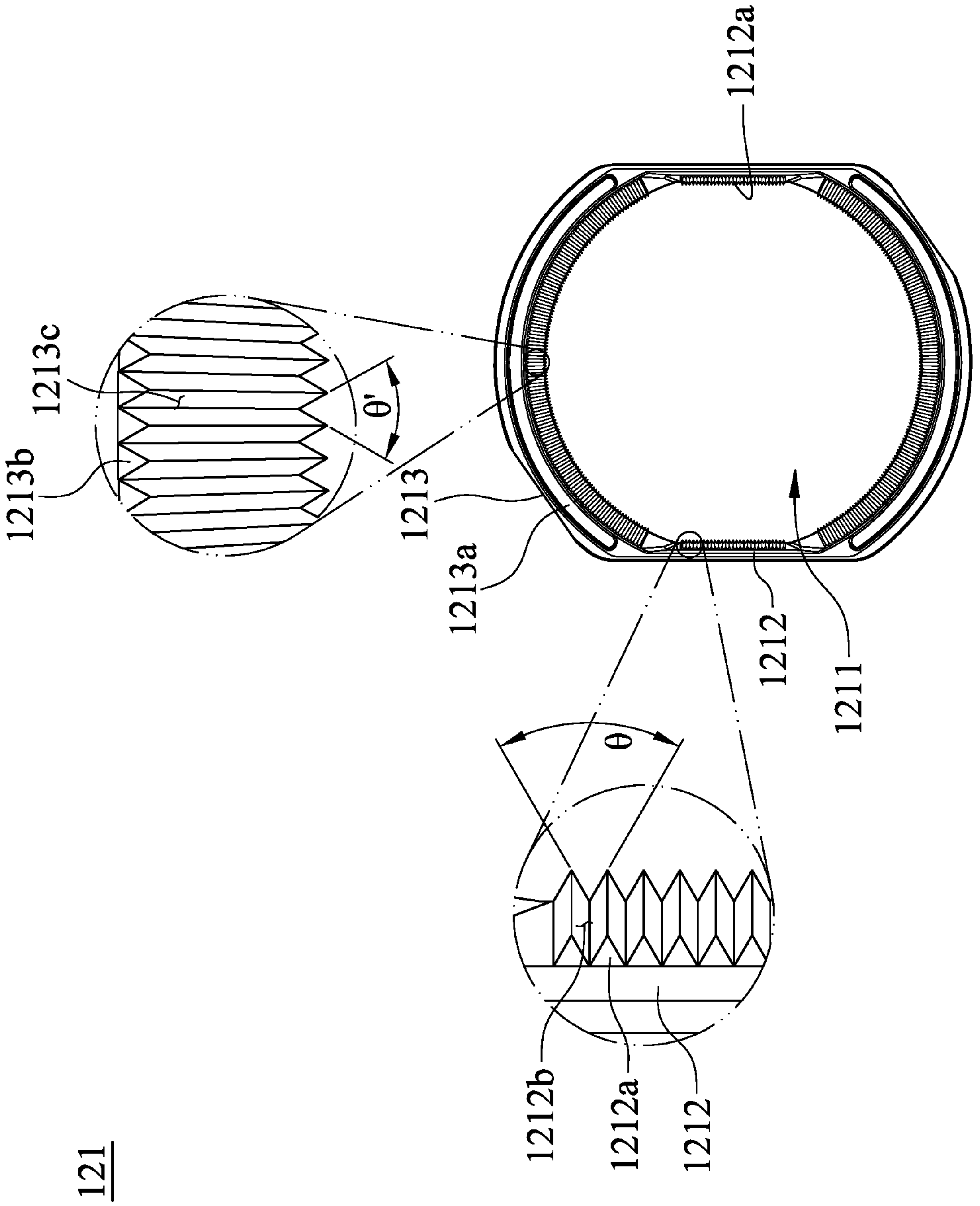
FIG. 2B is a partial enlarged view of the radial reduction light blocking element according to the 4th example of the 1st embodiment of FIG. 2A.
Figure 2D:
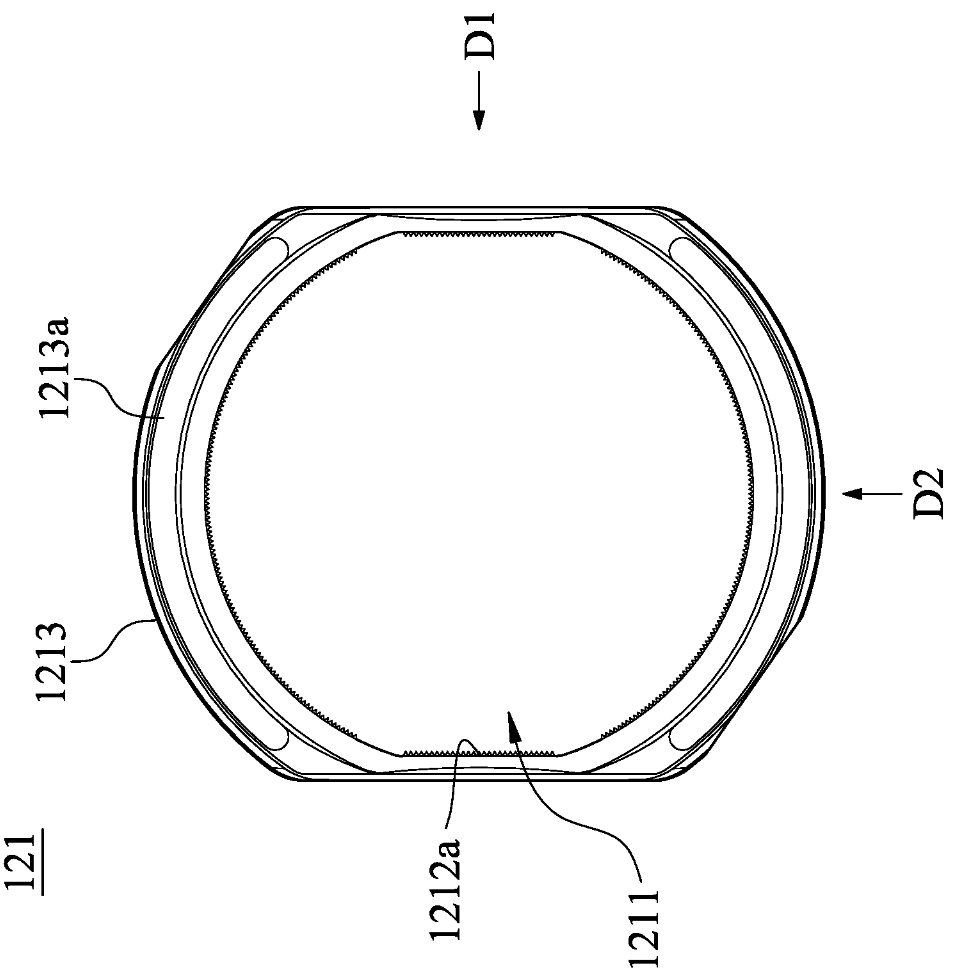
FIG. 2D is a plane view of the radial reduction light blocking element according to the 4th example of the 1st embodiment of FIG. 2A.
Figure 2C:
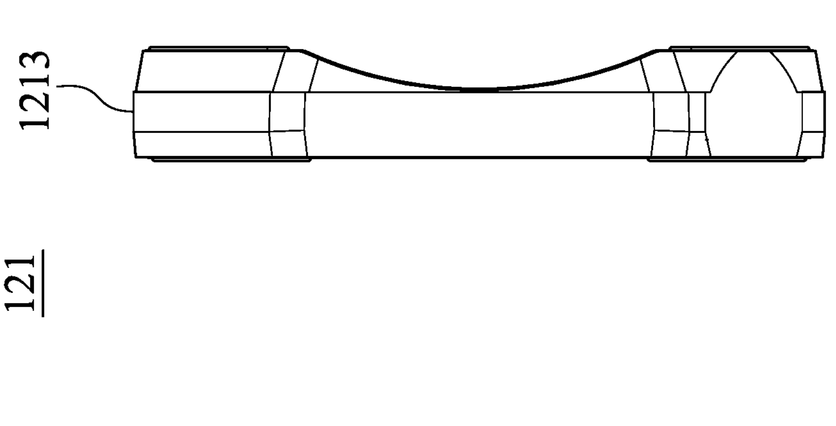
FIG. 2C is a side view of the radial reduction light blocking element according to the 4th example of the 1st embodiment of FIG. 2A.

Please refer to FIG. 2A to FIG. 2D. FIG. 2A is a schematic view of the radial reduction light blocking element 121 according to the 4th example of the 1st embodiment of FIG. 1A. FIG. 2B is a partial enlarged view of the radial reduction light blocking element 121 according to the 4th example of the 1st embodiment of FIG. 2A. FIG. 2C is a side view of the radial reduction light blocking element 121 according to the 4th example of the 1st embodiment of FIG. 2A. FIG. 2D is a plane view of the radial reduction light blocking element 121 according to the 4th example of the 1st embodiment of FIG. 2A. In FIG. 2A to FIG. 2D, the receiving portion 1213 of the radial reduction light blocking element 121 of the 4th example of the 1st embodiment can further include a plurality of auxiliary light blocking structures 1213*b*, and the receiving surface 1213*a* is farther away from the central opening 1211 than each of the auxiliary light blocking structures 1213*b* from the central opening 1211. The auxiliary light blocking structures 1213*b* can extend the light blocking range of the light blocking structures 1212*a*, eliminate the flare in a specific angle, so that the clarity of the image can be kept. An auxiliary V-shaped groove 1213*c* can be formed between each two of the auxiliary light blocking structures 1213*b*, the auxiliary V-shaped groove 1213*c* has an angle θ', and the following condition can be satisfied: 0 degrees<θ'<90 degrees. In detail the following conditions of the Table 2 are satisfied.

TABLE 2

| 4th example of the 1st embodiment | | | | | |
|---|---|---|---|---|---|
| Nr | 58 | θ (degrees) | 60 | θ' (degrees) | 59 |

Figure 2E:
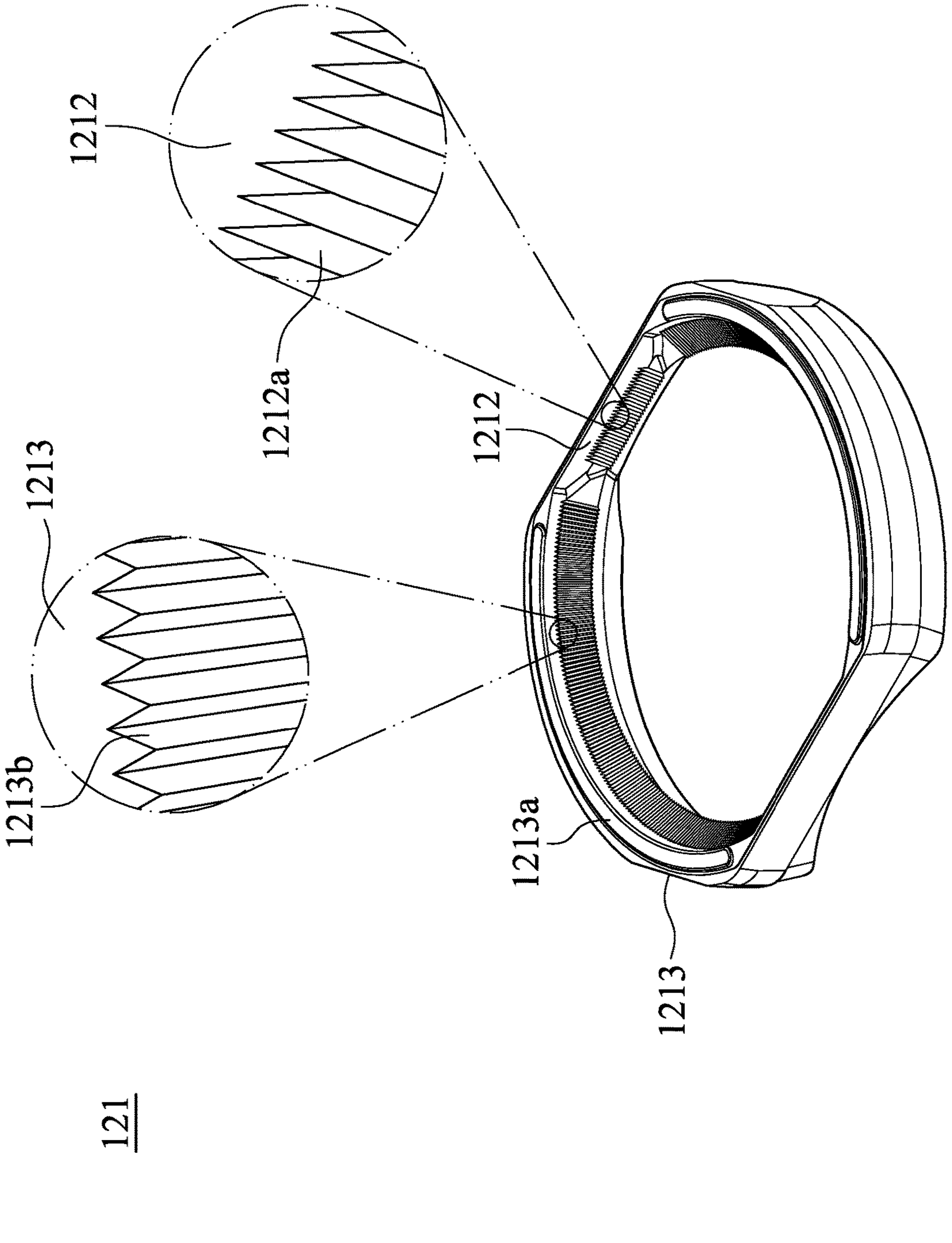
FIG. 2E is a partial enlarged view of the light blocking structures according to the 5th example of the 1st embodiment of FIG. 2A.
Figure 2F:
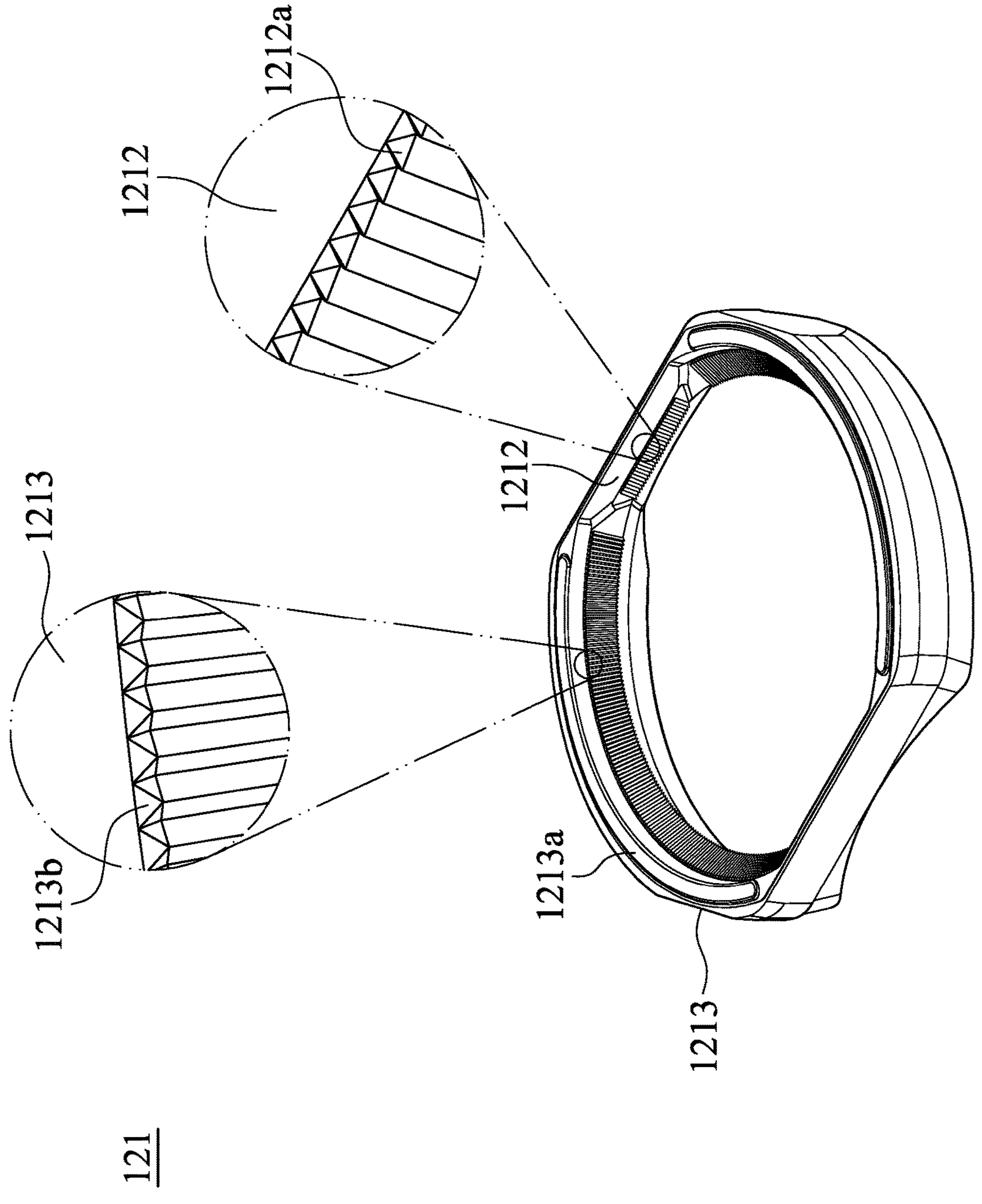
FIG. 2F is a partial enlarged view of the light blocking structures according to the 6th example of the 1st embodiment of FIG. 2A.

Please refer to FIG. 2E and FIG. 2F. FIG. 2E is a partial enlarged view of the light blocking structures 1212*a* according to the 5th example of the 1st embodiment of FIG. 2A. FIG. 2F is a partial enlarged view of the light blocking structures 1212*a* according to the 6th example of the 1st embodiment of FIG. 2A. In FIG. 2E and FIG. 2F, the difference between the 5th example, the 6th example and the 4th example are the type of the end of the light blocking structures 1212*a* and the type of the end of the auxiliary light blocking structures 1213*b*, other structures and features can be the same or similar to the 4th example, and will not be described again.

Figure 3A:
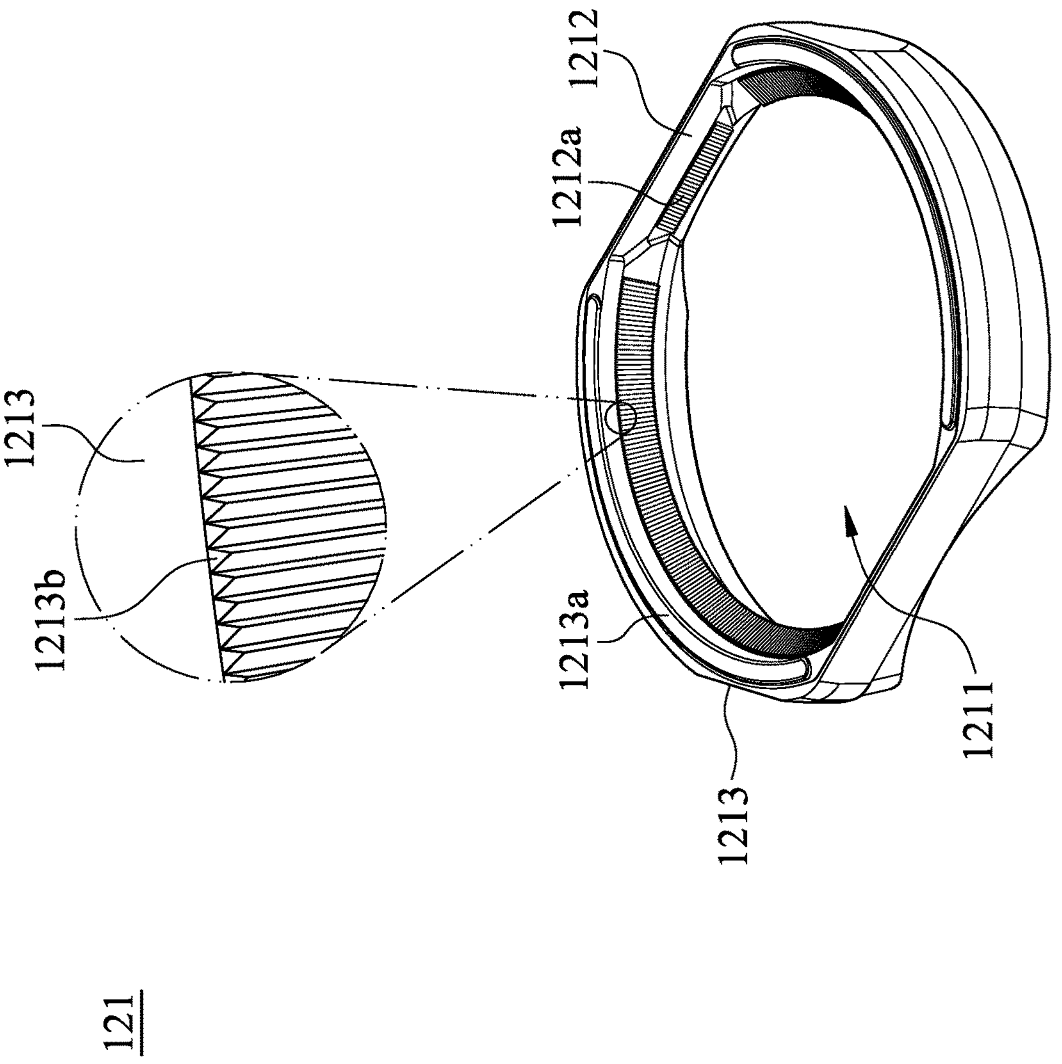
FIG. 3A is a schematic view of the radial reduction light blocking element according to the 7th example of the 1st embodiment of FIG. 1A.
Figure 3B:
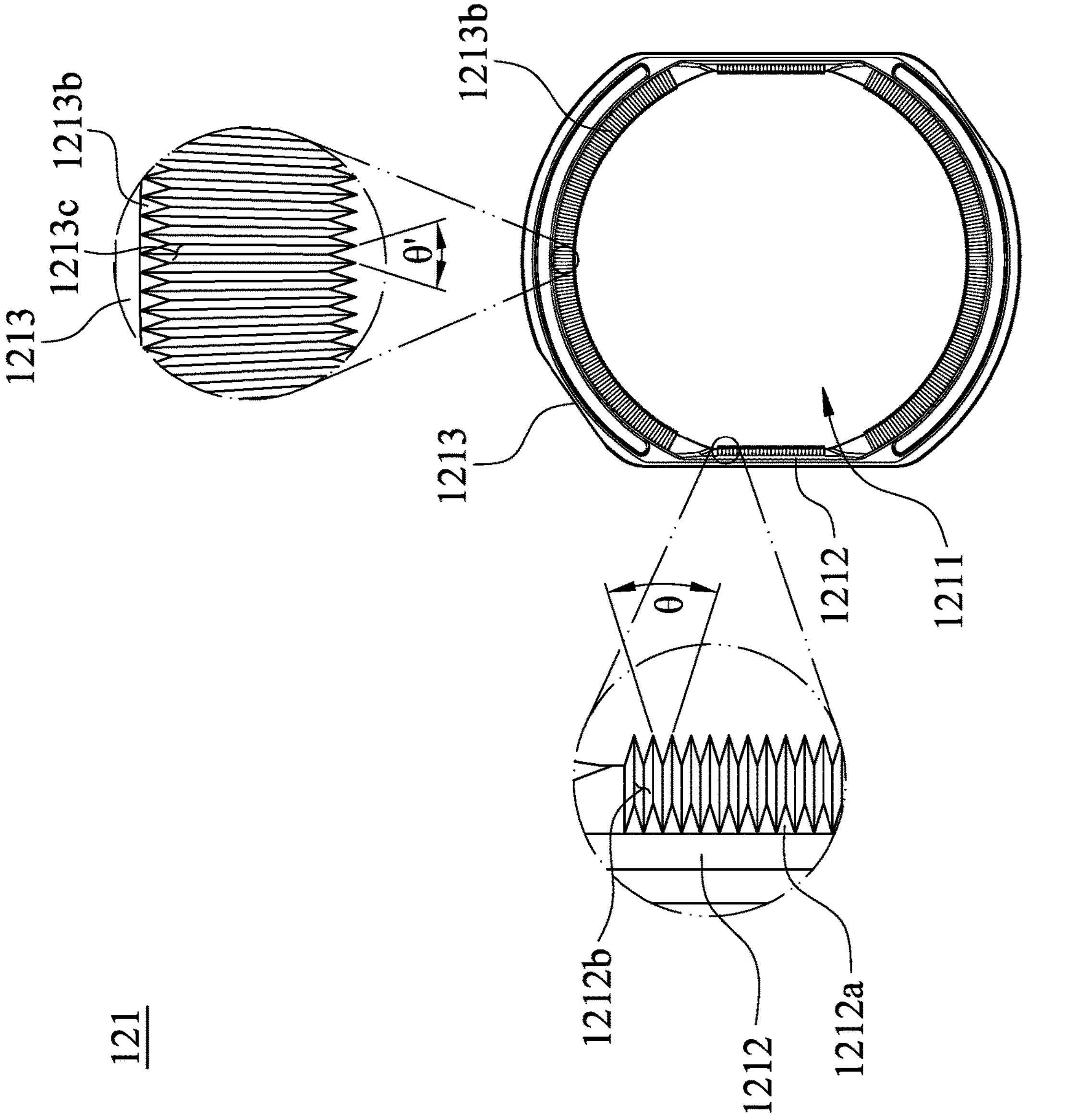
FIG. 3B is a partial enlarged view of the radial reduction light blocking element according to the 7th example of the 1st embodiment of FIG. 3A.
Figure 3D:
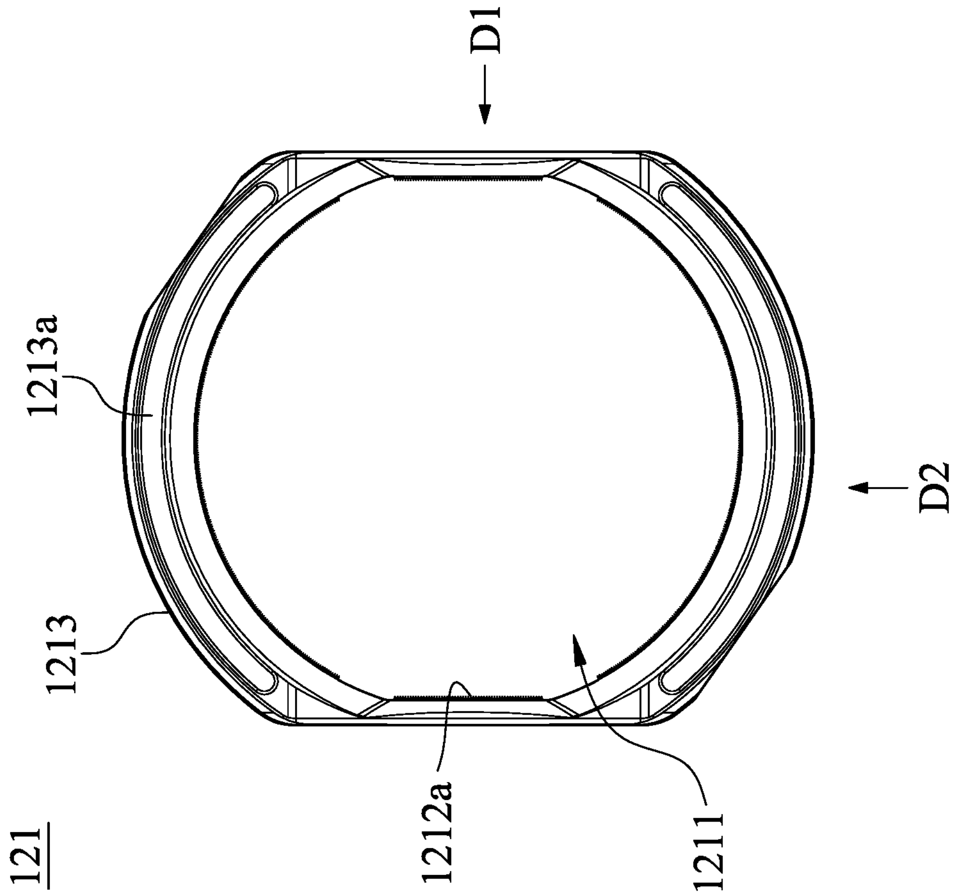
FIG. 3D is a plane view of the radial reduction light blocking element according to the 7th example of the 1st embodiment of FIG. 3A.
Figure 3C:
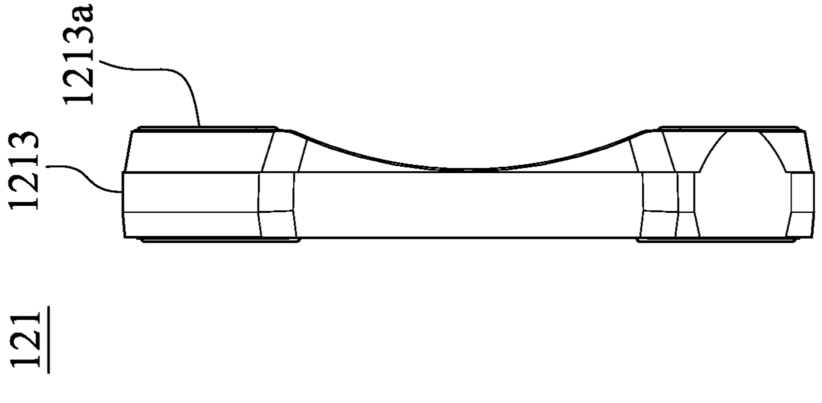
FIG. 3C is a side view of the radial reduction light blocking element according to the 7th example of the 1st embodiment of FIG. 3A.

Please refer to FIG. 3A to FIG. 3D. FIG. 3A is a schematic view of the radial reduction light blocking element 121 according to the 7th example of the 1st embodiment of FIG. 1A. FIG. 3B is a partial enlarged view of the radial reduction light blocking element 121 according to the 7th example of the 1st embodiment of FIG. 3A. FIG. 3C is a side view of the radial reduction light blocking element 121 according to the 7th example of the 1st embodiment of FIG. 3A. FIG. 3D is a plane view of the radial reduction light blocking element 121 according to the 7th example of the 1st embodiment of FIG. 3A. In FIG. 3A to FIG. 3D, the number of the light blocking structures 1212*a* is Nr, the V-shaped groove 1212*b* has an angle θ, and the following condition can be satisfied: 30 degrees<θ<65 degrees. The angle of the auxiliary V-shaped groove 1213*c* is θ' and the following condition can be satisfied: 30 degrees<θ'<65 degrees. In detail, the following conditions of the Table 3 are satisfied.

TABLE 3

| 7th example of the 1st embodiment | | | | | |
|---|---|---|---|---|---|
| Nr | 114 | θ (degrees) | 35 | θ' (degrees) | 34.5 |

Figure 3E:
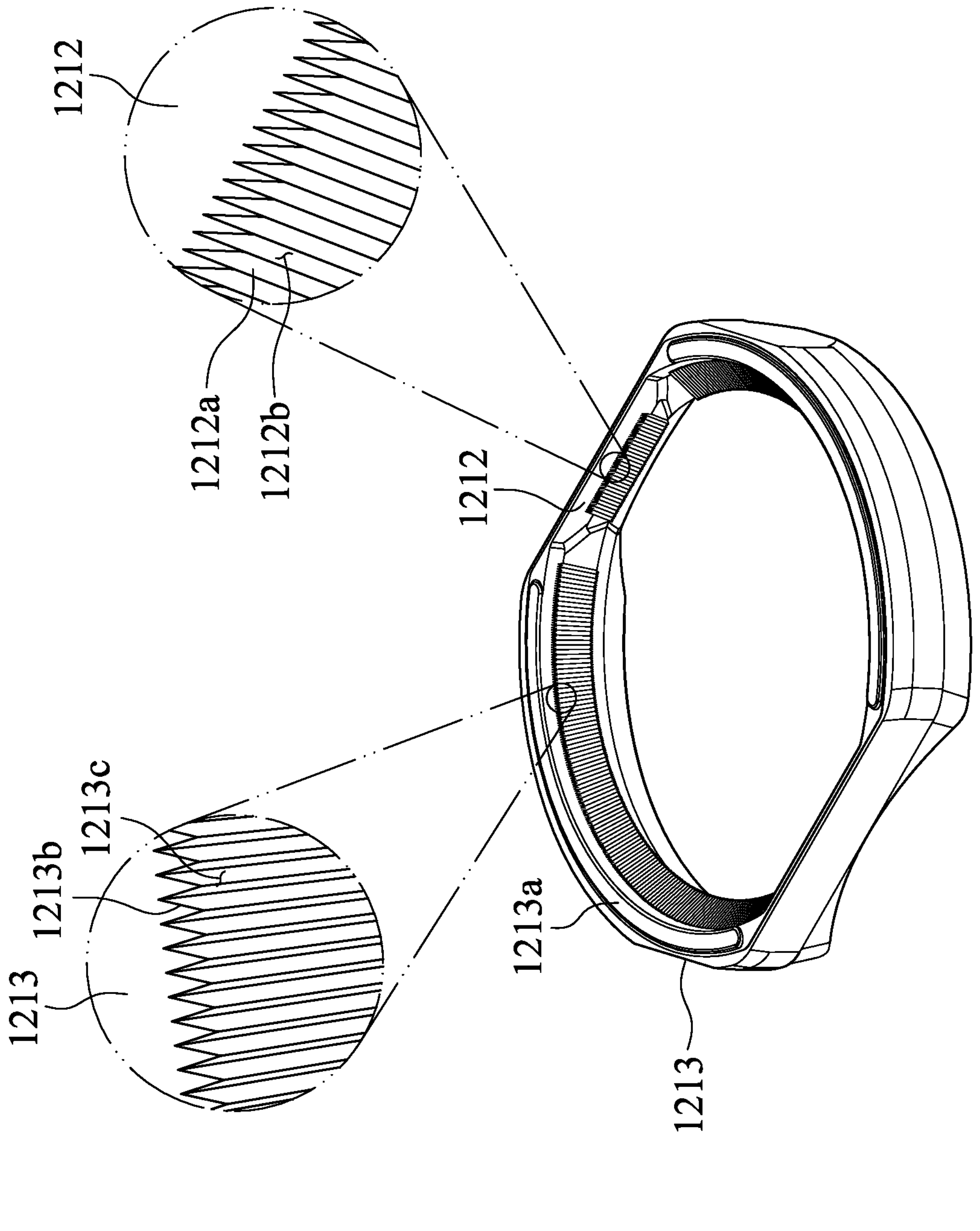
FIG. 3E is a partial enlarged view of the light blocking structures according to the 8th example of the 1st embodiment of FIG. 3A.
Figure 3F:
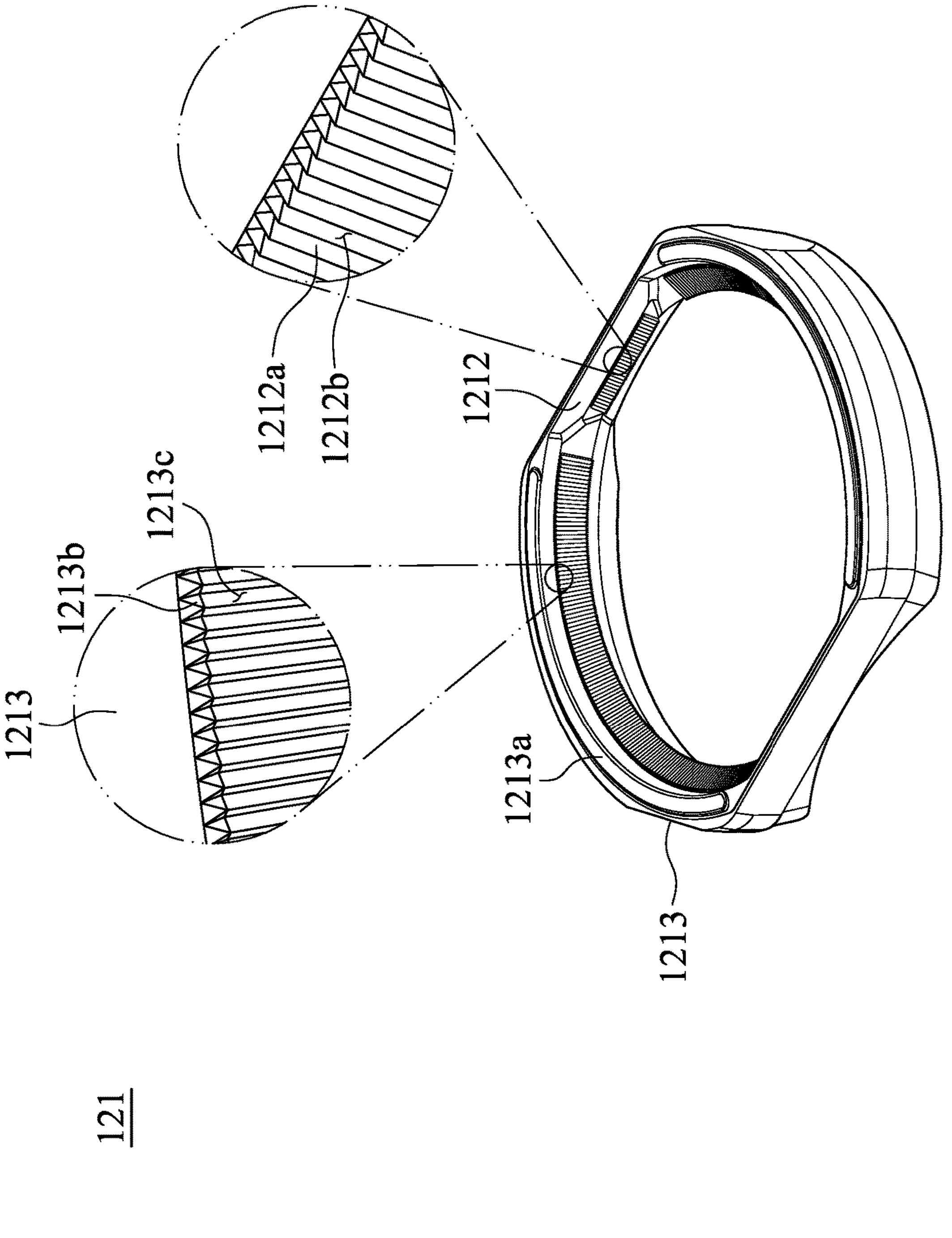
FIG. 3F is a partial enlarged view of the light blocking structures according to the 9th example of the 1st embodiment of FIG. 3A.

Please refer to FIG. 3E and FIG. 3F. FIG. 3E is a partial enlarged view of the light blocking structures 1212*a* according to the 8th example of the 1st embodiment of FIG. 3A. FIG. 3F is a partial enlarged view of the light blocking structures 1212*a* according to the 9th example of the 1st embodiment of FIG. 3A. In FIG. 3E and FIG. 3F, the difference between the 8th example, the 9th example and the 7th example are the type of the end of the light blocking structures 1212*a* and the type of the end of the auxiliary light blocking structures 1213*b*, other structures and features can be the same or similar to the 7th example, and will not be described again.

Figure 4A:
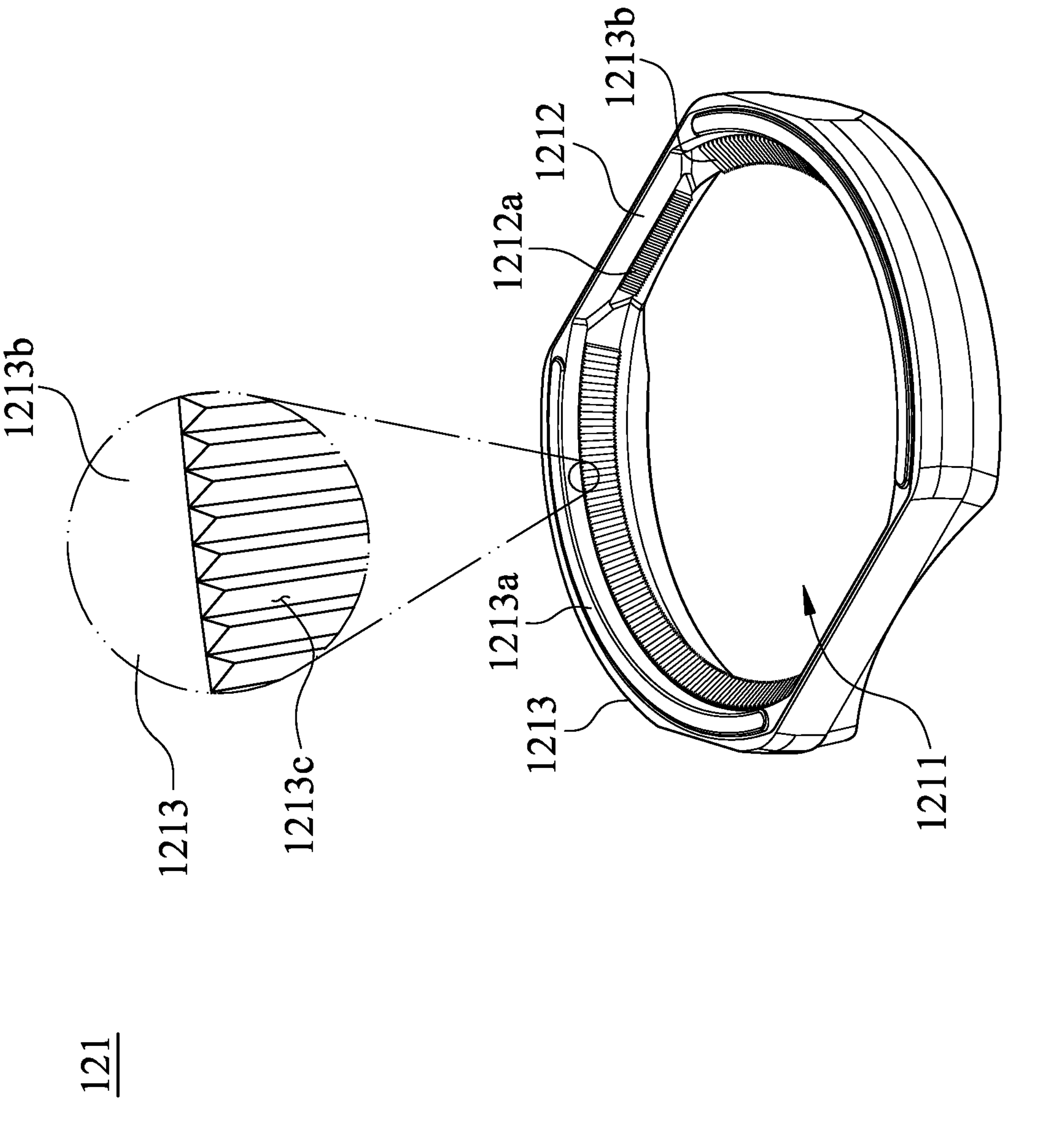
FIG. 4A is a schematic view of the radial reduction light blocking element according to the 10th example of the 1st embodiment of FIG. 1A.
Figure 4B:
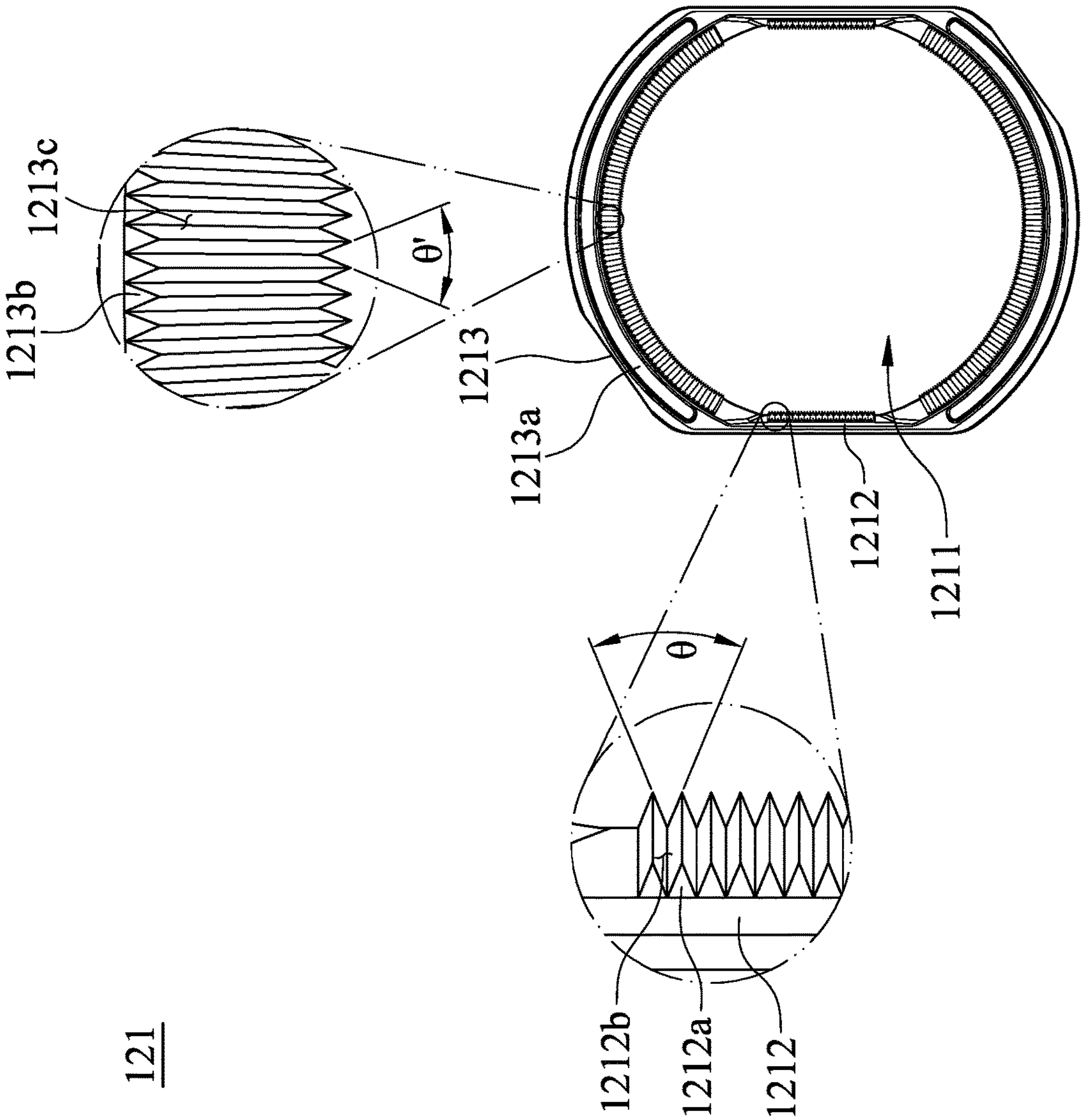
FIG. 4B is a partial enlarged view of the radial reduction light blocking element according to the 10th example of the 1st embodiment of FIG. 4A.
Figure 4D:
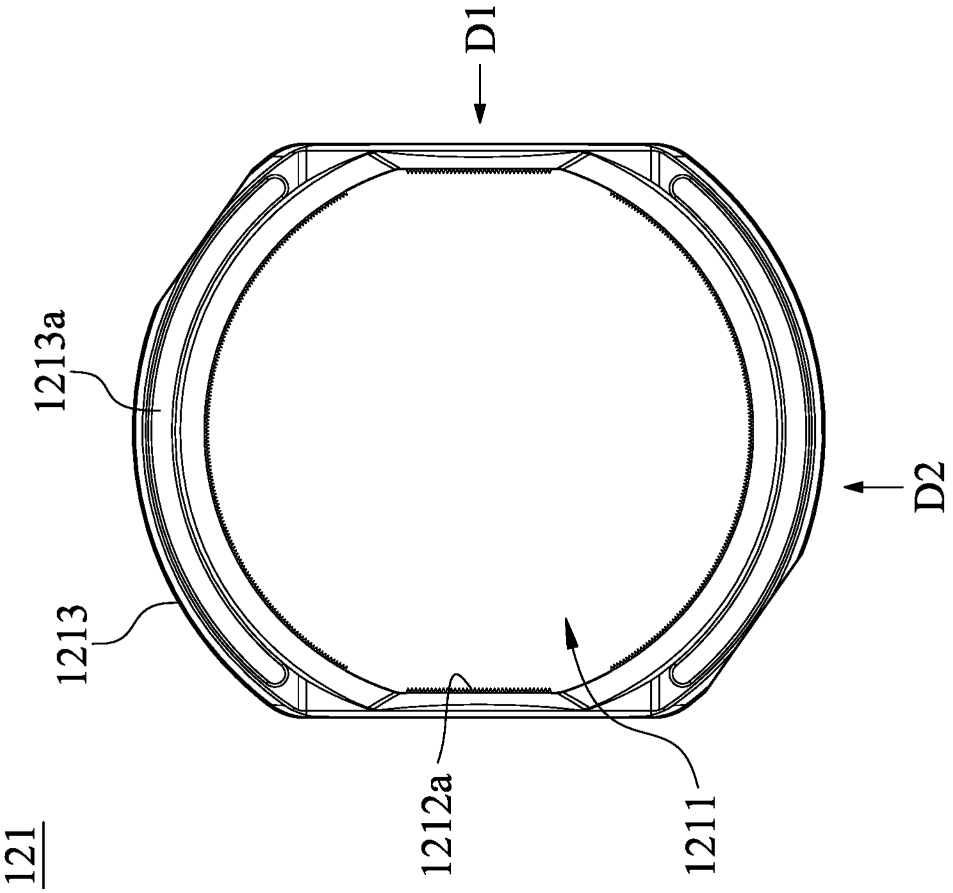
FIG. 4D is a plane view of the radial reduction light blocking element according to the 10th example of the 1st embodiment of FIG. 4A.
Figure 4C:
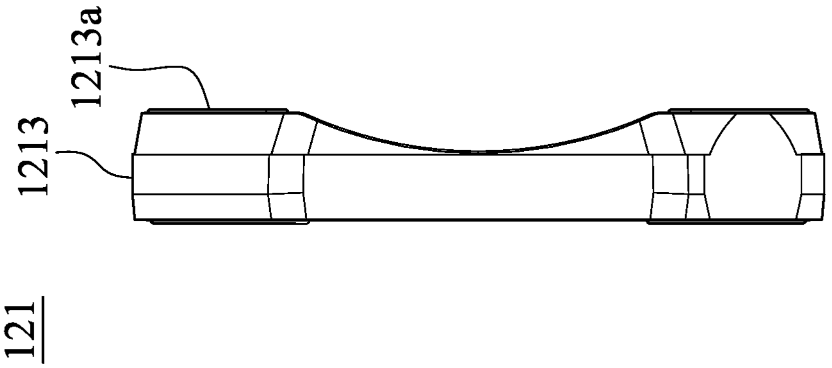
FIG. 4C is a side view of the radial reduction light blocking element according to the 10th example of the 1st embodiment of FIG. 4A.

Please refer to FIG. 4A to FIG. 4D. FIG. 4A is a schematic view of the radial reduction light blocking element 121 according to the 10th example of the 1st embodiment of FIG. 1A. FIG. 4B is a partial enlarged view of the radial reduction light blocking element 121 according to the 10th example of the 1st embodiment of FIG. 4A. FIG. 4C is a side view of the radial reduction light blocking element 121 according to the 10th example of the 1st embodiment of FIG. 4A. FIG. 4D is a plane view of the radial reduction light blocking element 121 according to the 10th example of the 1st embodiment of FIG. 4A. The number of the light blocking structures 1212*a* is Nr, the V-shaped groove 1212*b* has an angle θ, and the following condition can be satisfied: 30 degrees<θ<65 degrees. The angle of the auxiliary V-shaped groove 1213*c* is θ' and the following condition can be satisfied: 30 degrees<θ'<65 degrees. In detail, the following conditions of the Table 4 are satisfied.

TABLE 4

| 10th example of the 1st embodiment | | | | | |
|---|---|---|---|---|---|
| Nr | 74 | θ (degrees) | 45 | θ' (degrees) | 44.25 |

Figure 4E:
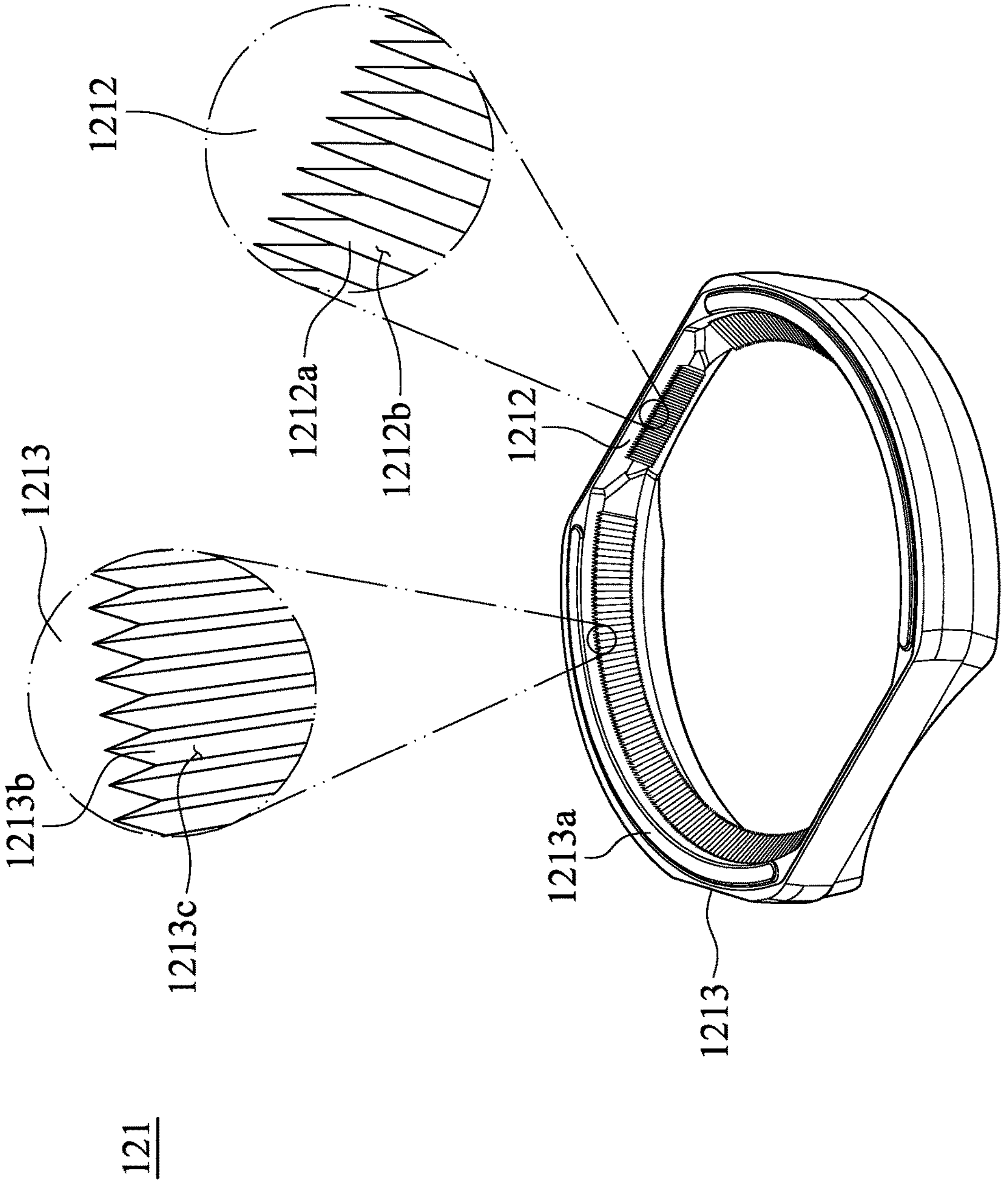
FIG. 4E is a partial enlarged view of the light blocking structures according to the 11th example of the 1st embodiment of FIG. 4A.
Figure 4F:
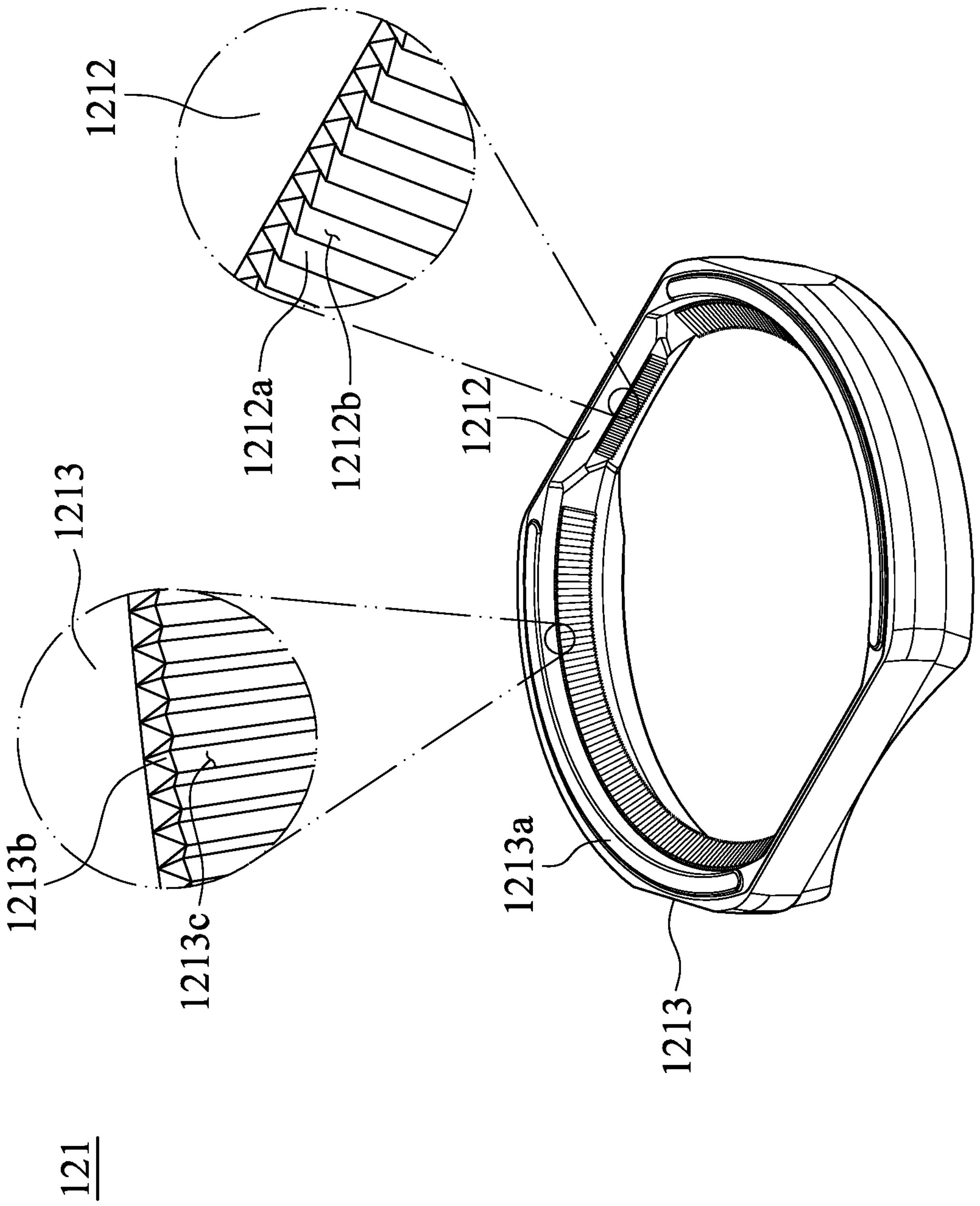
FIG. 4F is a partial enlarged view of the light blocking structures according to the 12th example of the 1st embodiment of FIG. 4A.

Please refer to FIG. 4E and FIG. 4F. FIG. 4E is a partial enlarged view of the light blocking structures 1212*a* according to the 11th example of the 1st embodiment of FIG. 4A. FIG. 4F is a partial enlarged view of the light blocking structures 1212*a* according to the 12th example of the 1st embodiment of FIG. 4A. In FIG. 4E and FIG. 4F, the difference between the 11th example, the 12th example and the 10th example are the type of the end of the light blocking structures 1212*a* and the type of the end of the auxiliary light blocking structures 1213*b*, other structures and features can be the same or similar to the 10th example, and will not be described again.

2nd Embodiment

Figure 5A:
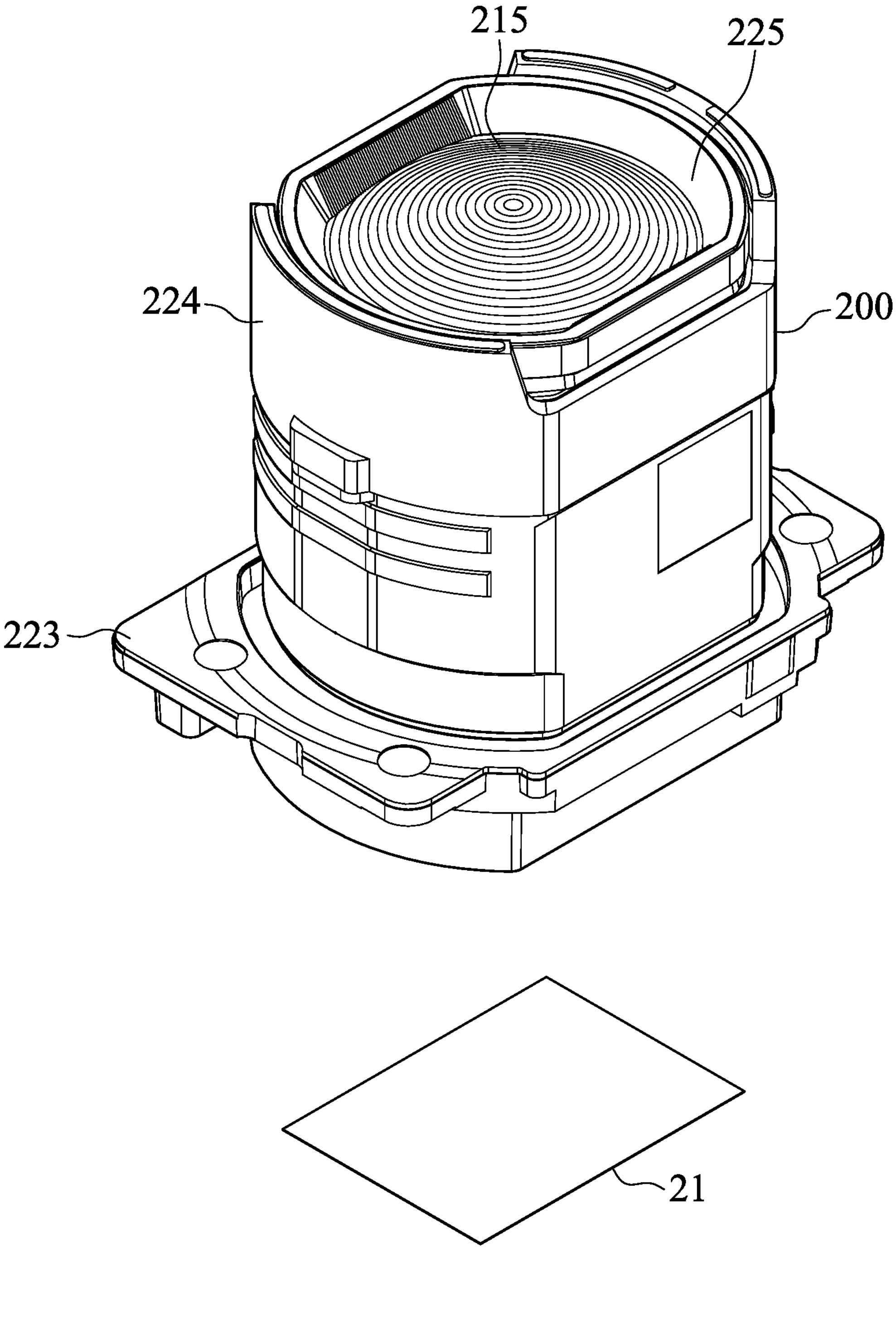
FIG. 5A is a schematic view of a camera module according to the 1st example of the 2nd embodiment of the present disclosure.
Figure 5B:
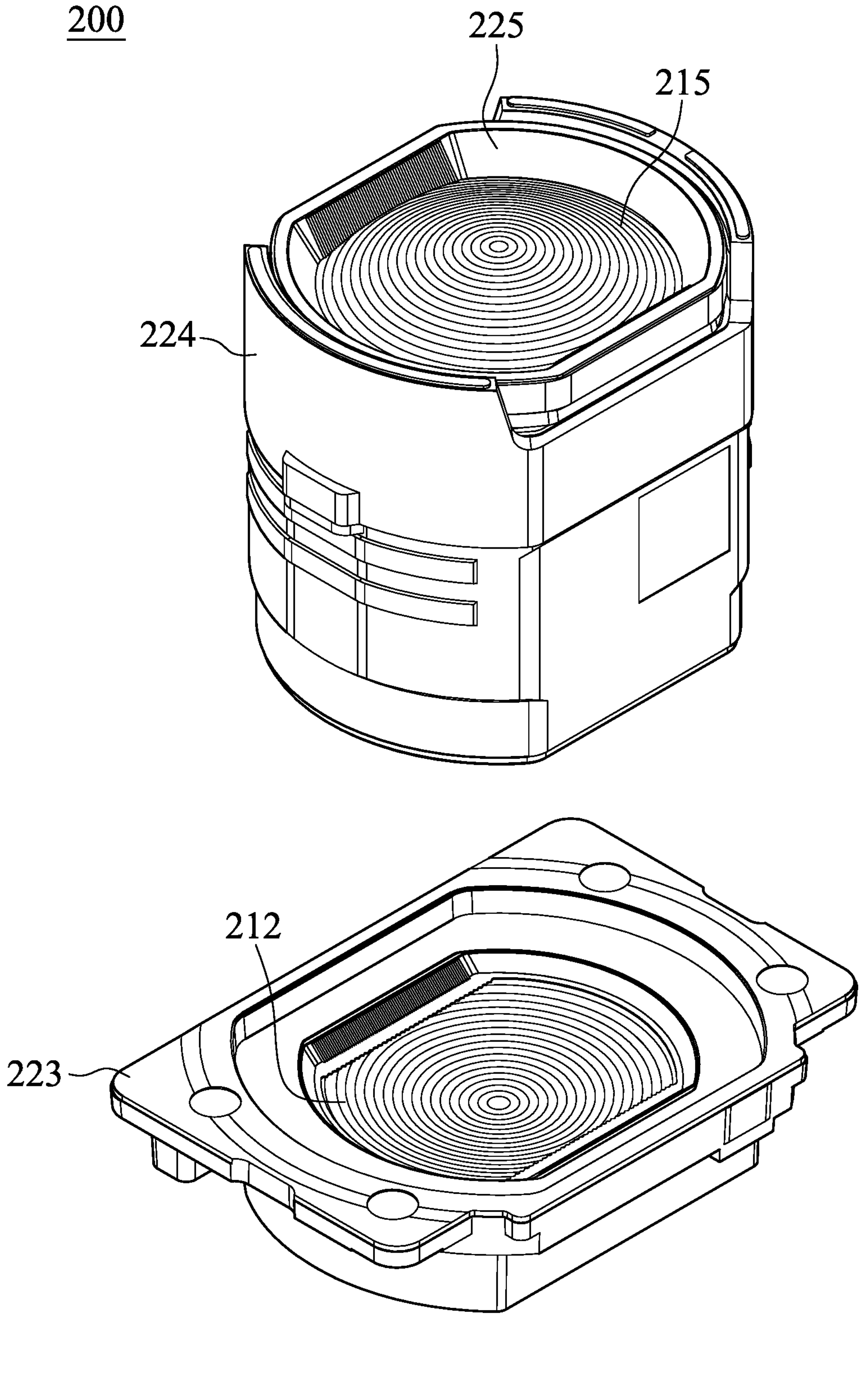
FIG. 5B is a breakdown view of an imaging lens assembly according to the 1st example of the 2nd embodiment of FIG. 5A.
Figure 5C:
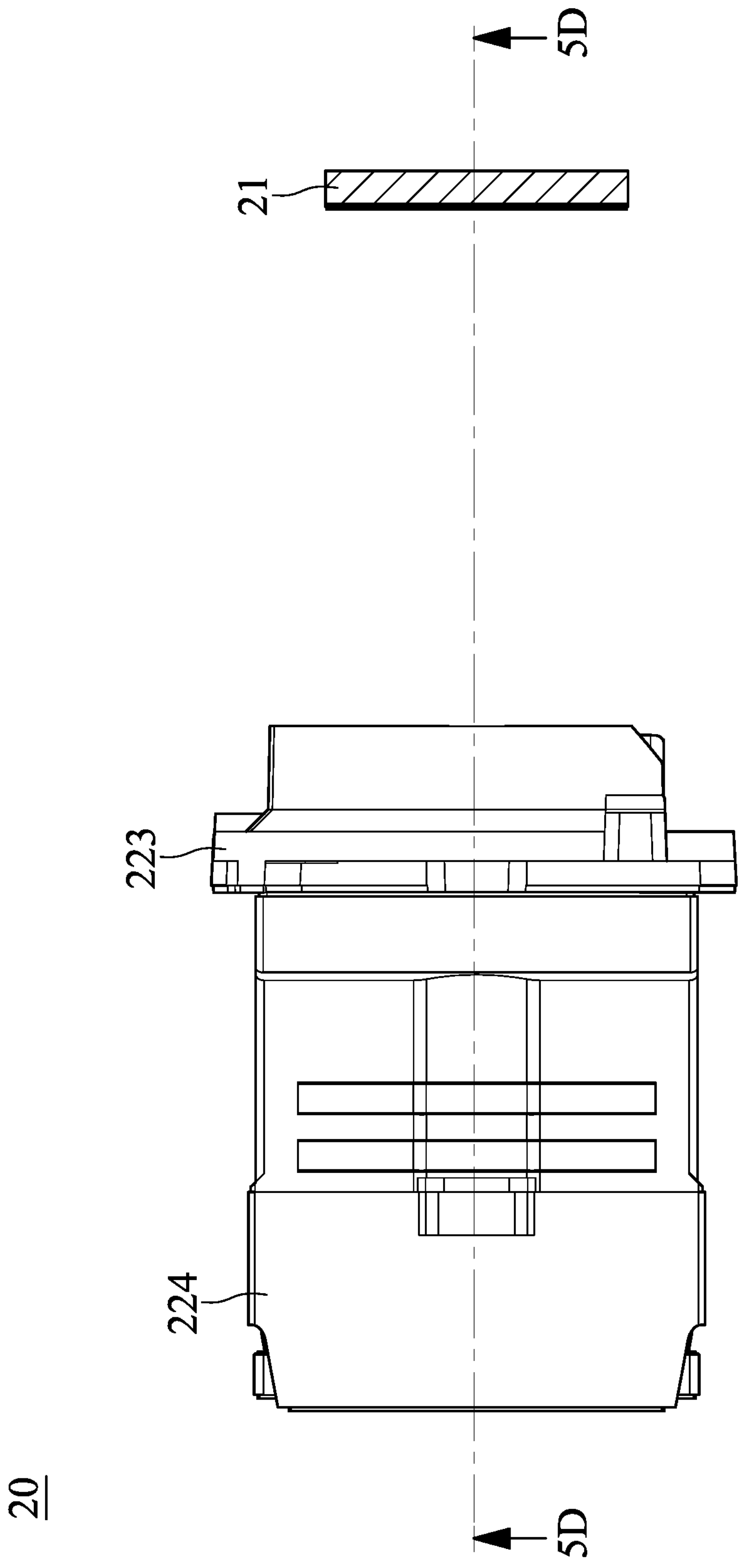
FIG. 5C is a plane view of the camera module according to the 1st example of the 2nd embodiment of FIG. 5A.

Please refer to FIG. 5A to FIG. 5F. FIG. 5A is a schematic view of a camera module 20 according to the 1st example of the 2nd embodiment of the present disclosure. FIG. 5B is a breakdown view of an imaging lens assembly 200 according to the 1st example of the 2nd embodiment of FIG. 5A. FIG.

Figure 5D:
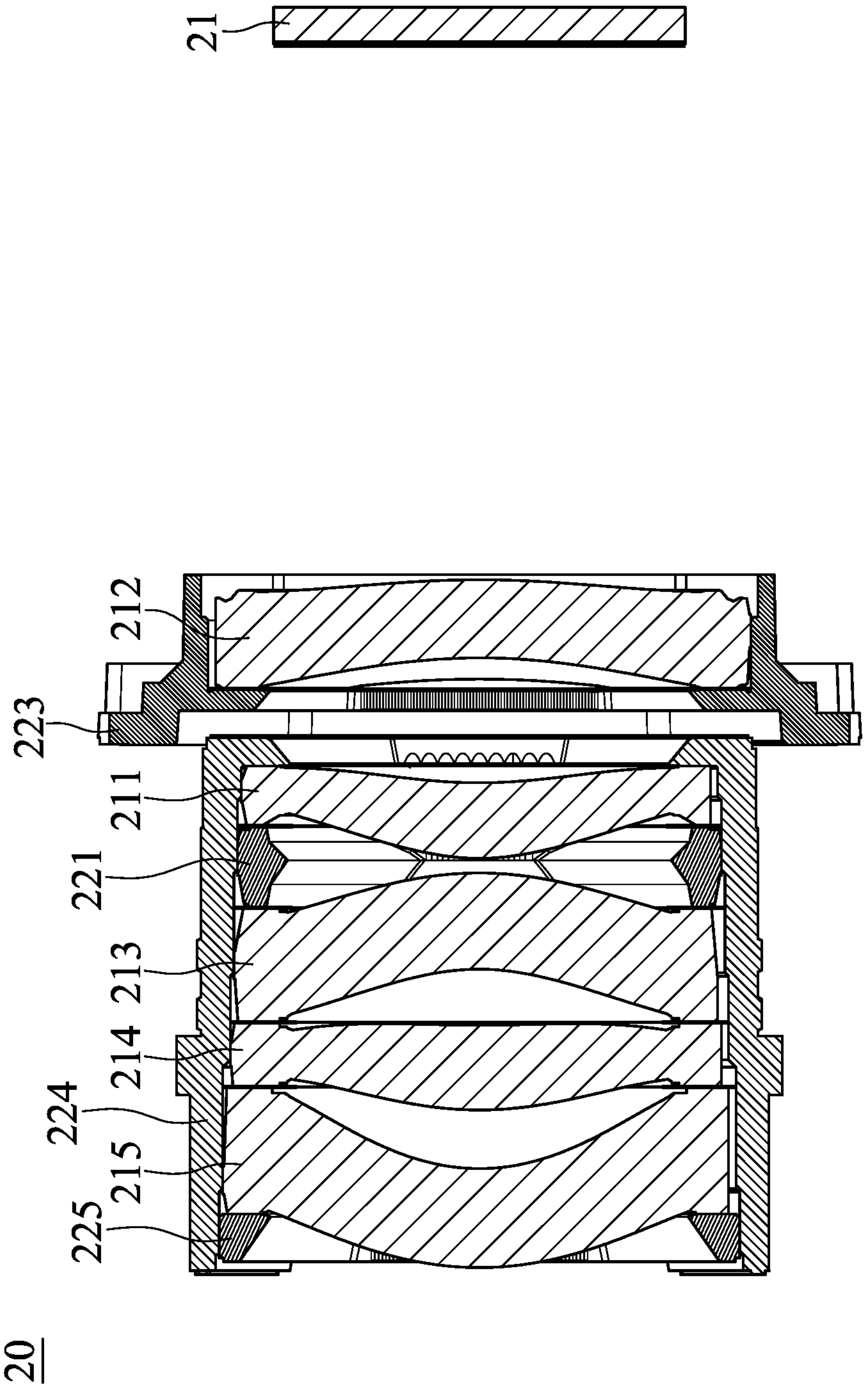
FIG. 5D is a cross-sectional view of the camera module according to the 1st example of the 2nd embodiment along line 5D-5D in FIG. 5C.
Figure 5E:
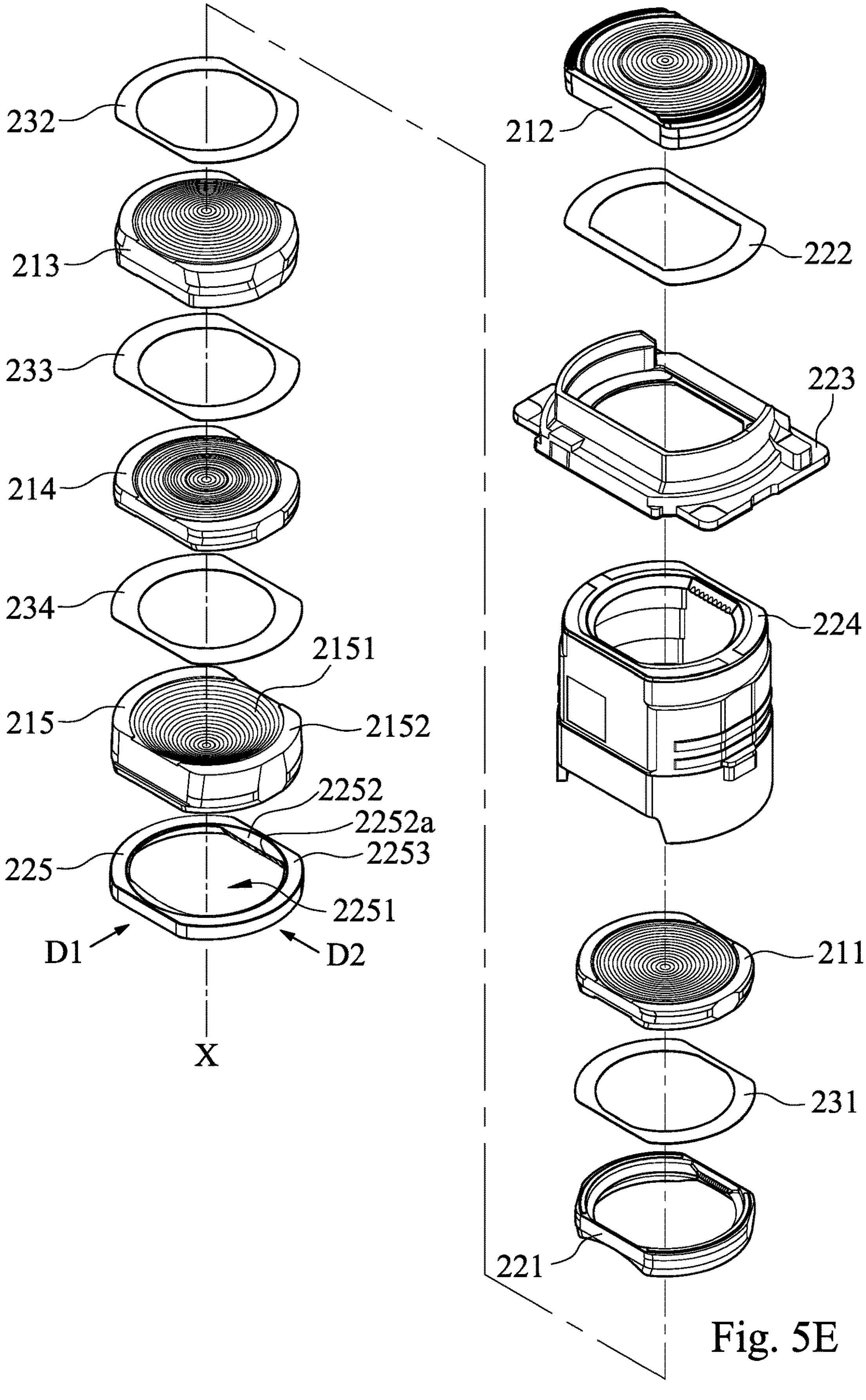
FIG. 5E is an exploded view of the imaging lens assembly according to the 1st example of the 2nd embodiment of FIG. 5A.
Figure 5F:
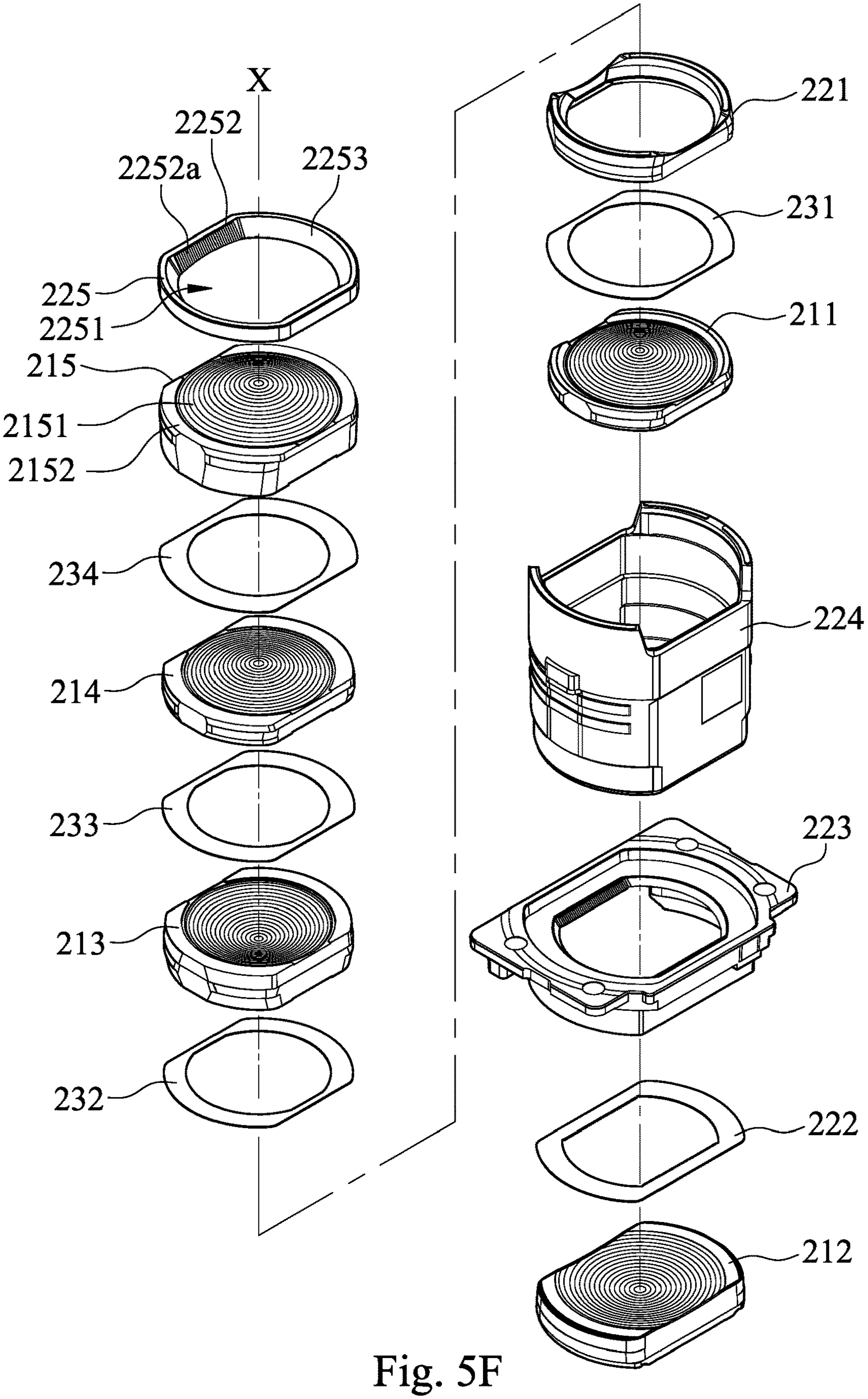
FIG. 5F is another exploded view of the imaging lens assembly according to the 1st example of the 2nd embodiment of FIG. 5A.

5C is a plane view of the camera module 20 according to the 1st example of the 2nd embodiment of FIG. 5A. FIG. 5D is a cross-sectional view of the camera module 20 according to the 1st example of the 2nd embodiment along line 5D-5D in FIG. 5C. FIG. 5E is an exploded view of the imaging lens assembly 200 according to the 1st example of the 2nd embodiment of FIG. 5A. FIG. 5F is another exploded view of the imaging lens assembly 200 according to the 1st example of the 2nd embodiment of FIG. 5A. In FIG. 5A to FIG. 5F, the camera module 20 includes the imaging lens assembly 200 and an image sensor 21. The image sensor 21 is disposed on an image surface (its reference numeral is omitted) of the imaging lens assembly 200. The imaging lens assembly 200 has an optical axis X, and includes a plurality of optical elements (their reference numerals are omitted). The optical axis X passes through the optical elements.

In FIG. 5D, FIG. 5E and FIG. 5F, the optical elements of the 1st example of the 2nd embodiment includes a barrel 224, five radial reduction lens elements 211, 212, 213, 214, 215, four radial reduction light blocking elements 221, 222, 223, 225 and four light blocking sheets 231, 232, 233, 234. In detail, the radial reduction light blocking element 225 connects around an object side of the barrel 224, the radial reduction lens element 215, the light blocking sheet 234, the radial reduction lens element 214, the light blocking sheet 233, the radial reduction lens element 213, the light blocking sheet 232, the radial reduction light blocking element 221, the light blocking sheet 231, the radial reduction lens element 211 are disposed in the barrel 224 in order from the object side to an image side. The radial reduction light blocking element 222 and the radial reduction lens element 212 are accommodated in the radial reduction light blocking element 223, and the radial reduction light blocking element 223 is connected to the image side of the barrel 224. In particular, the optical features such as numbers, structures, surface shapes and so on of each of the optical elements can be disposed according to different imaging demand, and the optical features are not limited thereto.

The radial reduction light blocking element 225 includes a central opening 2251, a radial reduction part 2252 and a receiving portion 2253. The radial reduction part 2252 is reduced from a surface of the radial reduction light blocking element 225 towards the optical axis X along a direction D1 vertical to the optical axis X, so that the central opening 2251 is non-circular. The radial reduction part 2252 includes a plurality of light blocking structures **2252*a*. The light blocking structures 2252*a* are arranged along a direction D2 vertical to the optical axis X, and each of the light blocking structures 2252*a*** extends toward a direction close to the optical axis X.

Figure 5G:
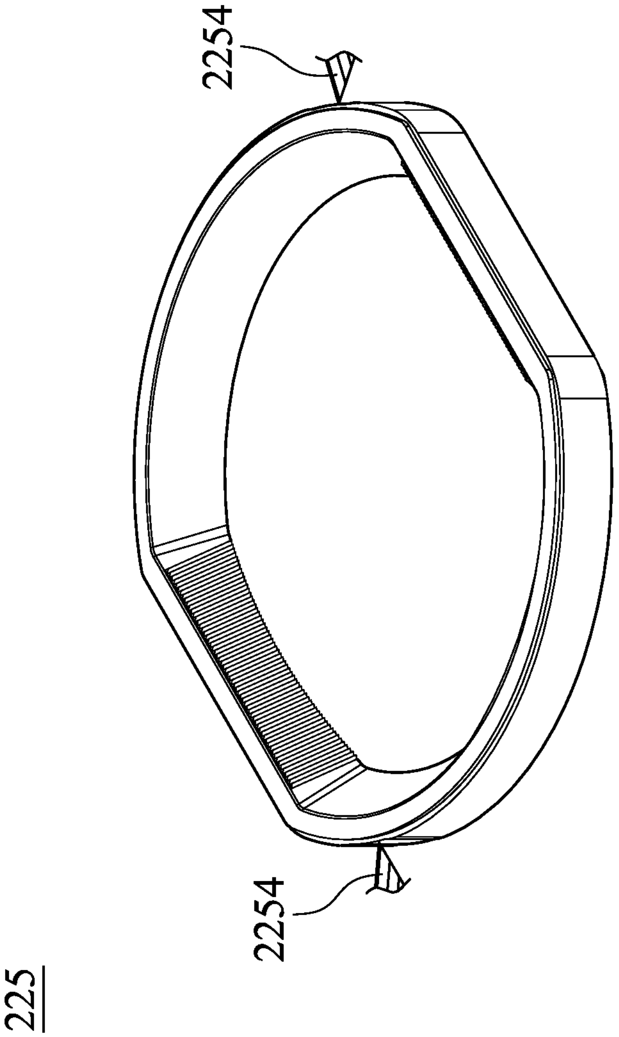
FIG. 5G is a schematic view of the radial reduction light blocking element according to the 1st example of the 2nd embodiment of FIG. 5F.
Figure 5H:
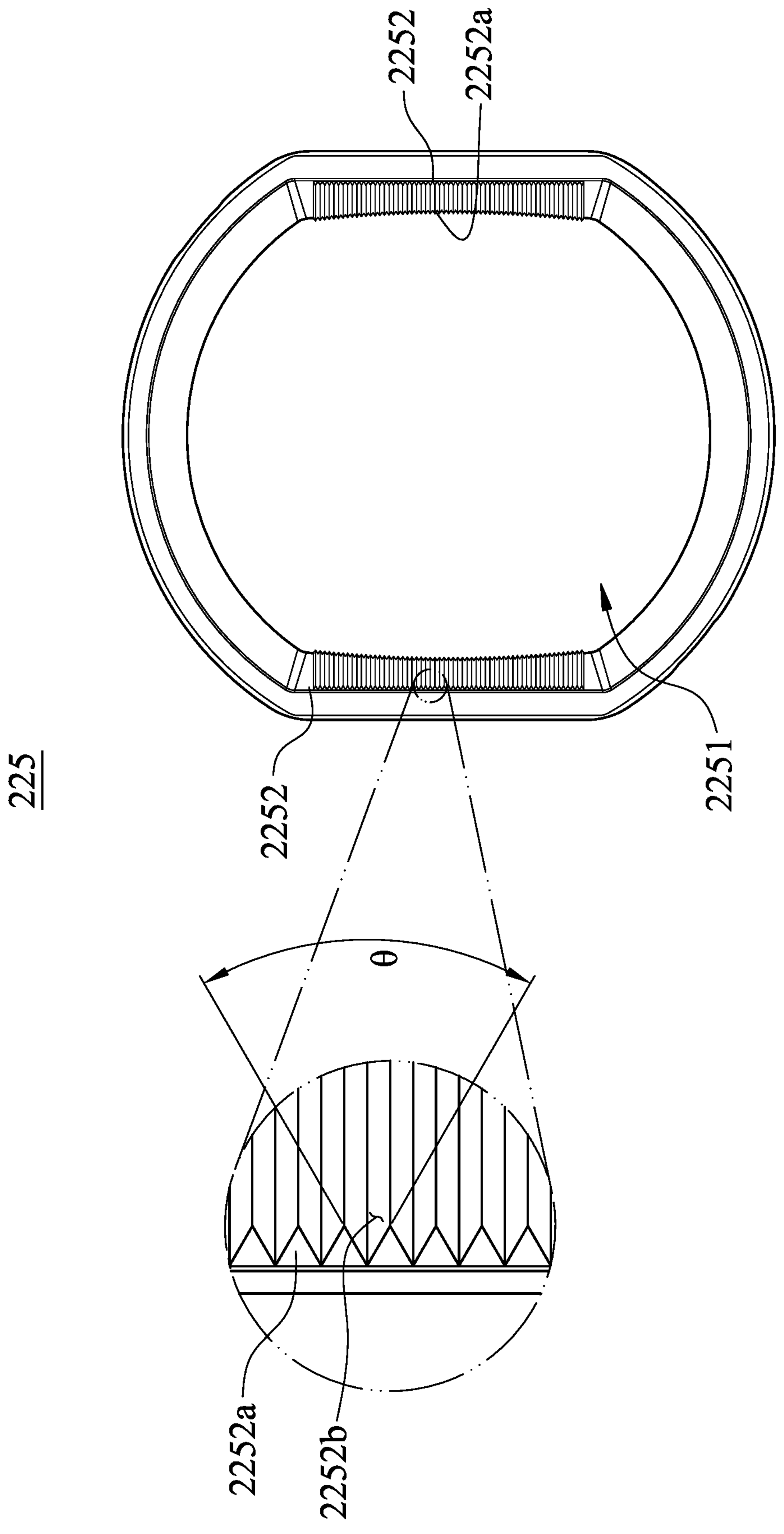
FIG. 5H is a partial enlarged view of the radial reduction light blocking element according to the 1st example of the 2nd embodiment of FIG. 5G.
Figure 5J:
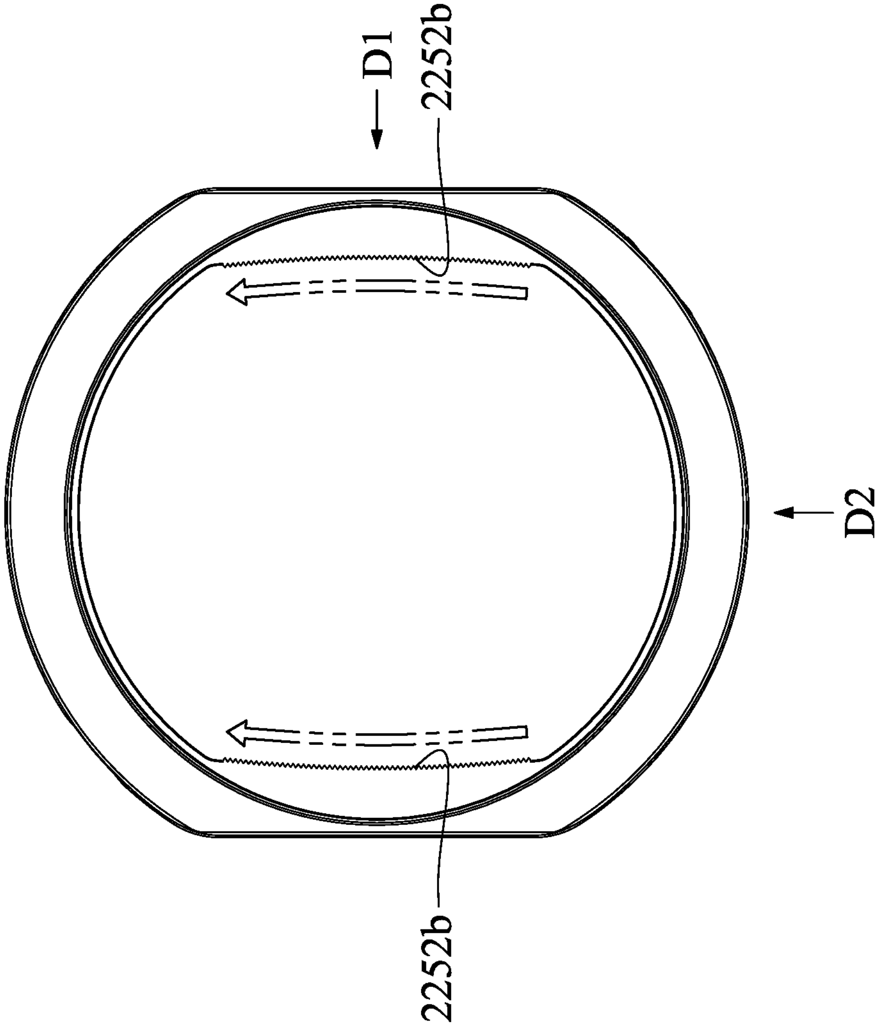
FIG. 5J is a plane view of the radial reduction light blocking element according to the 1st example of the 2nd embodiment of FIG. 5E.
Figure 5I:
FIG. 5I is a side view of the radial reduction light blocking element according to the 1st example of the 2nd embodiment of FIG. 5G.

Please refer to FIG. 5G, FIG. 5H, FIG. 5I and FIG. 5J. FIG. 5G is a schematic view of the radial reduction light blocking element 225 according to the 1st example of the 2nd embodiment of FIG. 5F. FIG. 5H is a partial enlarged view of the radial reduction light blocking element 225 according to the 1st example of the 2nd embodiment of FIG. 5G. FIG. 5I is a side view of the radial reduction light blocking element 225 according to the 1st example of the 2nd embodiment of FIG. 5G. FIG. 5J is a plane view of the radial reduction light blocking element 225 according to the 1st example of the 2nd embodiment of FIG. 5E.

Moreover, a V-shaped groove **2252*b* is formed between each two of the light blocking structures 2252*a*, an appearance of the V-shaped groove 2252*b* closest to the optical axis X is arranged in curvature along the direction D2 vertical to the optical axis X, while observing along the direction parallel to the optical axis X. In detail, the radial reduction light blocking element 225 can be a plastic injection molding spacer or retainer, and the wedge-shaped of each of the light blocking structures 2252*a* can be fabricated by transfer molding. A number of the light blocking structures 2252*a* is Nr, the V-shaped groove 2252*b*** has an angle θ. In detail, the following conditions of the Table 5 are satisfied.

TABLE 5

| 1st example of the 2nd embodiment | | | |
|---|---|---|---|
| Nr | 118 | θ (degrees) | 60 |

In detail, the radial reduction light blocking element 225 can be made of black plastic, and has two or more gate traces 2254, but the present disclosure is not limited thereto.

Figure 6A:
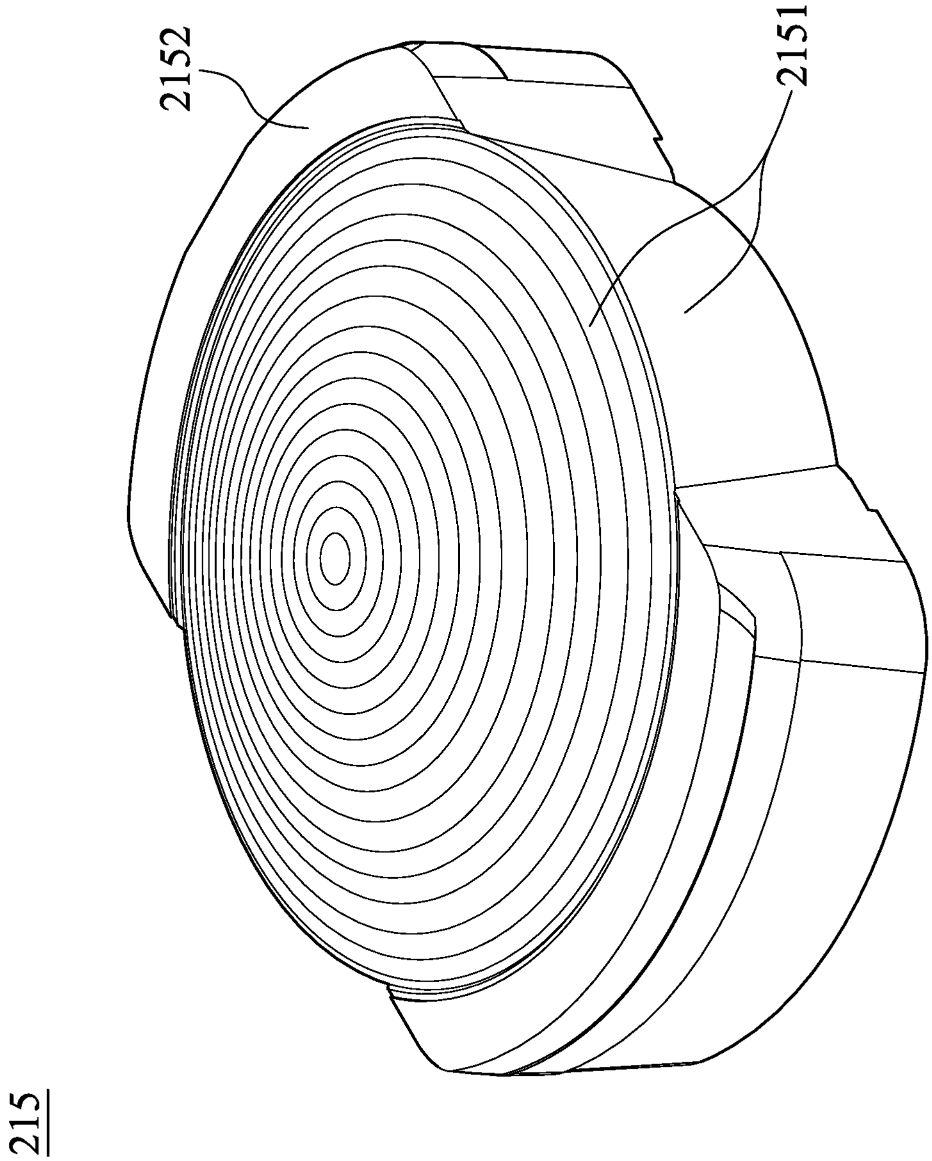
FIG. 6A is a schematic view of the radial reduction lens element according to the 2nd example of the 2nd embodiment of FIG. 5F.
Figure 6B:
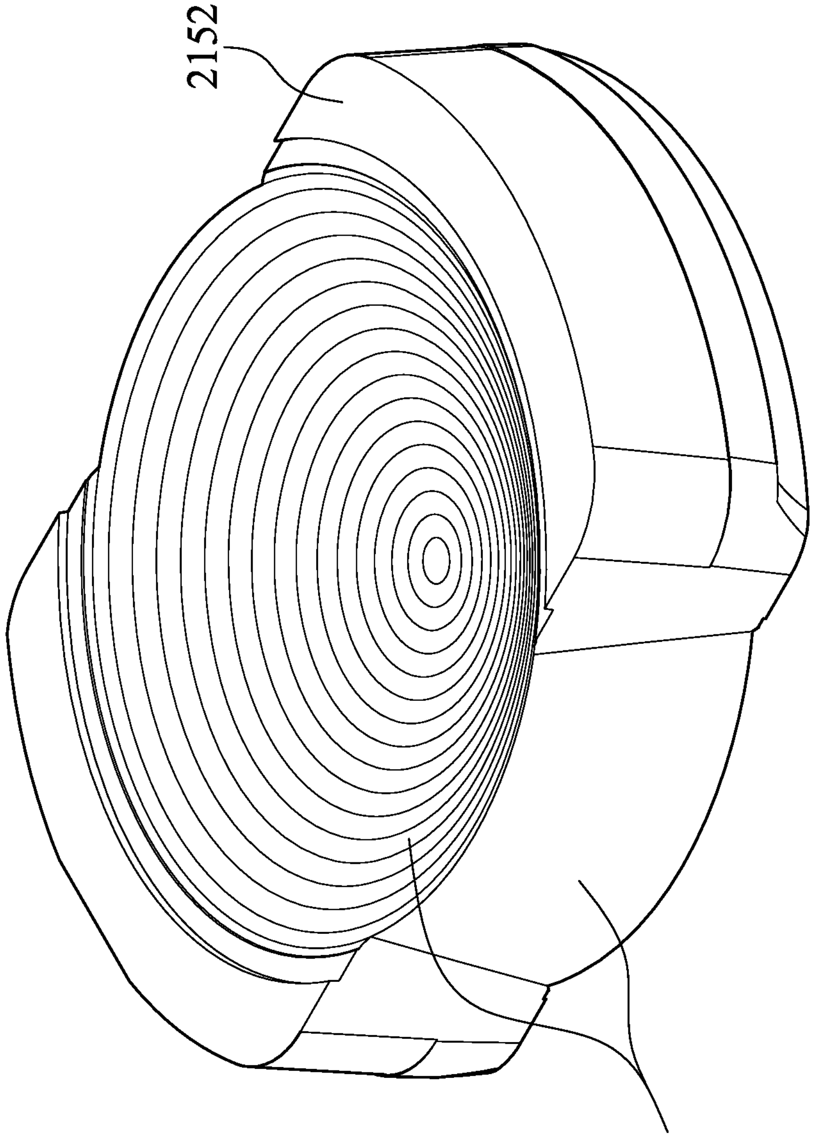
FIG. 6B is another schematic view of the radial reduction lens element according to the 2nd example of the 2nd embodiment of FIG. 6A.

Please refer to FIG. 6A and FIG. 6B. FIG. 6A is a schematic view of the radial reduction lens element 215 according to the 2nd example of the 2nd embodiment of FIG. 5F. FIG. 6B is another schematic view of the radial reduction lens element 215 according to the 2nd example of the 2nd embodiment of FIG. 6A. In FIG. 6A and FIG. 6B, an appearance of the radial reduction lens element 215 is non-circular observed along a direction parallel to the optical axis X. The radial reduction lens element 215 includes an optical effective portion 2151 and a peripheral portion 2152. The optical axis X passes through the optical effective portion 2151. The peripheral portion 2152 extends from the optical effective portion 2151 towards a direction away from the optical axis X, and is disposed around the optical effective portion 2151 along a circumferential direction of the optical axis X. An appearance of the radial reduction light blocking element 225 is non-circular observed along the direction parallel to the optical axis X.

In the 2nd example of the 2nd embodiment, the radial reduction lens element 215 is I-CUT, but the present disclosure is not limited thereto.

3rd Embodiment

Figure 7A:
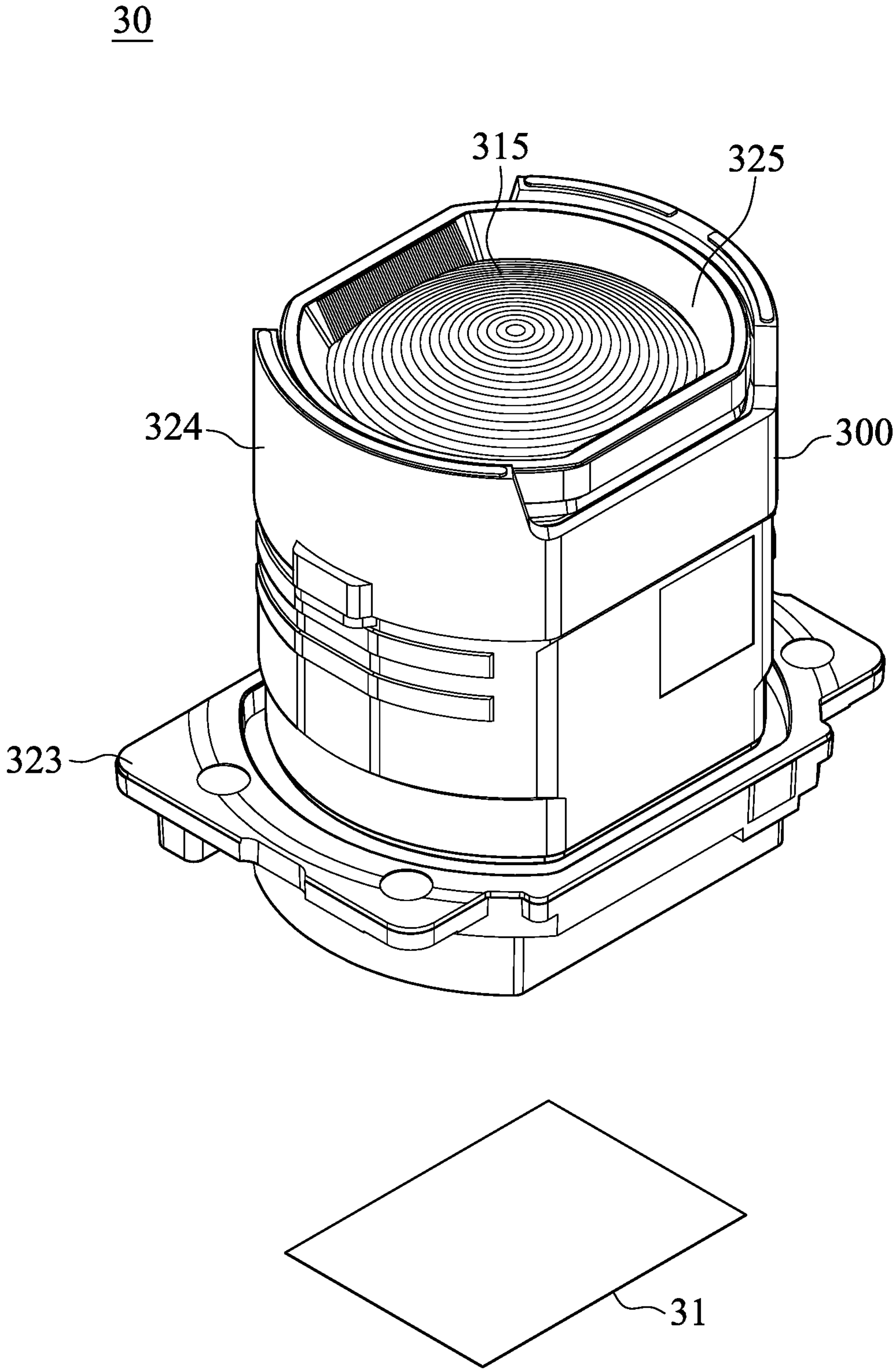
FIG. 7A is a schematic view of a camera module according to a 1st example of the 3rd embodiment of the present disclosure.
Figure 7B:
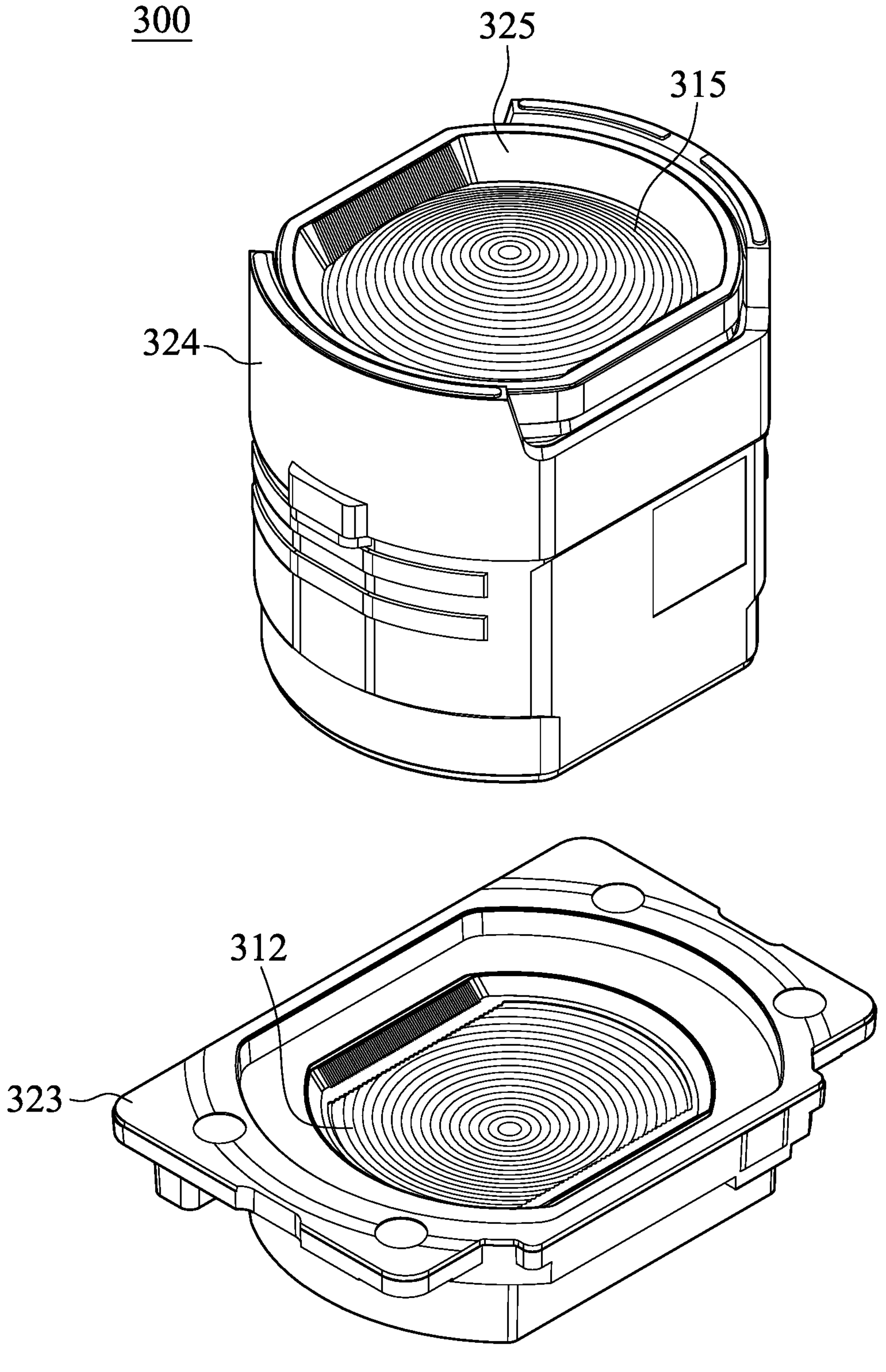
FIG. 7B is a breakdown view of an imaging lens assembly according to the 1st example of the 3rd embodiment of the present disclosure.
Figure 7C:
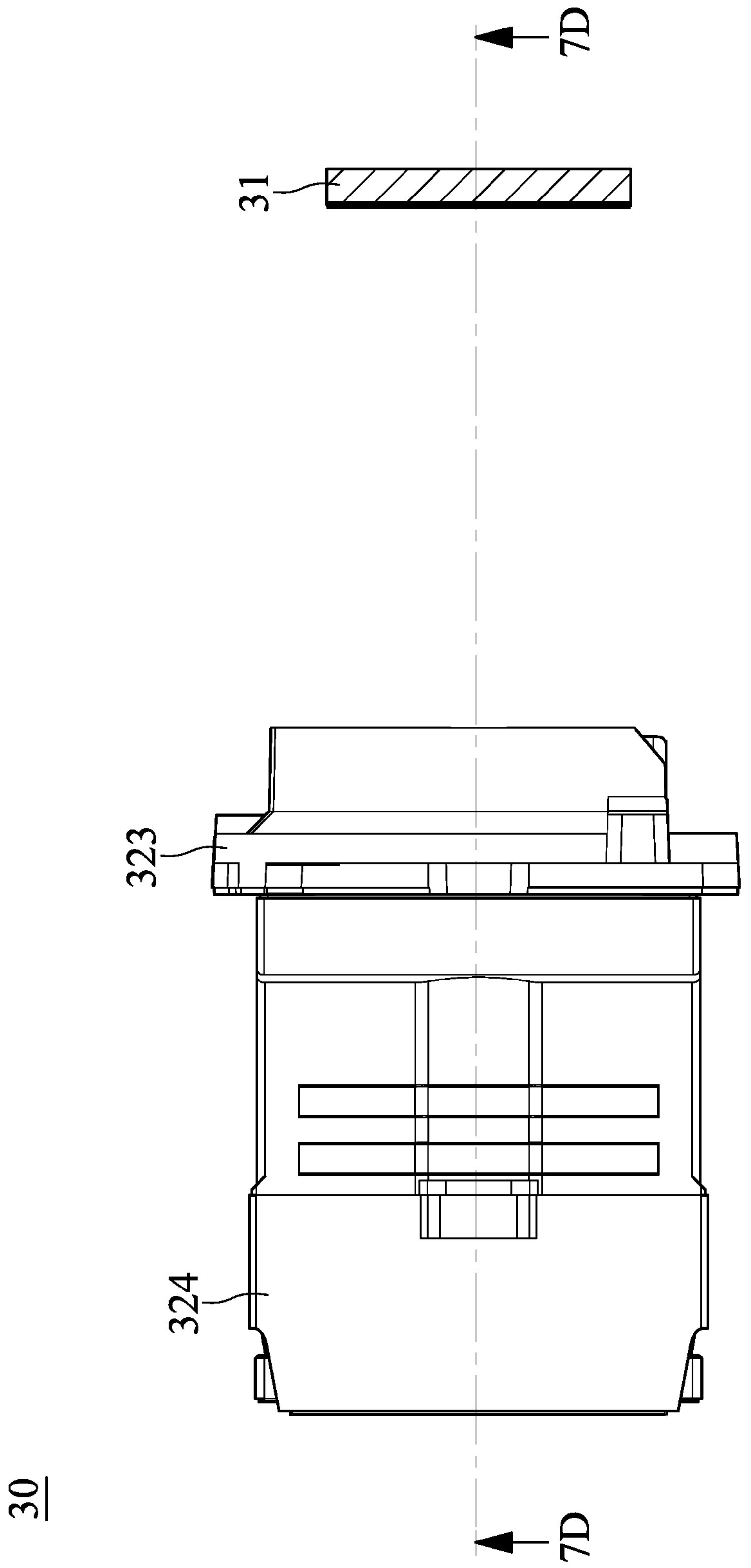
FIG. 7C is a plane view of the camera module according to the 1st example of the 3rd embodiment of the present disclosure.
Figure 7D:
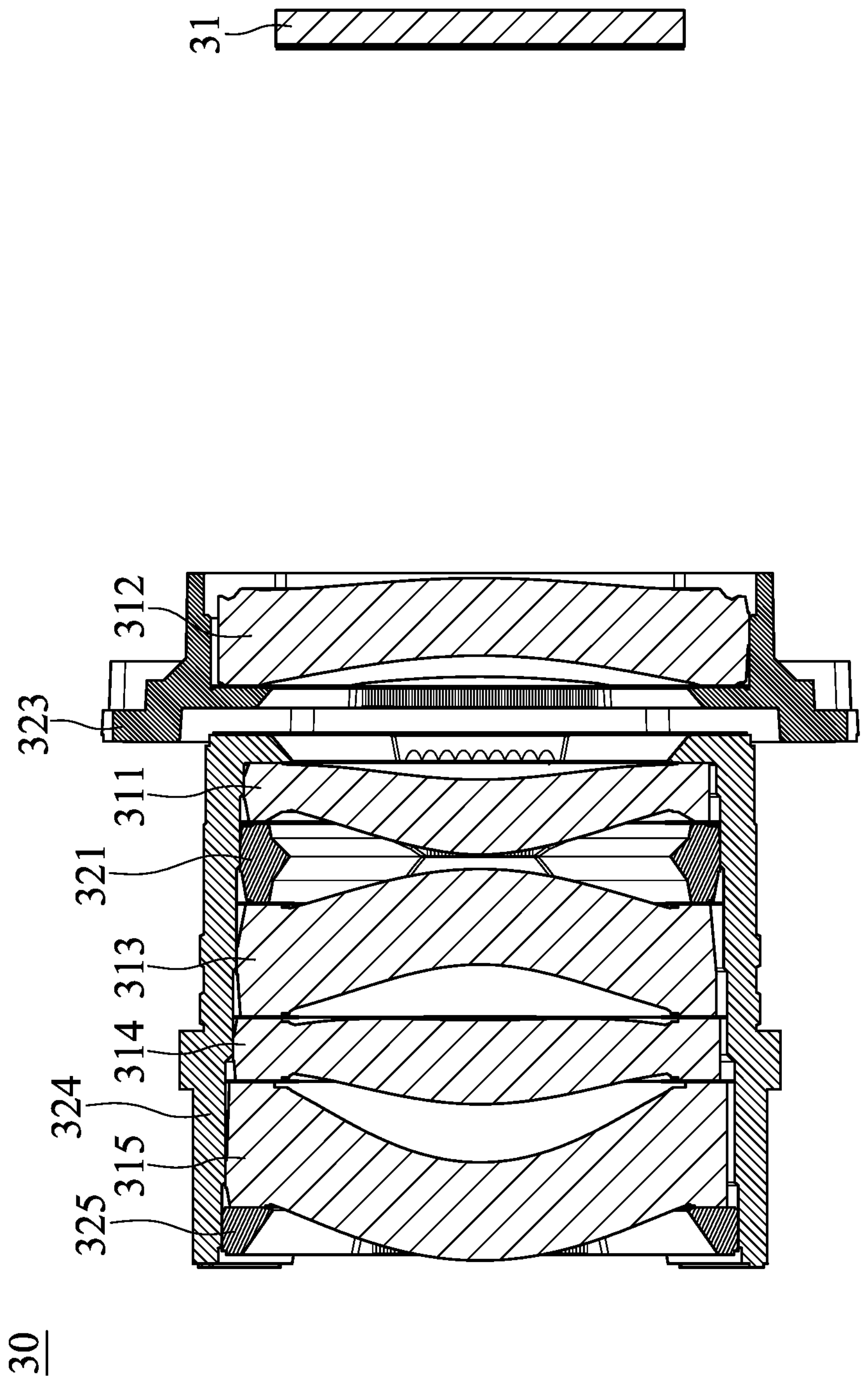
FIG. 7D is a cross-sectional view of the camera module according to the 1st example of the 3rd embodiment along line 7D-7D in FIG. 7C.
Figure 7E:
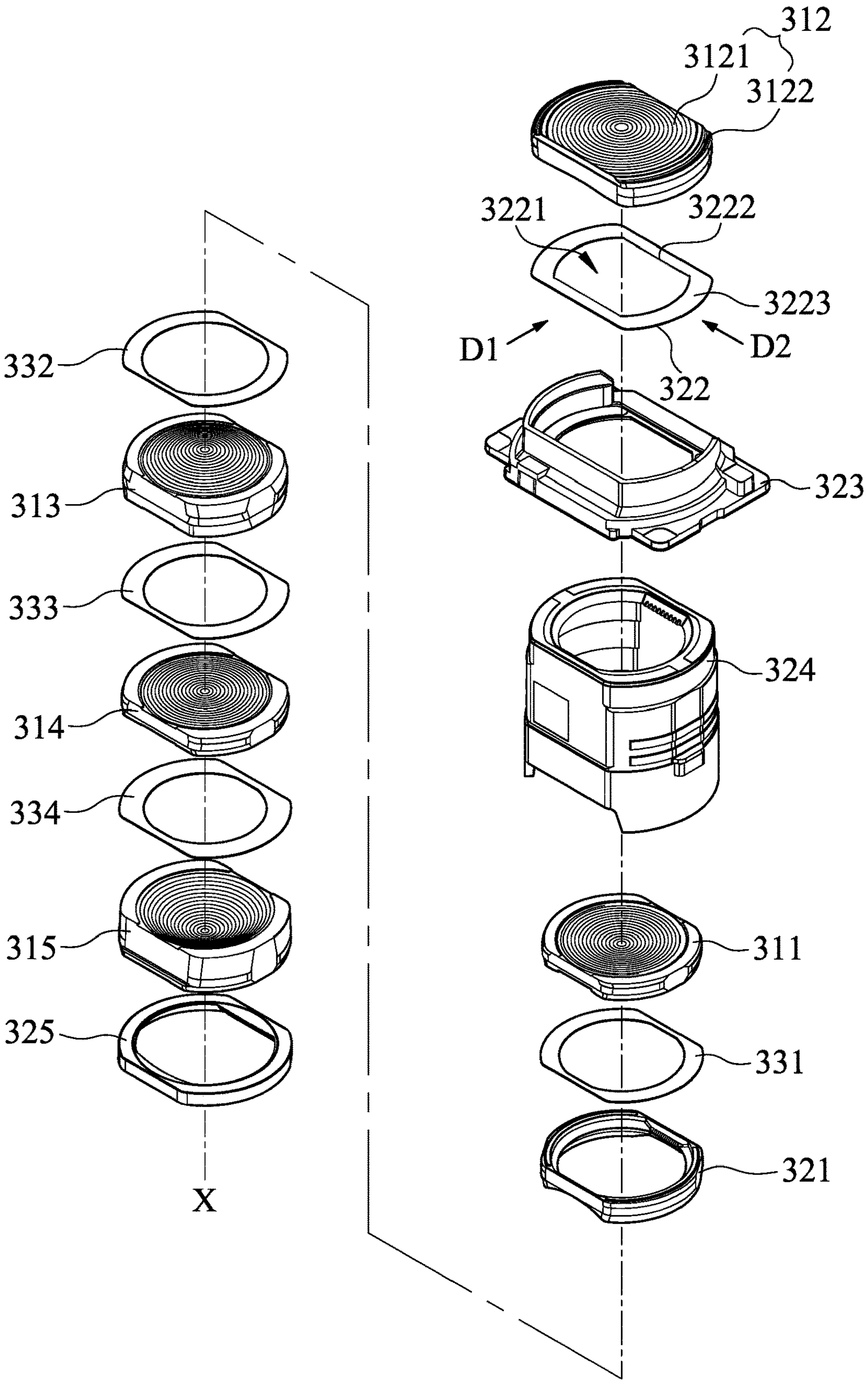
FIG. 7E is an exploded view of the imaging lens assembly according to the 1st example of the 3rd embodiment of FIG. 7A.
Figure 7F:
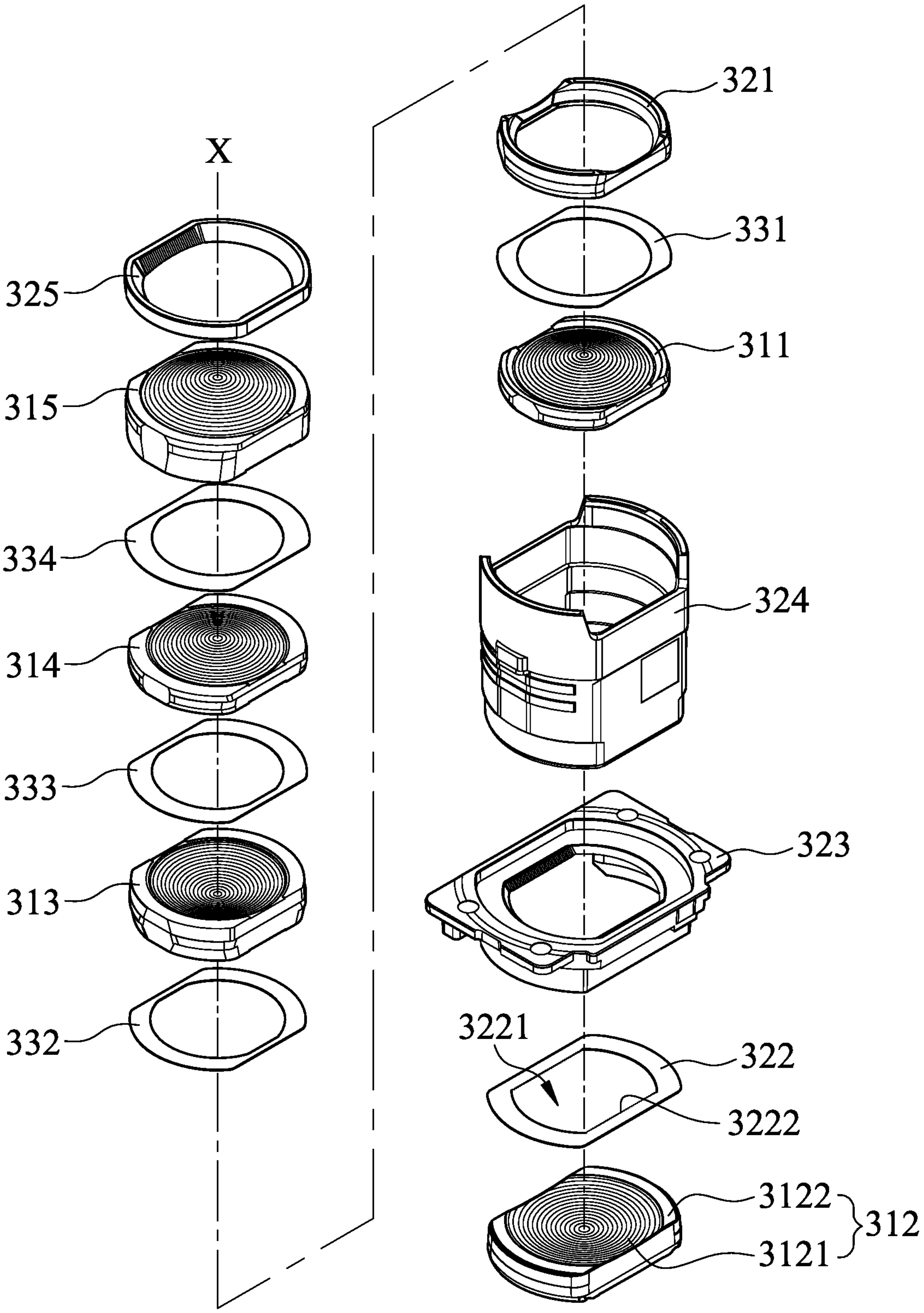
FIG. 7F is another exploded view of the imaging lens assembly according to the 1st example of the 3rd embodiment of FIG. 7A.

Please refer to FIG. 7A to FIG. 7F. FIG. 7A is a schematic view of a camera module 30 according to a 1st example of the 3rd embodiment of the present disclosure. FIG. 7B is a breakdown view of an imaging lens assembly 300 according to the 1st example of the 3rd embodiment of the present disclosure. FIG. 7C is a plane view of the camera module 30 according to the 1st example of the 3rd embodiment of the present disclosure. FIG. 7D is a cross-sectional view of the camera module 30 according to the 1st example of the 3rd embodiment along line 7D-7D in FIG. 7C. FIG. 7E is an exploded view of the imaging lens assembly 300 according to the 1st example of the 3rd embodiment of FIG. 7A. FIG. 7F is another exploded view of the imaging lens assembly 300 according to the 1st example of the 3rd embodiment of FIG. 7A. In FIG. 7A to FIG. 7F, the camera module 30 includes the imaging lens assembly 300 and an image sensor 31. The image sensor 31 is disposed on an image surface (its reference numeral is omitted) of the imaging lens assembly 300. The imaging lens assembly 300 has an optical axis X, and includes a plurality of optical elements (their reference numerals are omitted). The optical axis X passes through the optical elements.

In FIG. 7D, FIG. 7E and FIG. 7F, the optical elements of the 1st example of the 3rd embodiment includes a barrel 324, five radial reduction lens elements 311, 312, 313, 314, 315, four radial reduction light blocking elements 321, 322, 323, 325 and four light blocking sheets 331, 332, 333, 334. In detail, the radial reduction light blocking element 325 connects around an object side of the barrel 324, the radial reduction lens element 315, the light blocking sheet 334, the radial reduction lens element 314, the light blocking sheet 333, the radial reduction lens element 313, the light blocking sheet 332, the radial reduction light blocking element 321, the light blocking sheet 331, the radial reduction lens element 311 are disposed in the barrel 324 in order from the object side to an image side. The radial reduction light blocking element 322 and the radial reduction lens element 312 are accommodated in the radial reduction light blocking element 323, and the radial reduction light blocking element 323 is connected to the image side of the barrel 324. In particular, the optical features such as numbers, structures, surface shapes and so on of each of the optical elements can be disposed according to different imaging demand, and the optical features are not limited thereto.

The radial reduction lens element 312 includes an optical effective portion 3121 and a peripheral portion 3122. The optical axis X passes through the optical effective portion 3121. The peripheral portion 3122 extends from the optical effective portion 3121 towards a direction away from the optical axis X, and is disposed around the optical effective portion 3121 along a circumferential direction of the optical axis X. An appearance of the radial reduction lens element 312 is non-circular observed along the direction parallel to the optical axis.

The radial reduction light blocking element 322 includes a central opening 3221, a radial reduction part 3222 and a receiving portion 3223. The radial reduction part 3222 is reduced from a surface of the radial reduction light blocking element 322 towards the optical axis X along a direction D1 vertical to the optical axis X, so that the central opening 3221 is non-circular. The radial reduction part 3222 includes a plurality of light blocking structures 3222*a*. The light blocking structures 3222*a* are arranged along a direction D2 vertical to the optical axis X, and each of the light blocking structures 3222*a* extends toward a direction close to the optical axis X.

Figure 7G:
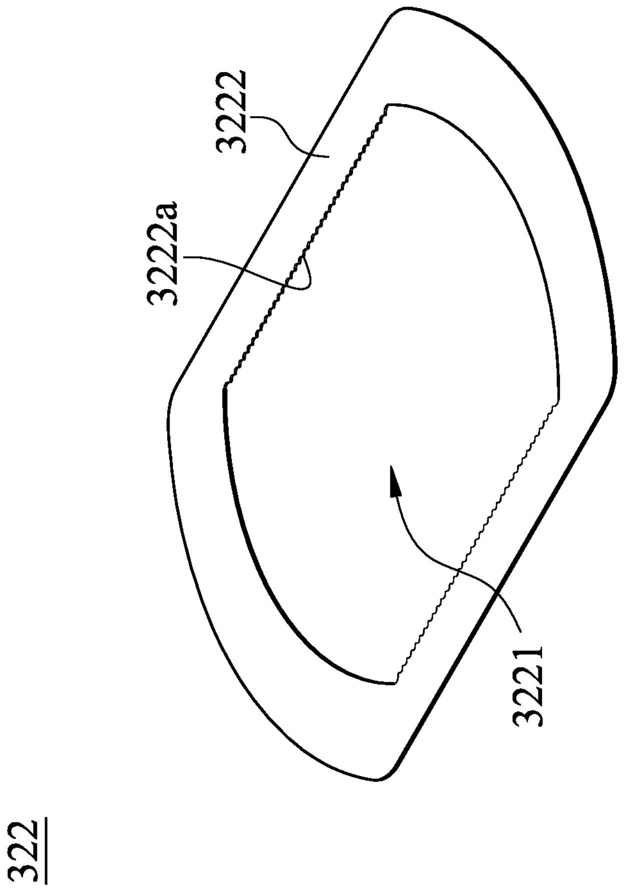
FIG. 7G is a schematic view of the radial reduction light blocking element according to the 1st example of the 3rd embodiment of FIG. 7F.
Figure 7I:
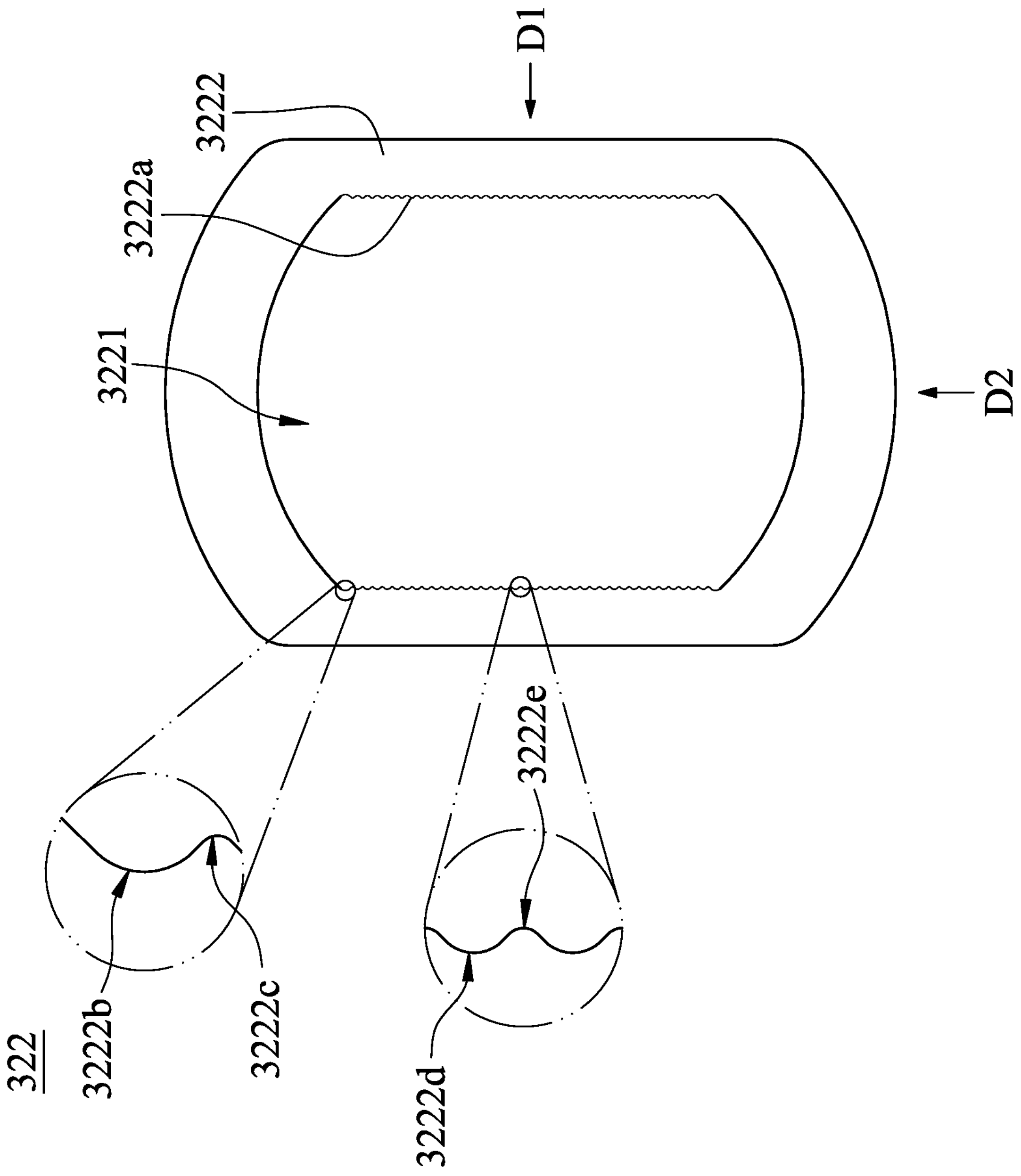
FIG. 7I is a partial enlarged view of the radial reduction light blocking element according to the 1st example of the 3rd embodiment of FIG. 7G.
Figure 7H:
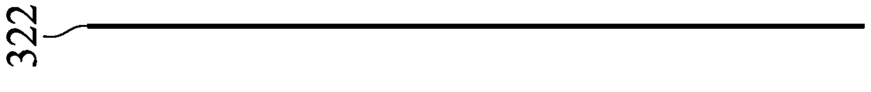
FIG. 7H is a side view of the radial reduction light blocking element according to the 1st example of the 3rd embodiment of FIG. 7G.

Please refer to FIG. 7G, FIG. 7H and FIG. 7I. FIG. 7G is a schematic view of the radial reduction light blocking element 322 according to the 1st example of the 3rd embodiment of FIG. 7F. FIG. 7H is a side view of the radial reduction light blocking element 322 according to the 1st example of the 3rd embodiment of FIG. 7G. FIG. 7I is a partial enlarged view of the radial reduction light blocking element 322 according to the 1st example of the 3rd embodiment of FIG. 7G. In FIG. 7G to FIG. 7I, radius structures 3222*b*, 3222*c*, 3222*d*, 3222*e* are formed between each two of the light blocking structures 3222*a*, each of the radius structures 3222*b*, 3222*c*, 3222*d*, 3222*e* has a radius R, and the following condition can be satisfied: 0 mm<R<0.3 mm. Furthermore, the radial reduction light blocking element 322 can be a light blocking sheet manufactured by a punching process, and a wavy-shaped appearance of each of the light blocking structures 3222*a* can be cut by molding, but the present disclosure is not limited thereto. Moreover, the following condition can be satisfied: 0 mm<R<0.15 mm. A number of the light blocking structures 3222*a* is Nr, and the following conditions of the Table 6 are satisfied.

TABLE 6

| 1st example of the 3rd embodiment | | | | |
|---|---|---|---|---|
| Nr | 74 | radius structure 3222b | R (mm) | 0.07 |
| | | radius structure 3222c | R (mm) | 0.02 |

TABLE 6-continued

| 1st example of the 3rd embodiment | | |
|---|---|---|
| radius structure 3222d | R (mm) | 0.04 |
| radius structure 3222e | R (mm) | 0.02 |

4th Embodiment

Figure 8A:
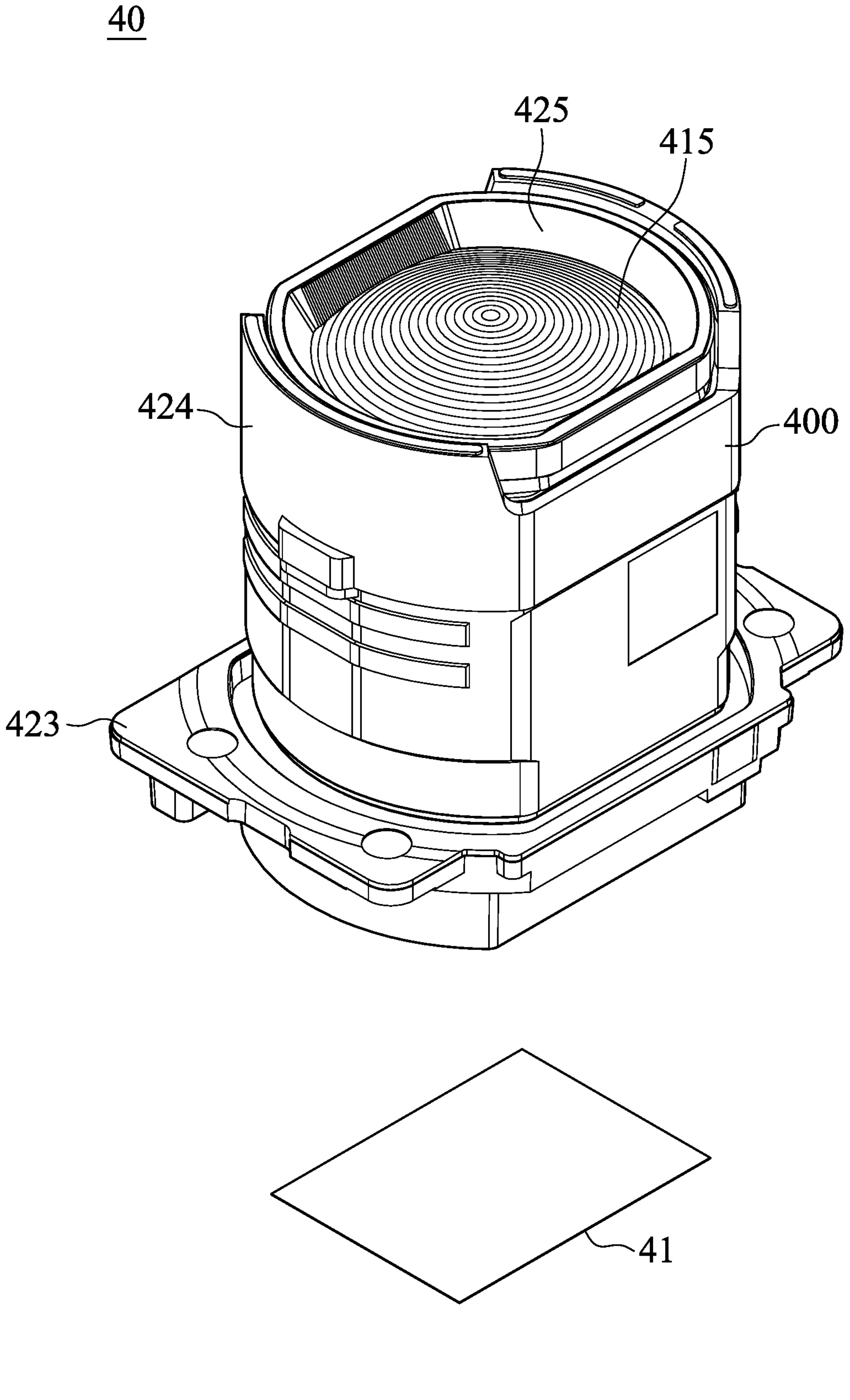
FIG. 8A is a schematic view of a camera module according to a 1st example of the 4th embodiment of the present disclosure.
Figure 8B:
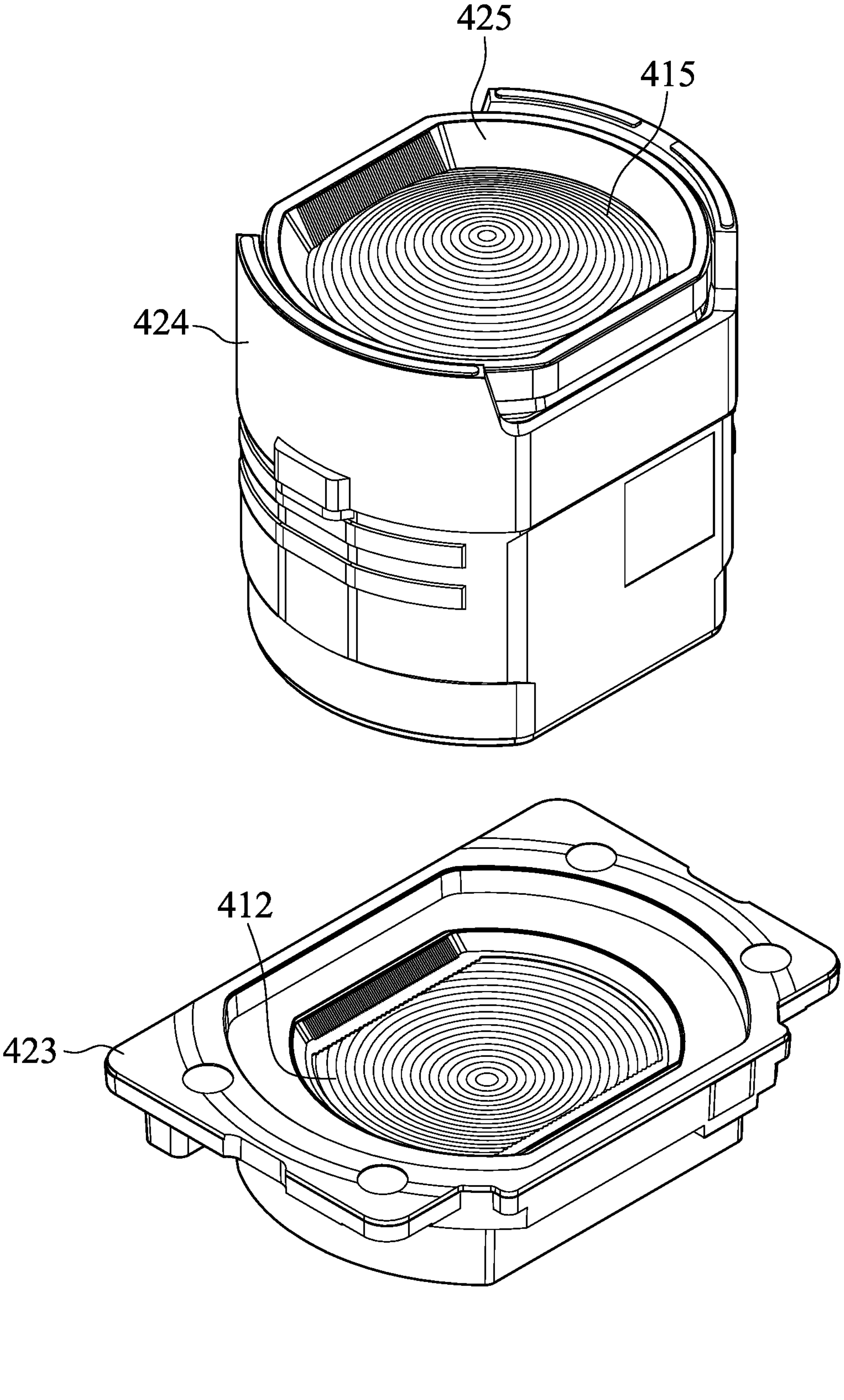
FIG. 8B is a breakdown view of an imaging lens assembly according to the 1st example of the 4th embodiment of FIG. 8A.
Figure 8C:
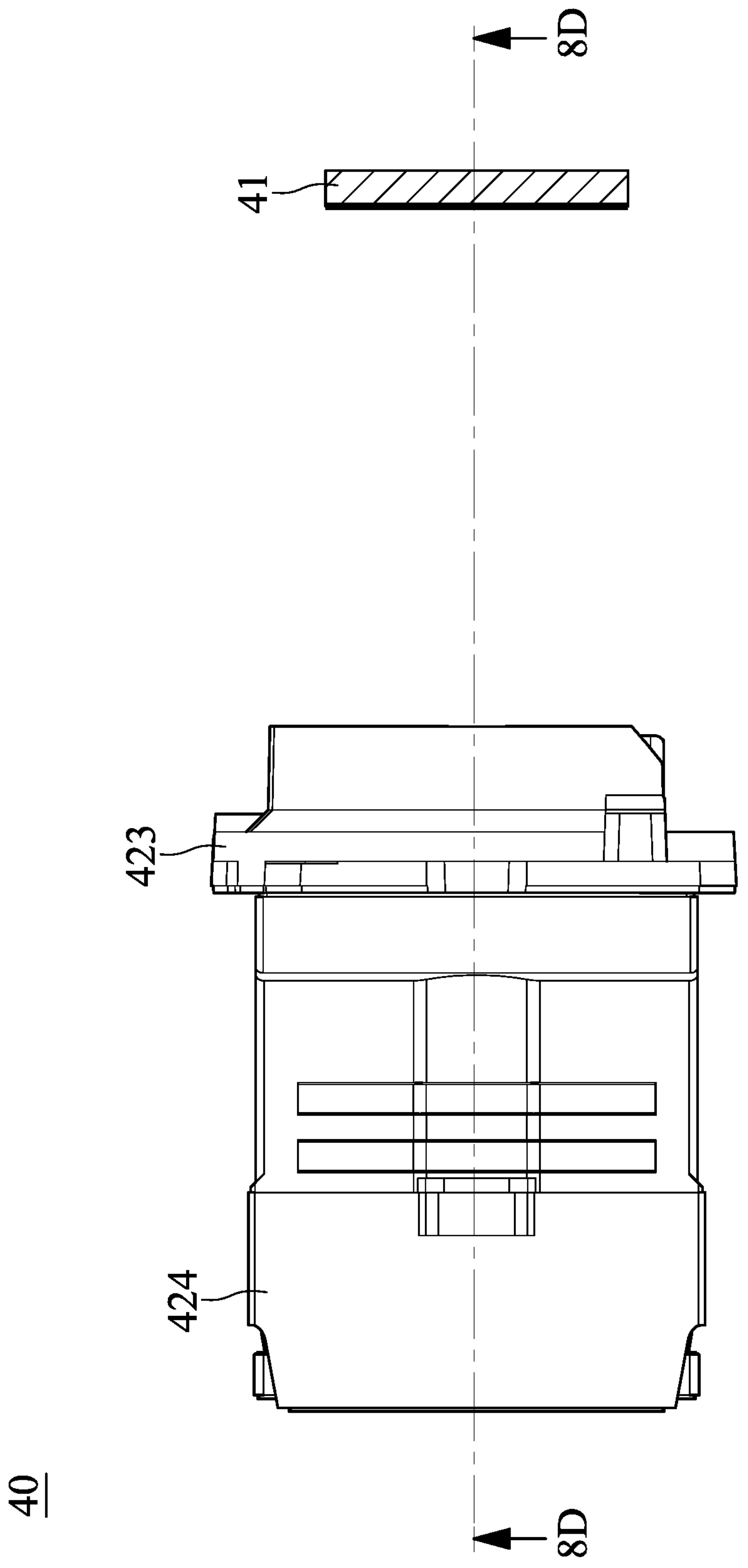
FIG. 8C is a plane view of the camera module according to the 1st example of the 4th embodiment of FIG. 8A.
Figure 8D:
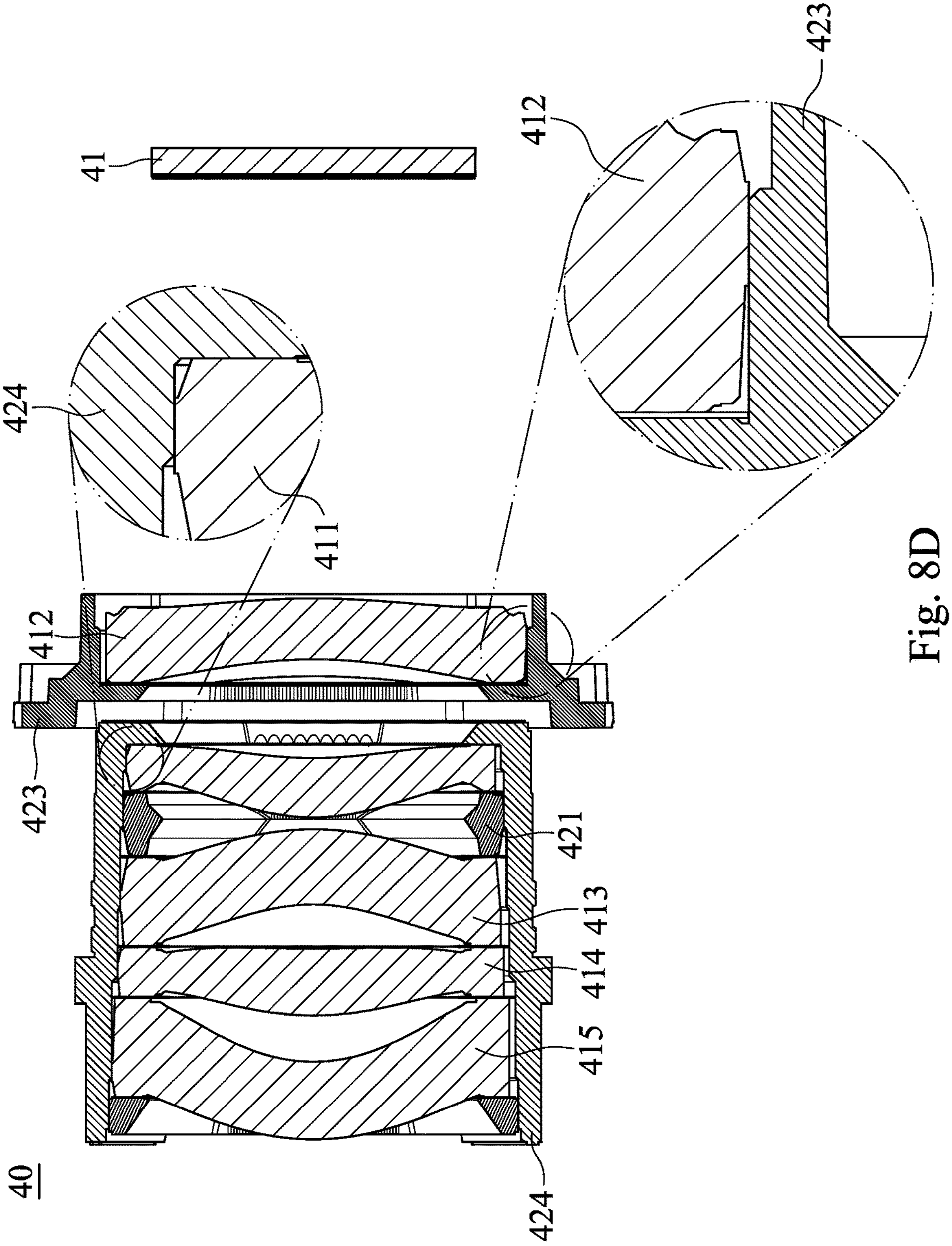
FIG. 8D is a cross-sectional view of the camera module according to the 1st example of the 4th embodiment along line 8D-8D in FIG. 8C.
Figure 8E:
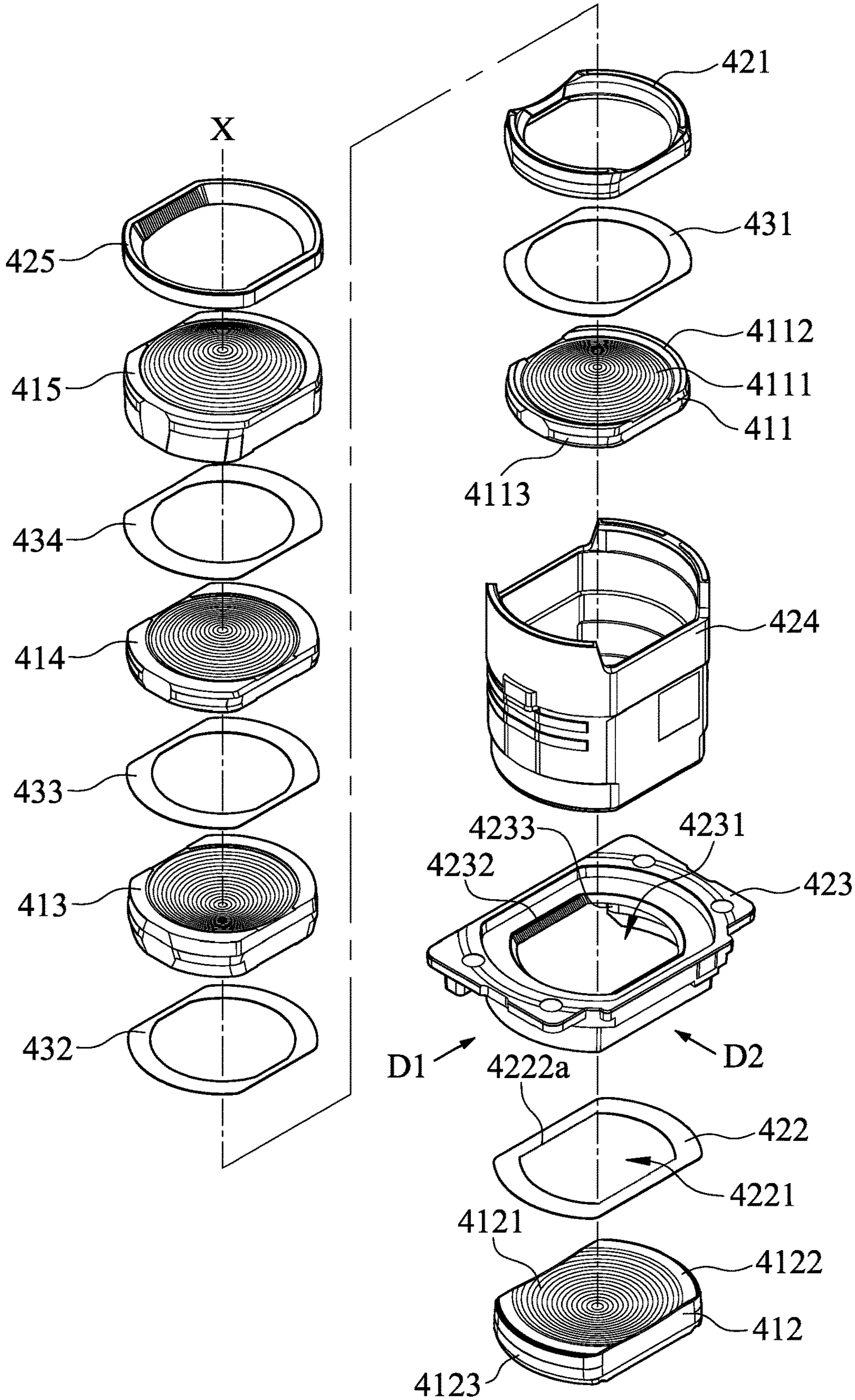
FIG. 8E is an exploded view of the imaging lens assembly according to the 1st example of the 4th embodiment of FIG. 8A.
Figure 8F:
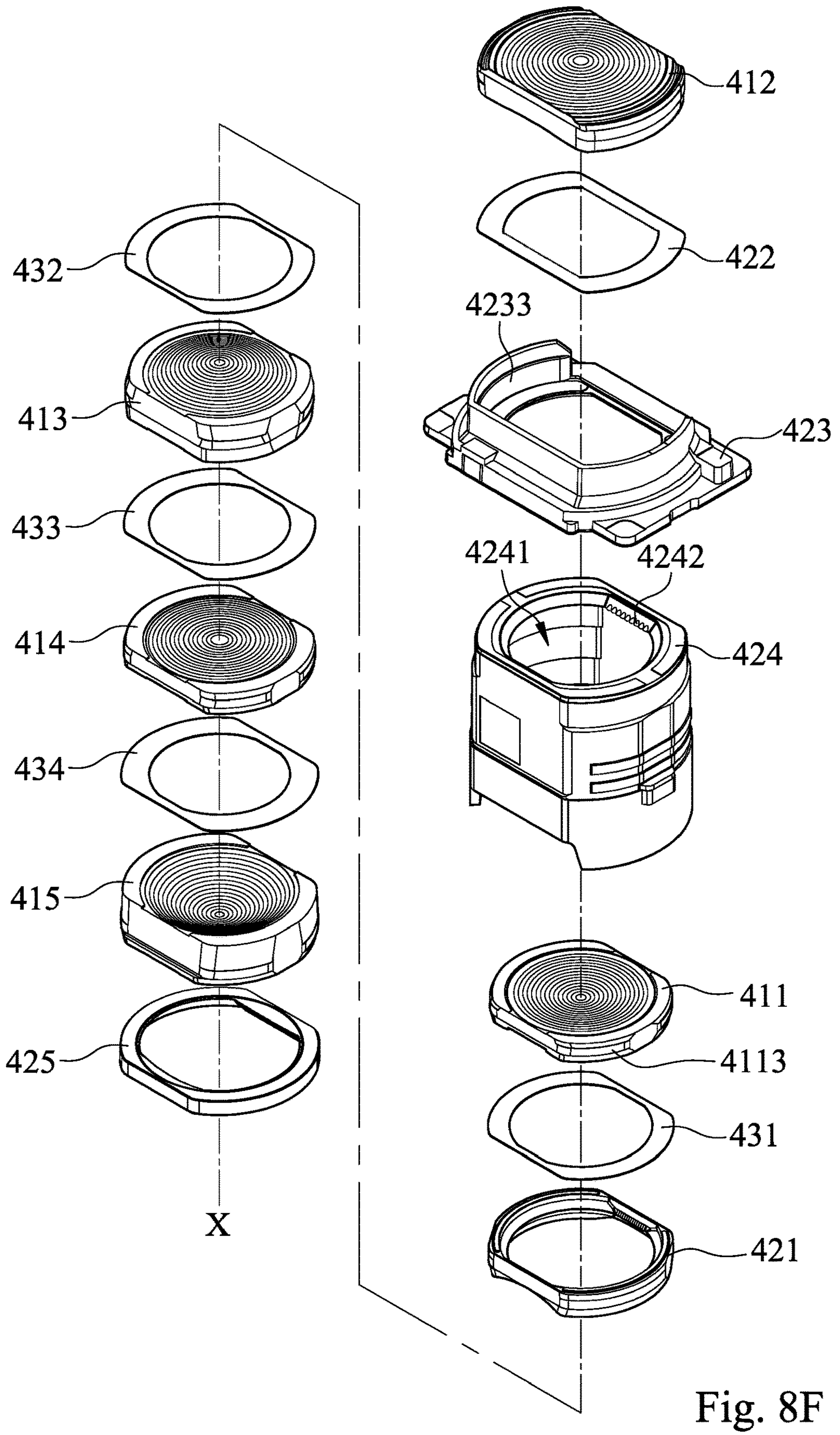
FIG. 8F is another exploded view of the imaging lens assembly according to the 1st example of the 4th embodiment of FIG. 8A.

Please refer to FIG. 8A to FIG. 8F. FIG. 8A is a schematic view of a camera module 40 according to a 1st example of the 4th embodiment of the present disclosure. FIG. 8B is a breakdown view of an imaging lens assembly 400 according to the 1st example of the 4th embodiment of FIG. 8A. FIG. 8C is a plane view of the camera module 40 according to the 1st example of the 4th embodiment of FIG. 8A. FIG. 8D is a cross-sectional view of the camera module 40 according to the 1st example of the 4th embodiment along line 8D-8D in FIG. 8C. FIG. 8E is an exploded view of the imaging lens assembly 400 according to the 1st example of the 4th embodiment of FIG. 8A. FIG. 8F is another exploded view of the imaging lens assembly 400 according to the 1st example of the 4th embodiment of FIG. 8A. In FIG. 8A to FIG. 8F, the camera module 40 includes the imaging lens assembly 400 and an image sensor 41. The image sensor 41 is disposed on an image surface (its reference numeral is omitted) of the imaging lens assembly 400. The imaging lens assembly 400 has an optical axis X, and includes a plurality of optical elements (their reference numerals are omitted). The optical axis X passes through the optical elements.

In FIG. 8D, FIG. 8E and FIG. 8F, the optical elements of the 1st example of the 4th embodiment includes a first radial reduction lens element 412, a second radial reduction lens element 411, a first radial reduction light blocking element 422, a second radial reduction light blocking element 423, a third radial reduction light blocking element 424, three radial reduction lens elements 413, 414, 415, two radial reduction light blocking elements 421, 425 and four light blocking sheets 431, 432, 433, 434. In detail, the radial reduction light blocking element 425 connects around an object side of the third radial reduction light blocking element 424, the radial reduction lens element 415, the light blocking sheet 434, the radial reduction lens element 414, the light blocking sheet 433, the radial reduction lens element 413, the light blocking sheet 432, the radial reduction light blocking element 421, the light blocking sheet 431, the second radial reduction lens element 411 are disposed in the third radial reduction light blocking element 424 in order from the object side to an image side. The first radial reduction light blocking element 422 and the first radial reduction lens element 412 are accommodated in the second radial reduction light blocking element 423, and the second radial reduction light blocking element 423 is connected to the image side of the third radial reduction light blocking element 424. In particular, the optical features such as numbers, structures, surface shapes and so on of each of the optical elements can be disposed according to different imaging demand, and the optical features are not limited thereto.

An appearance of the first radial reduction lens element 412 is non-circular observed along a direction parallel to the optical axis X. The first radial reduction lens element 412 includes a first optical effective portion 4121 and a first peripheral portion 4122. The optical axis X passes through the first optical effective portion 4121. The first peripheral portion 4122 extends from the first optical effective portion 4121 towards a direction away from the optical axis X, and is disposed around the first optical effective portion 4121 along a circumferential direction of the optical axis X. The first peripheral portion 4122 includes a first diameter contact surface 4123. The first diameter contact surface 4123 is disposed around the first peripheral portion 4122.

An appearance of the second radial reduction lens element 411 element is non-circular observed along the direction parallel to the optical axis X. The second radial reduction lens element 411 includes a second optical effective portion 4111 and a second peripheral portion 4112. The optical axis X passes through the second optical effective portion 4111. The second peripheral portion 4112 extends from the second optical effective portion 4111 towards a direction away from the optical axis X, and is disposed around the second optical effective portion 4111 along the circumferential direction of the optical axis X. The second peripheral portion 4112 includes a second diameter contact surface 4113. The second diameter contact surface 4113 is disposed around the second peripheral portion 4112. The third radial reduction light blocking element 424 is configured to load the second radial reduction lens element 411.

Figure 8G:
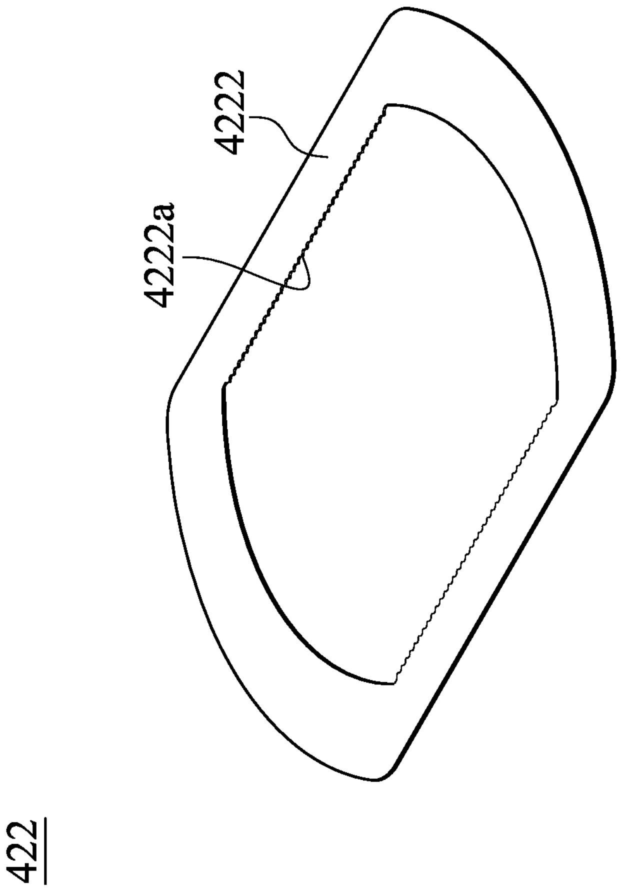
FIG. 8G is a schematic view of the first radial reduction light blocking element according to the 1st example of the 4th embodiment of FIG. 8F.
Figure 8H:
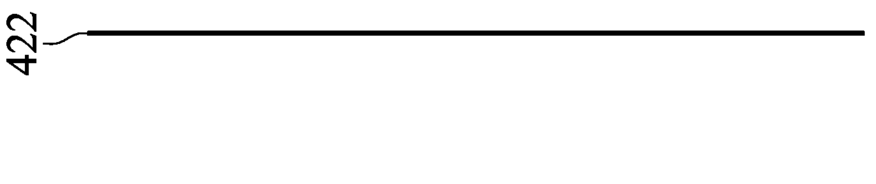
FIG. 8H is a side view of the first radial reduction light blocking element according to the 1st example of the 4th embodiment of FIG. 8G.
Figure 8I:
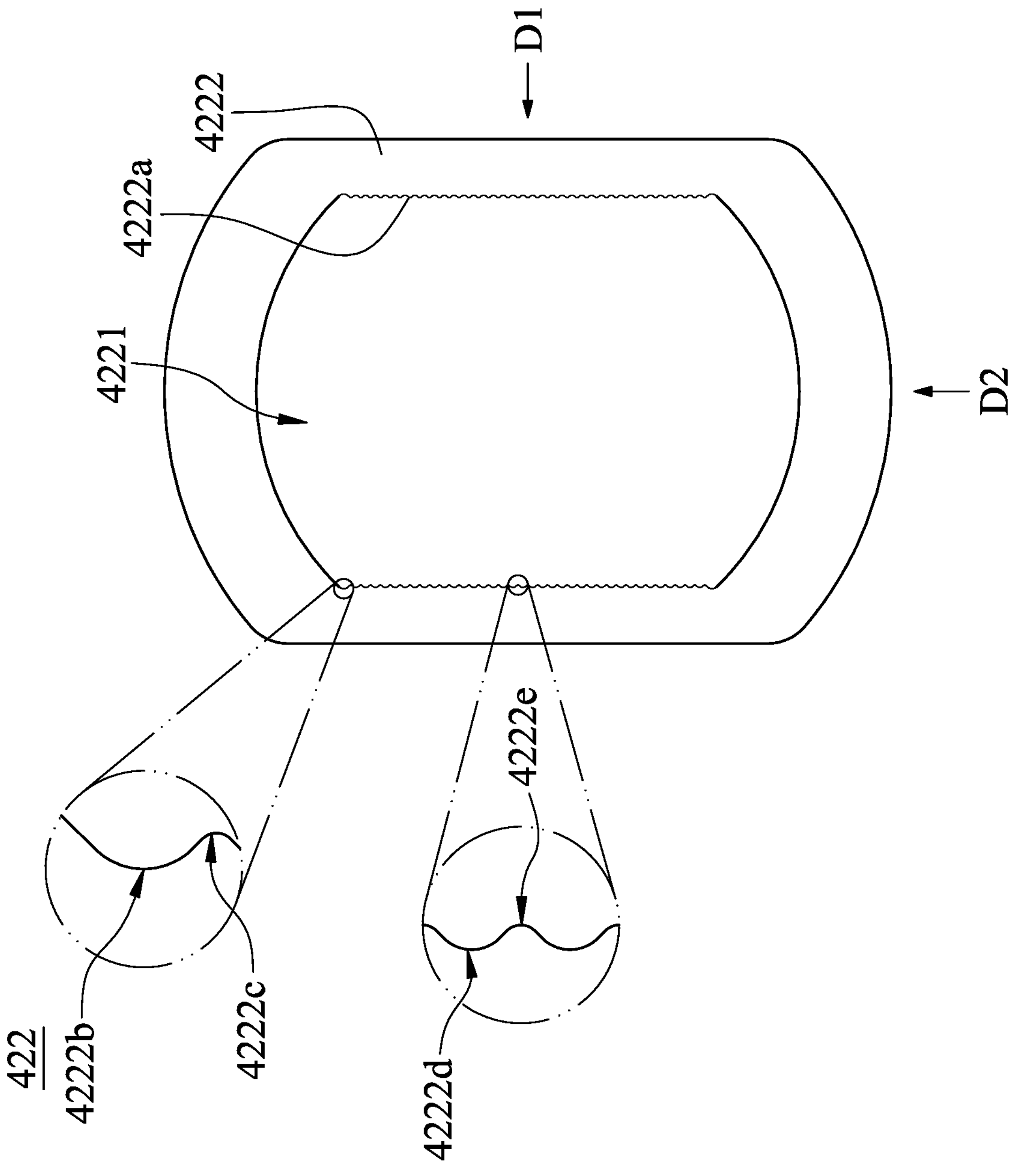
FIG. 8I is a partial enlarged view of the first radial reduction light blocking element according to the 1st example of the 4th embodiment of FIG. 8G.

Please refer to FIG. 8G, FIG. 8H and FIG. 8I. FIG. 8G is a schematic view of the first radial reduction light blocking element 422 according to the 1st example of the 4th embodiment of FIG. 8F. FIG. 8H is a side view of the first radial reduction light blocking element 422 according to the 1st example of the 4th embodiment of FIG. 8G. FIG. 8I is a partial enlarged view of the first radial reduction light blocking element 422 according to the 1st example of the 4th embodiment of FIG. 8G.

An appearance of the first radial reduction light blocking element 422 is non-circular observed along the direction parallel to the optical axis X. The first radial reduction light blocking element 422 includes a first central opening 4221 and a first radial reduction part 4222. The optical axis X passes through the first central opening 4221. The first radial reduction part 4222 is reduced from a surface of the first radial reduction light blocking element 422 towards the optical axis X along a direction D2 vertical to the optical axis X, so that the first central opening 4221 is non-circular. The first radial reduction part 4222 includes a plurality of first light blocking structures 4222*a*. The first light blocking structures 4222*a* are arranged along a direction D1 vertical to the optical axis X, and each of the first light blocking structures 4222*a* extends toward a direction close to the optical axis X. Radius structures 4222*b*, 4222*c*, 4222*d*, 4222*e* are formed between each two of the first light blocking structures 4222*a*, each of the radius structures 4222*b*, 4222*c*, 4222*d*, 4222*e* has a radius R, and the following condition can be satisfied: 0 mm<R<0.3 mm.

A number of the first light blocking structures 4222*a* is Nr1, and the following conditions can be satisfied: 10<Nr1<250. Each of the radius structures 4222*b*, 4222*c*, 4222*d*, 4222*e* has a radius R, and the following condition can be satisfied: 0 mm<R<0.3 mm, and the following conditions of the Table 7 are satisfied.

TABLE 7

| 1st example of the 4th embodiment | | | | |
|---|---|---|---|---|
| Nr1 | 74 | radius structure 4222b | R (mm) | 0.07 |
| | | radius structure 4222c | R (mm) | 0.02 |
| | | radius structure 4222d | R (mm) | 0.04 |
| | | radius structure 4222e | R (mm) | 0.02 |

The first radial reduction light blocking element 422 can be made of black plastic, but the present disclosure is not limited thereto.

Figure 8J:
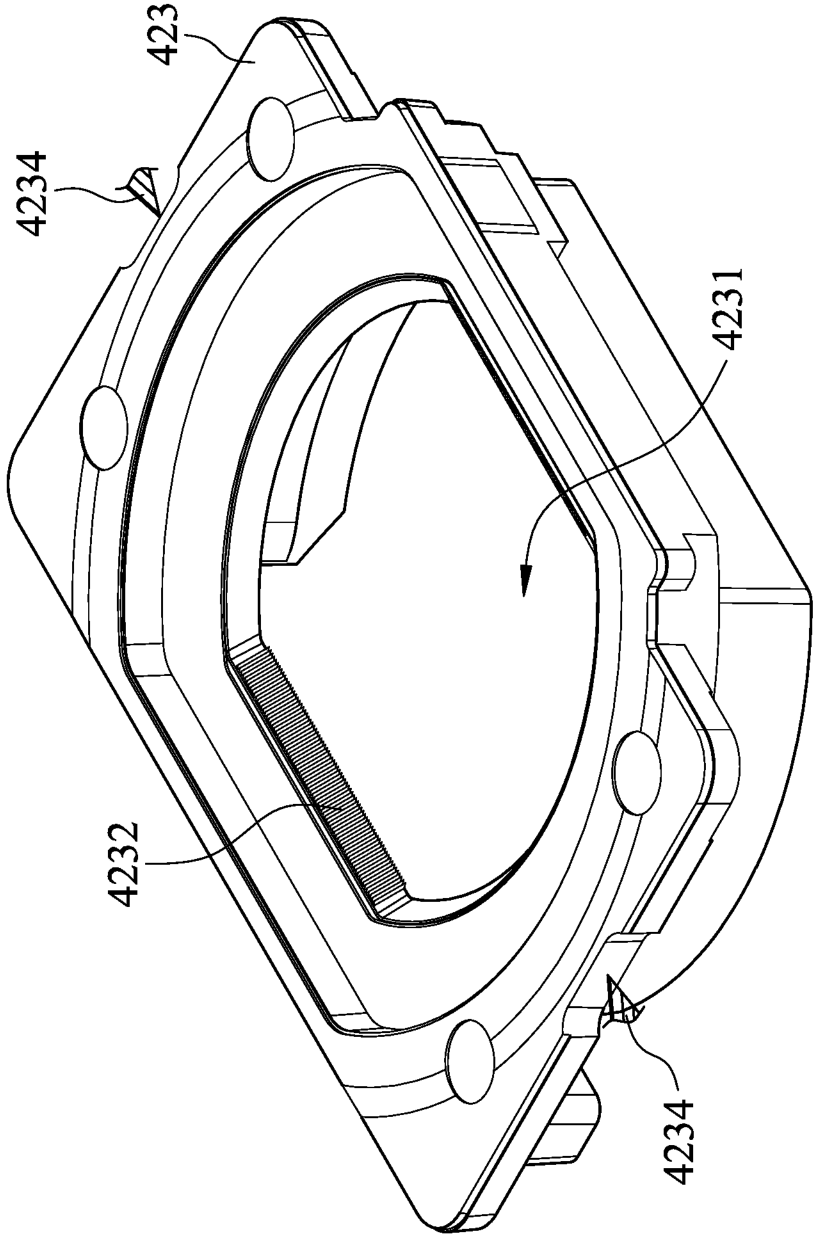
FIG. 8J is a schematic view of the second radial reduction light blocking element according to the 1st example of the 4th embodiment of FIG. 8E.
Figure 8K:
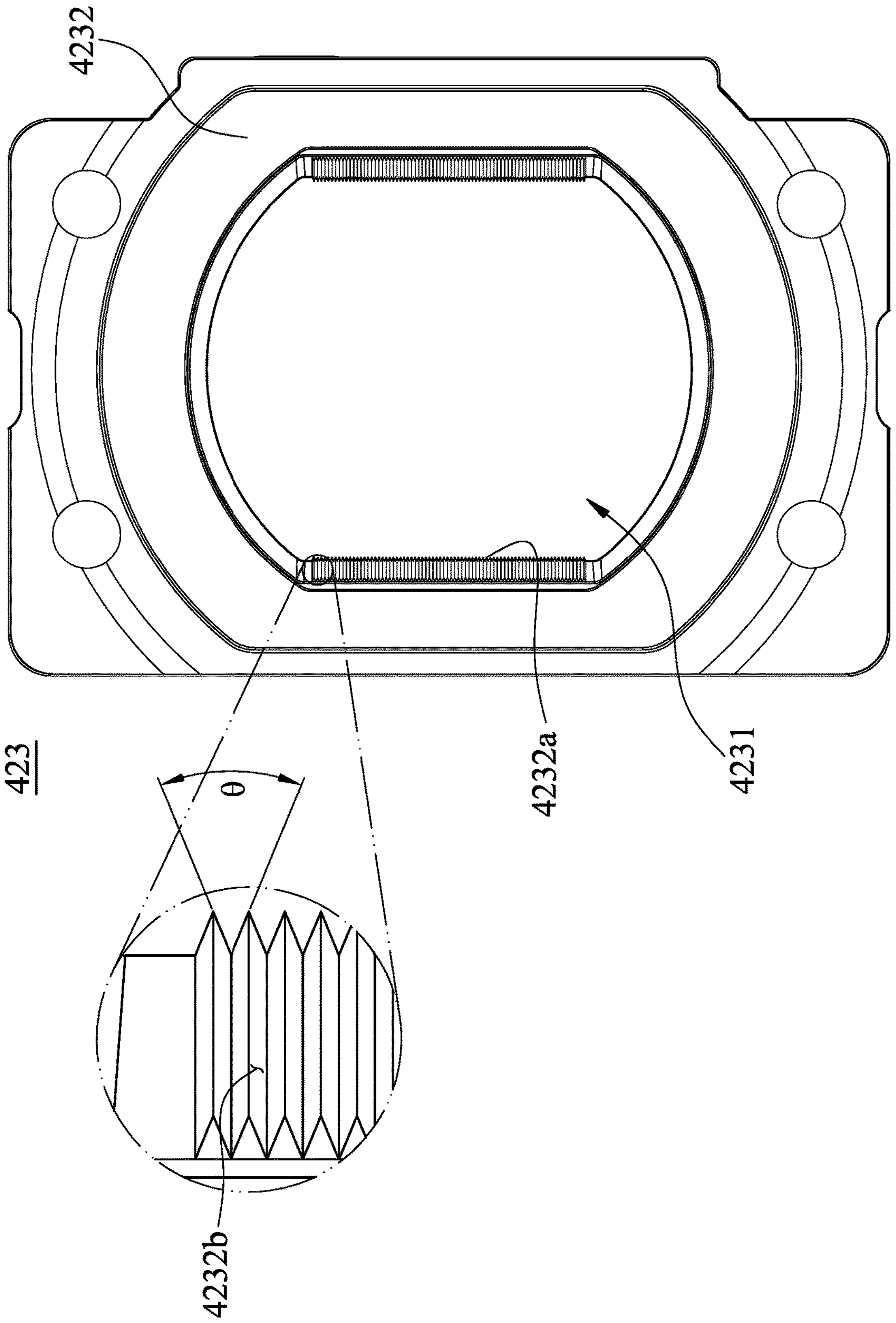
FIG. 8K is a partial enlarged view of the second radial reduction light blocking element according to the 1st example of the 4th embodiment of FIG. 8J.
Figure 8M:
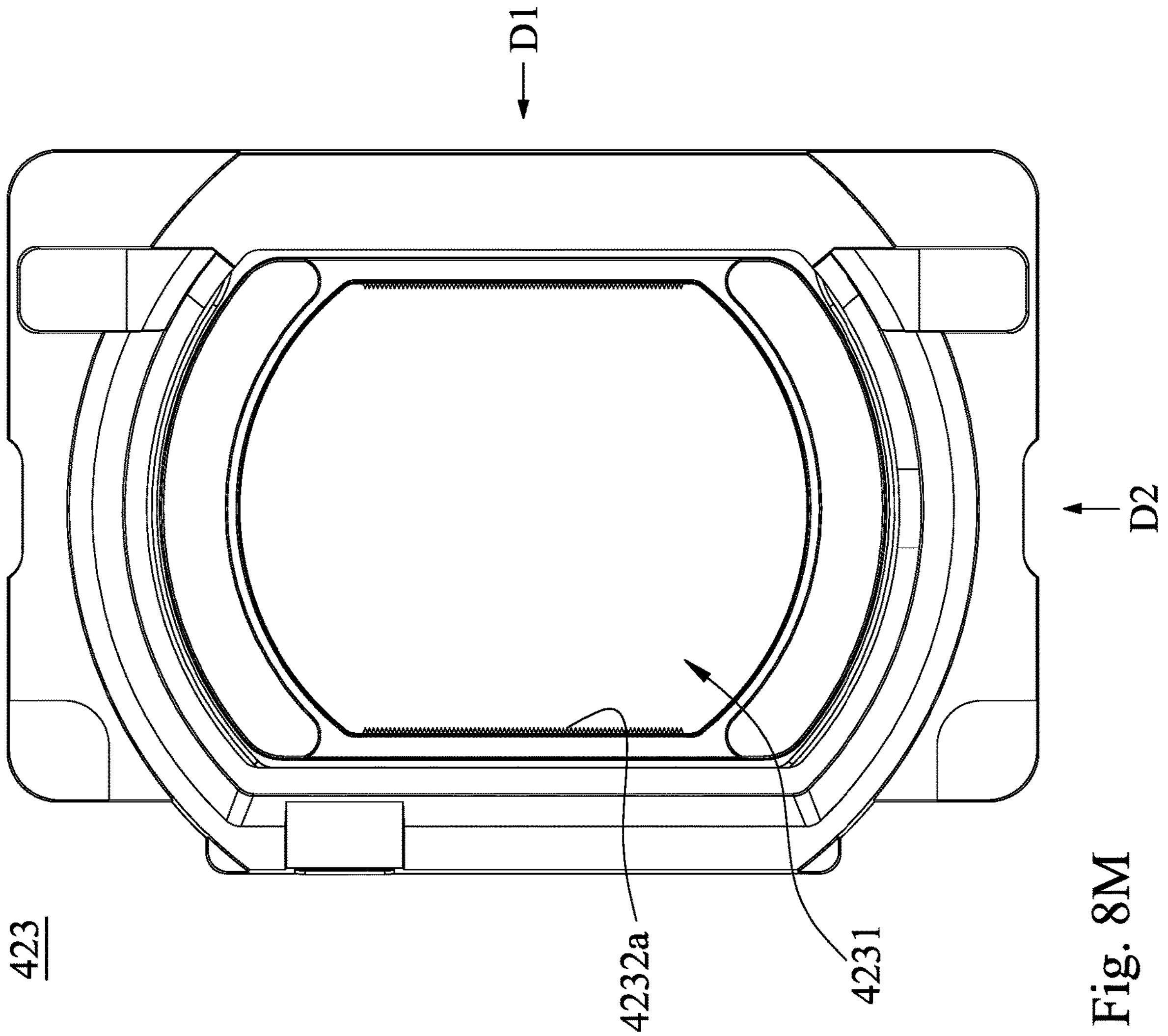
FIG. 8M is a plane view of the second radial reduction light blocking element according to the 1st example of the 4th embodiment of FIG. 8J.
Figure 8L:
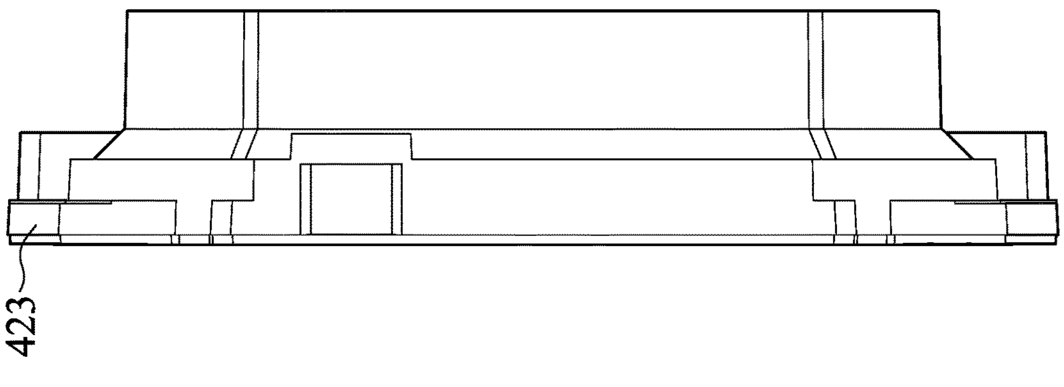
FIG. 8L is a side view of the second radial reduction light blocking element according to the 1st example of the 4th embodiment of FIG. 8J.

Please refer to FIG. 8J, FIG. 8K, FIG. 8L and FIG. 8M. FIG. 8J is a schematic view of the second radial reduction light blocking element 423 according to the 1st example of the 4th embodiment of FIG. 8E. FIG. 8K is a partial enlarged view of the second radial reduction light blocking element 423 according to the 1st example of the 4th embodiment of FIG. 8J. FIG. 8L is a side view of the second radial reduction light blocking element 423 according to the 1st example of the 4th embodiment of FIG. 8J. FIG. 8M is a plane view of the second radial reduction light blocking element 423 according to the 1st example of the 4th embodiment of FIG. 8J. In FIG. 8J to FIG. 8M, the second radial reduction light blocking element 423 is configured to load the first radial reduction lens element 412, and the second radial reduction light blocking element 423 includes a second central opening 4231, a second radial reduction part 4232 and a first receiving side wall surface 4233. The optical axis X passes through the second central opening 4231. The second radial reduction part 4232 is reduced from a surface of the second radial reduction light blocking element 423 towards the optical axis X along the direction D2 vertical to the optical axis X, so that the second central opening 4231 is non-circular. The second radial reduction part 4232 includes a plurality of second light blocking structures 4232*a*. The second light blocking structures 4232*a* are arranged along the direction D1 vertical to the optical axis X, and each of the second light blocking structures 4232*a* extends toward the direction close to the optical axis X.

A number of the second light blocking structures 4232*a* is Nr2, and the following conditions can be satisfied: 10<Nr2<250. A V-shaped groove 4232*b* is formed between each two of the second light blocking structures 4232*a*, the V-shaped groove 4232*b* has an angle θ, and the following condition can be satisfied: 0 degrees<θ<90 degrees. The following conditions of the Table 8 are satisfied.

TABLE 8

| 1st example of the 4th embodiment | | | |
|---|---|---|---|
| Nr2 | 152 | θ (degrees) | 45 |

The second radial reduction light blocking element 423 can be made of black plastic, and has two gate traces.

Moreover, the second radial reduction light blocking element 423 can be a barrel, but the present disclosure is not limited thereto. The aforementioned second radial reduction light blocking element 423 is configured to "load" the first radial reduction lens element 412, that is, the second radial reduction light blocking element 423 can receive, accommodate, physical contact or fix with retaining material to fix the first radial reduction lens element 412, but the present disclosure is not limited thereto. For example, the first radial reduction lens element 412 can be received in the second radial reduction light blocking element 423, and a part of the first radial reduction lens element 412 can be protruded or exposed out of the second radial reduction light blocking element 423. Or, the first diameter contact surface 4123 of the first radial reduction lens element 412 can physically contact with the first receiving side wall surface 4233 of the second radial reduction light blocking element 423, and accommodate in the second radial reduction light blocking element 423. Or, the first radial reduction lens element 412 is packaged in the second radial reduction light blocking element 423 via a retaining material. For instance, the first radial reduction lens element 412 can be stuck with the second radial reduction light blocking element 423 via an adhesive dispensing process, or fix with the second radial reduction light blocking element 423 via a retainer.

Figure 8N:
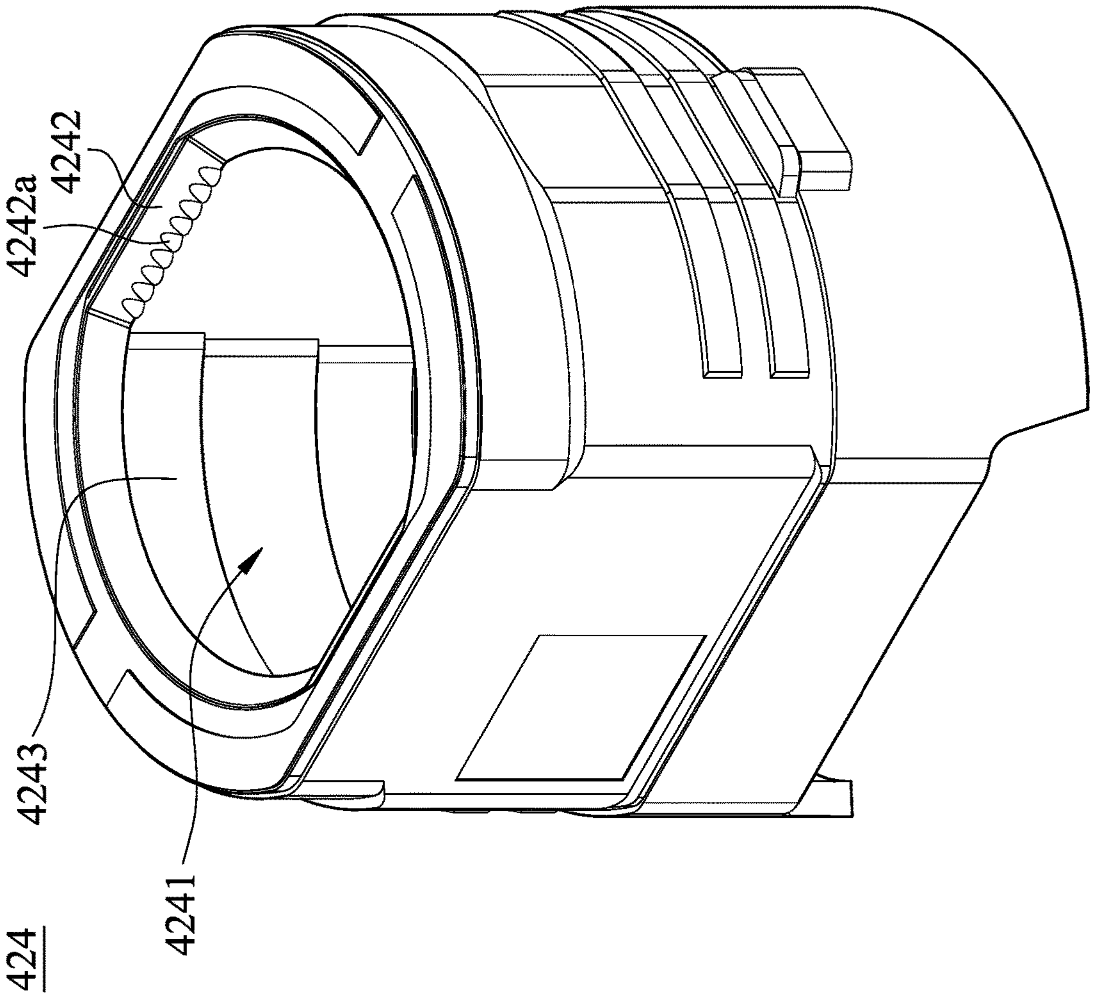
FIG. 8N is a schematic view of a third radial reduction light blocking element according to the 1st example of the 4th embodiment of FIG. 8F.
Figure 8O:
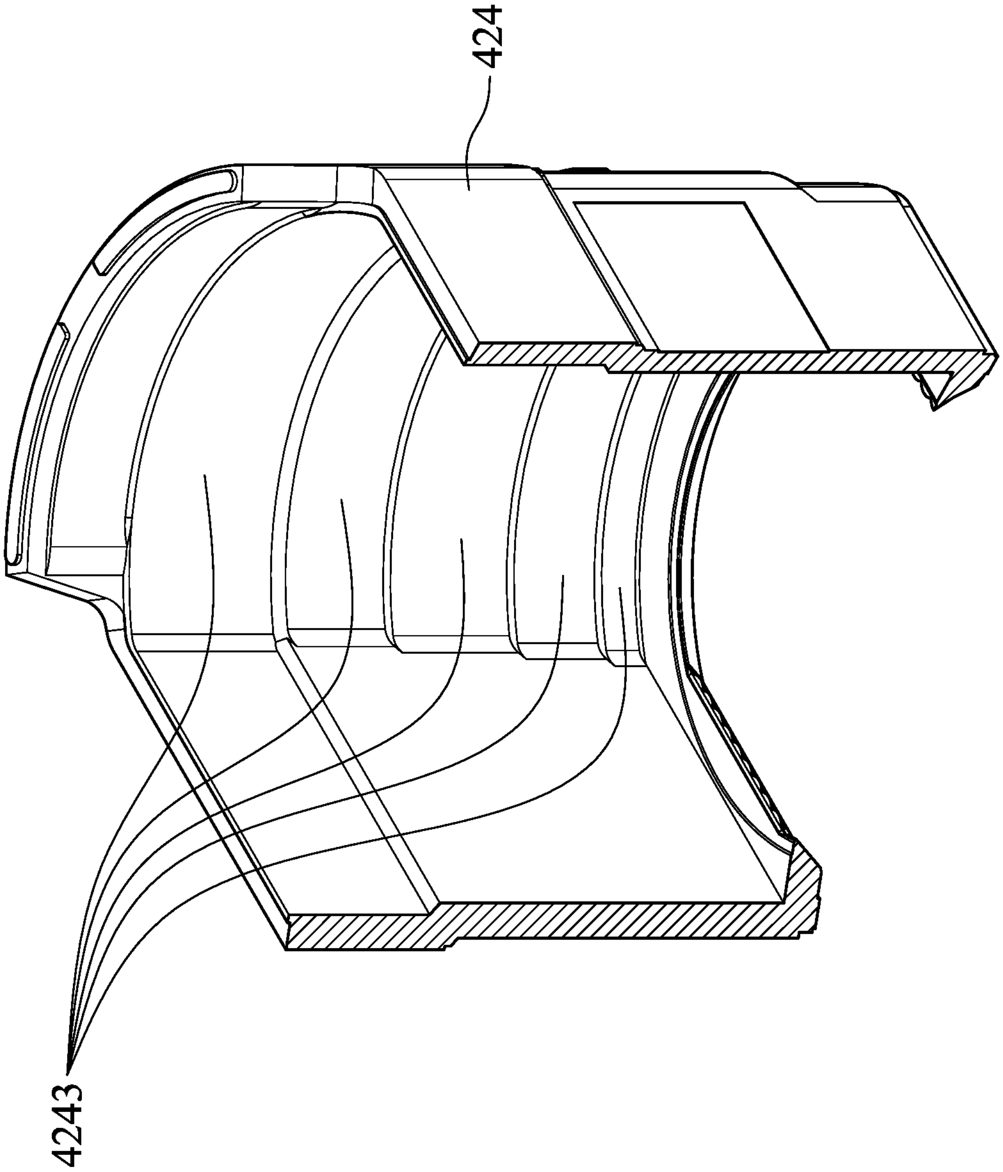
FIG. 8O is a cross-sectional view of the third radial reduction light blocking element according to the 1st example of the 4th embodiment of FIG. 8E.
Figure 8P:
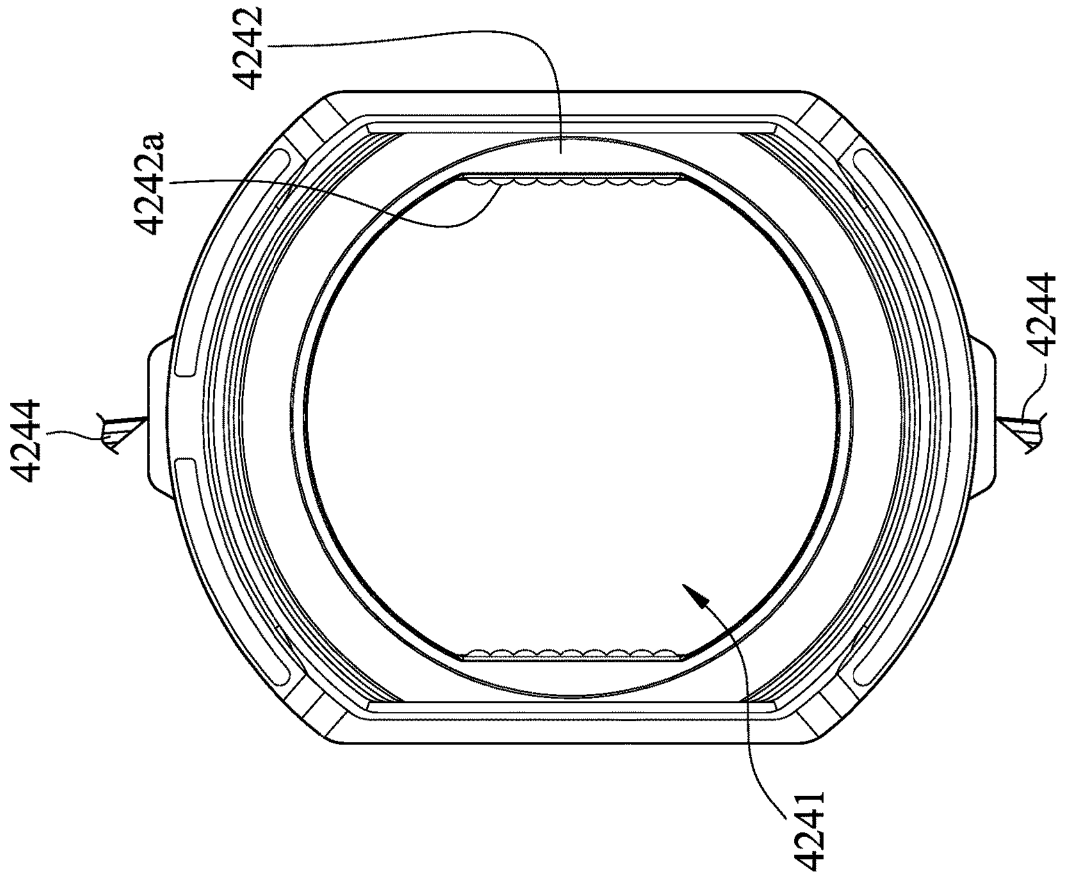
FIG. 8P is a plane view of the third radial reduction light blocking element according to the 1st example of the 4th embodiment of FIG. 8E.
Figure 8R:
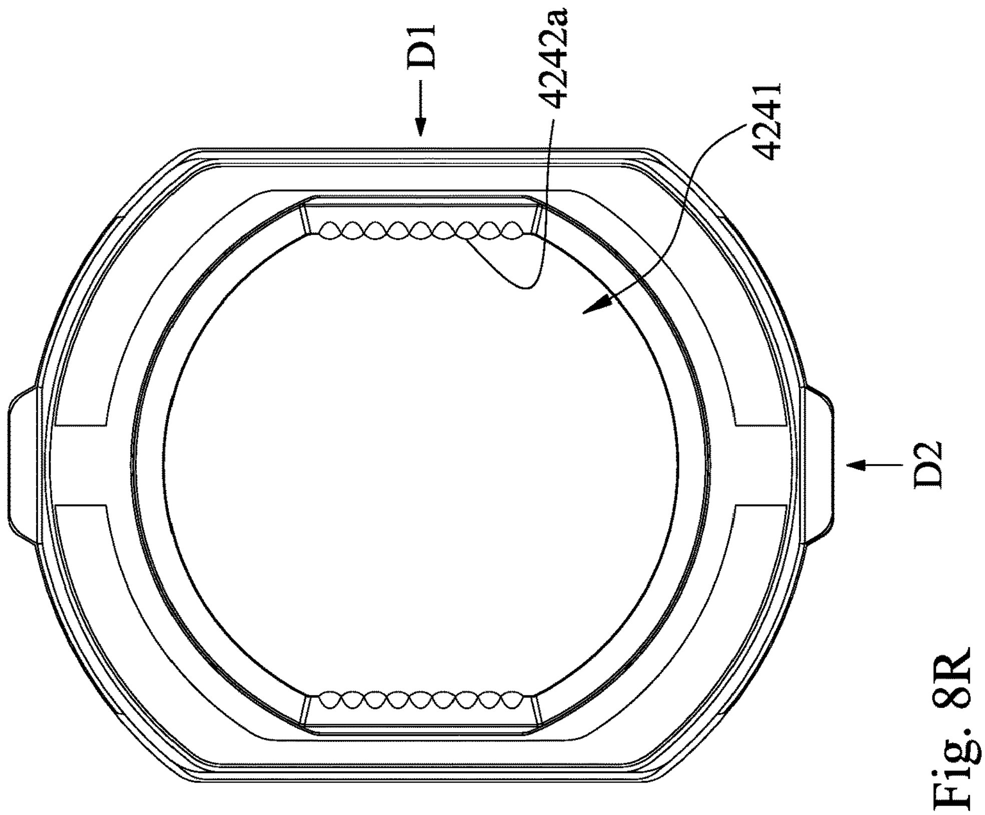
FIG. 8R is a plane view of the third radial reduction light blocking element according to the 1st example of the 4th embodiment of FIG. 8F.
Figure 8Q:
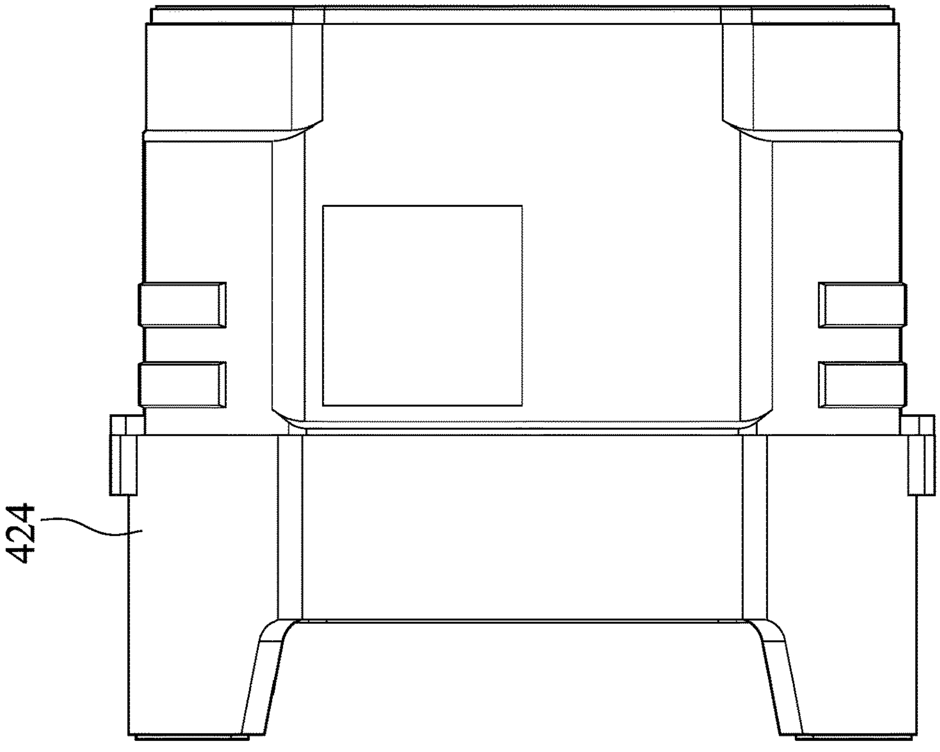
FIG. 8Q is a side view of the third radial reduction light blocking element according to the 1st example of the 4th embodiment of FIG. 8F.

Please refer to FIG. 8N, FIG. 8O, FIG. 8P, FIG. 8Q and FIG. 8R. FIG. 8N is a schematic view of a third radial reduction light blocking element 424 according to the 1st example of the 4th embodiment of FIG. 8F. FIG. 8O is a cross-sectional view of the third radial reduction light blocking element 424 according to the 1st example of the 4th embodiment of FIG. 8E. FIG. 8P is a plane view of the third radial reduction light blocking element 424 according to the 1st example of the 4th embodiment of FIG. 8E. FIG. 8Q is a side view of the third radial reduction light blocking element 424 according to the 1st example of the 4th embodiment of FIG. 8F. FIG. 8R is a plane view of the third radial reduction light blocking element 424 according to the 1st example of the 4th embodiment of FIG. 8F. In FIG. 8N to FIG. 8R, the third radial reduction light blocking element 424 is configured to load the second radial reduction lens element 411, and includes a third central opening 4241, a third radial reduction part 4242, a second receiving side wall surface 4243 and two gate traces 4244. The optical axis X passes through the third central opening 4241. The third radial reduction part 4242 reduces from a surface of the third radial reduction light blocking element 424 towards the optical axis X along the direction D2 vertical to the optical axis X, so that the third central opening 4241 is non-circular, and the third radial reduction part 4242 includes a plurality of third light blocking structures 4242*a*. The third light blocking structures 4242*a* are arranged along the direction D1 vertical to the optical axis X, and each of the third light blocking structures 4242*a* extends toward the direction close to the optical axis X.

The second receiving side wall surface 4243 is directly contacted with the second diameter contact surface 4113 of the second radial reduction lens element 411. A number of the third light blocking structures 4242*a* is Nr3, and the following condition can be satisfied: $10<Nr3<250$. In order to correspond to the auto-focusing requirement of the VCM, the imaging lens assembly 400 can be assembled by a two-piece barrel. The following conditions of the Table 9 are satisfied.

TABLE 9

| 1st example of the 4th embodiment | |
|---|---|
| Nr3 | 18 |

5th Embodiment

Figure 9A:
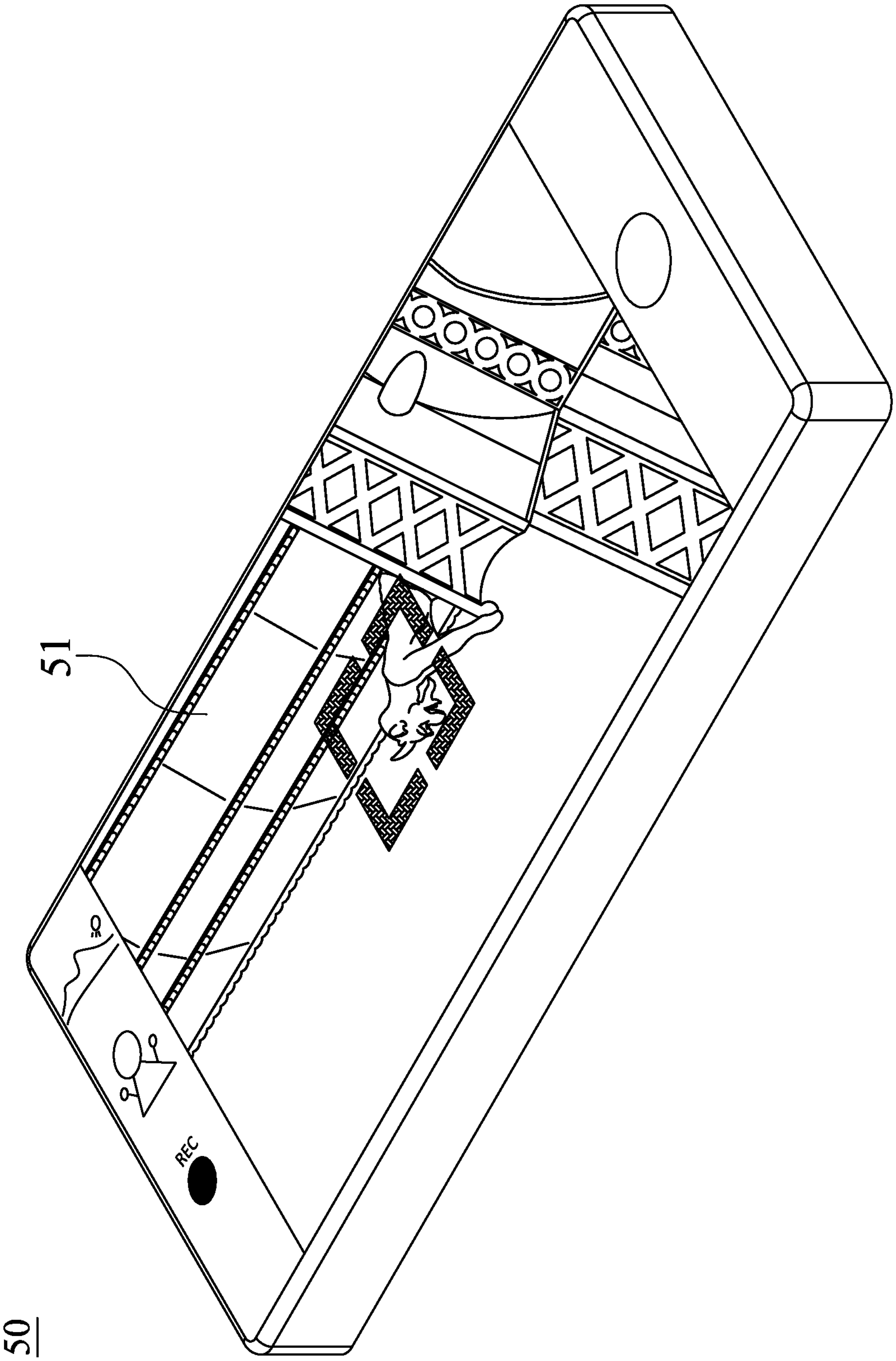
FIG. 9A is a schematic view of an electronic device according to the 5th embodiment of the present disclosure.
Figure 9B:
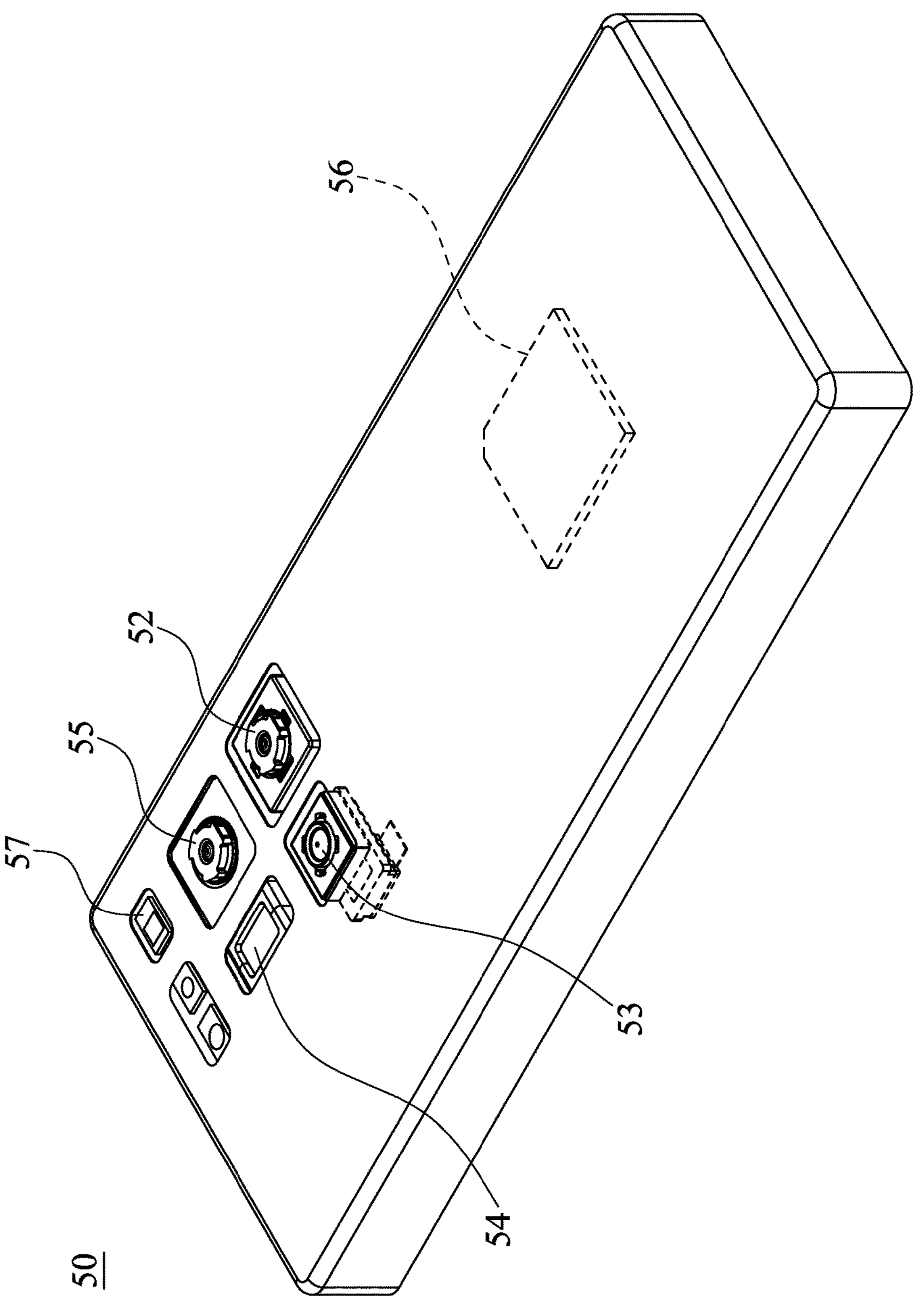
FIG. 9B is another schematic view of the electronic device according to the 5th embodiment in FIG. 9A.

Please refer to FIG. 9A and FIG. 9B. FIG. 9A is a schematic view of an electronic device 50 according to the 5th embodiment of the present disclosure. FIG. 9B is another schematic view of the electronic device 50 according to the 5th embodiment in FIG. 9A. In FIG. 9A and FIG. 9B, the electronic device 50 is a smart phone, and includes a camera module and a user interface 51. Further, the camera module can be an ultra-wide angle camera module 52, a high resolution camera module 55 and telephoto camera modules 53, 54, and the user interface 51 is a touch screen, but the present disclosure is not limited thereto. In particular, the camera module can be one of the camera modules according to the aforementioned 1st embodiment, the 2nd embodiment, the 3rd embodiment, and the 4th embodiment, but the present disclosure is not limited thereto.

Users enter a shooting mode via the user interface 51, wherein the user interface 51 is configured to display the scene, and the shooting angle can be manually adjusted to switch the ultra-wide angle camera module 52, the high resolution camera module 55 and the telephoto camera module 53, 54. At this moment, the imaging light is gathered on the image sensor (not shown) via the camera module, and an electronic signal about an image is output to an image signal processor (ISP) 56.

In FIG. 9B, to meet a specification of the electronic device 50, the electronic device 50 can further include an optical anti-shake mechanism (not shown). Furthermore, the electronic device 50 can further include at least one focusing assisting module (its reference numeral is omitted) and at least one sensing element (not shown). The focusing assisting module can be a flash module 57 for compensating a color temperature, an infrared distance measurement component, a laser focus module and so on. The sensing element can have functions for sensing physical momentum and kinetic energy, such as an accelerator, a gyroscope, a Hall Effect Element, to sense shaking or jitters applied by hands of the users or external environments. Accordingly, the camera module of the electronic device 50 is equipped with an auto-focusing mechanism and the optical anti-shake mechanism can be enhanced to achieve the superior image quality. Furthermore, the electronic device 50 according to the present disclosure can have a capturing function with multiple modes, such as taking optimized selfies, high dynamic range (HDR) under a low light condition, 4K resolution recording and so on. Furthermore, the users can visually see a captured image of the camera through the user interface 51 and manually operate the view finding range on the user interface 51 to achieve the autofocus function of what you see is what you get.

Moreover, the camera module, the optical anti-shake mechanism, the sensing element and the focusing assisting module can be disposed on a flexible printed circuit board (FPC) (not shown) and electrically connected to the associated components, such as the image signal processor 56, via a connector (not shown) to perform a capturing process. Since the current electronic devices, such as smart phones, have a tendency of being compact, the way of firstly disposing the camera module and related components on the flexible printed circuit board and secondly integrating the circuit thereof into the main board of the electronic device via the connector can satisfy the requirements of the mechanical design and the circuit layout of the limited space inside the electronic device, and obtain more margins. The autofocus function of the camera module can also be controlled more flexibly via the touch screen of the electronic device. According to the 5th embodiment, the electronic device 50 can include a plurality of sensing elements and a plurality of focusing assisting modules. The sensing elements and the focusing assisting modules are disposed on the flexible printed circuit board and at least one other flexible printed circuit board (not shown) and electrically connected to the associated components, such as the image signal processor 56, via corresponding connectors to perform the capturing process. In other embodiments (not shown herein), the sensing elements and the focusing assisting modules can also be disposed on the main board of the electronic device or carrier boards of other types according to requirements of the mechanical design and the circuit layout.

Furthermore, the electronic device 50 can further include, but not be limited to, a display, a control unit, a storage unit, a random access memory (RAM), a read-only memory (ROM), or the combination thereof.

Figure 9C:
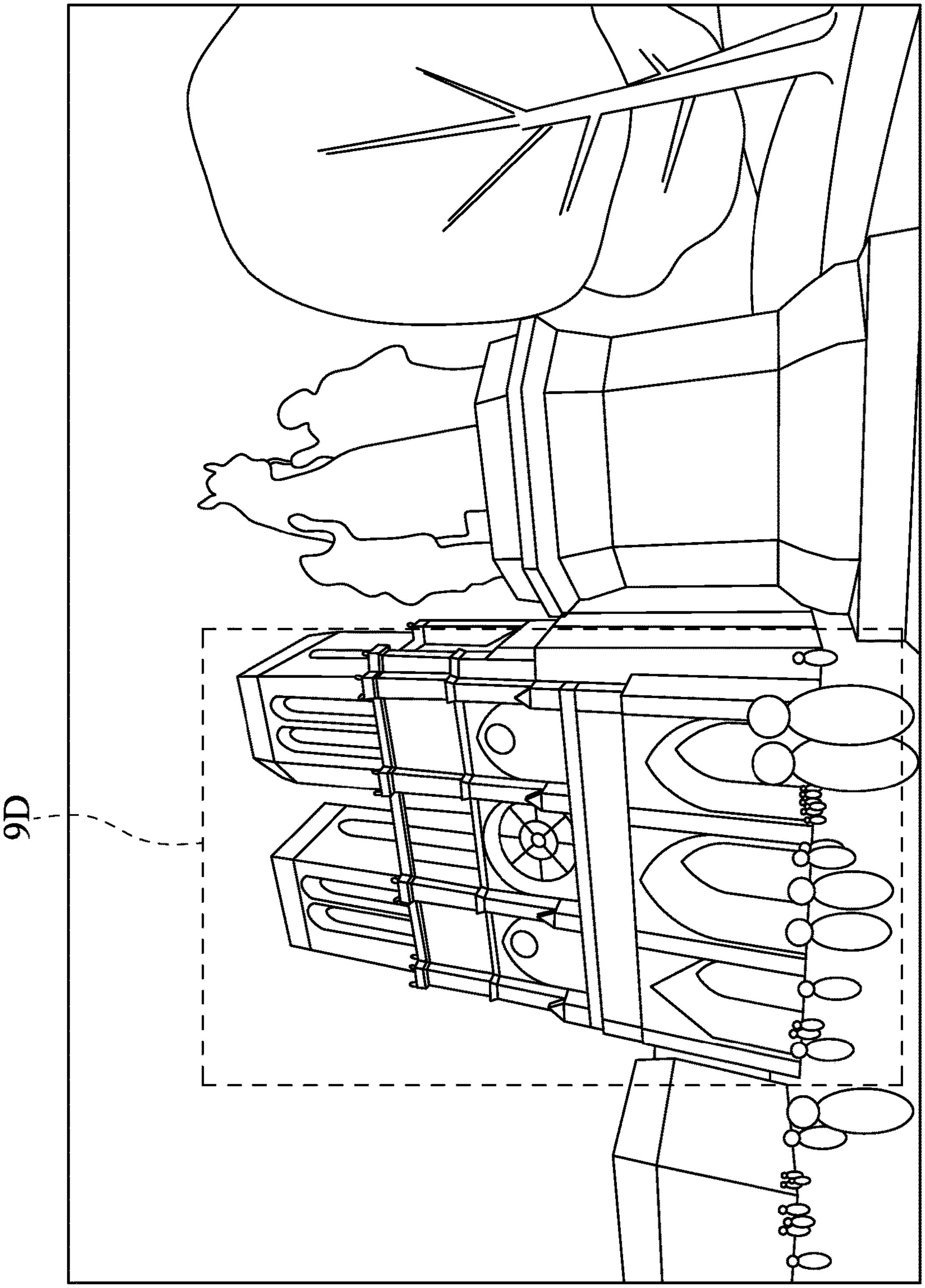
FIG. 9C is a schematic view of an image captured via the electronic device according to the 5th embodiment in FIG. 9A.

FIG. 9C is a schematic view of an image captured via the electronic device 50 according to the 5th embodiment in FIG. 9A. In FIG. 9C, the larger range of the image can be captured via the ultra-wide angle camera module 52, and the ultra-wide angle camera module 52 has the function of accommodating wider range of the scene.

Figure 9D:
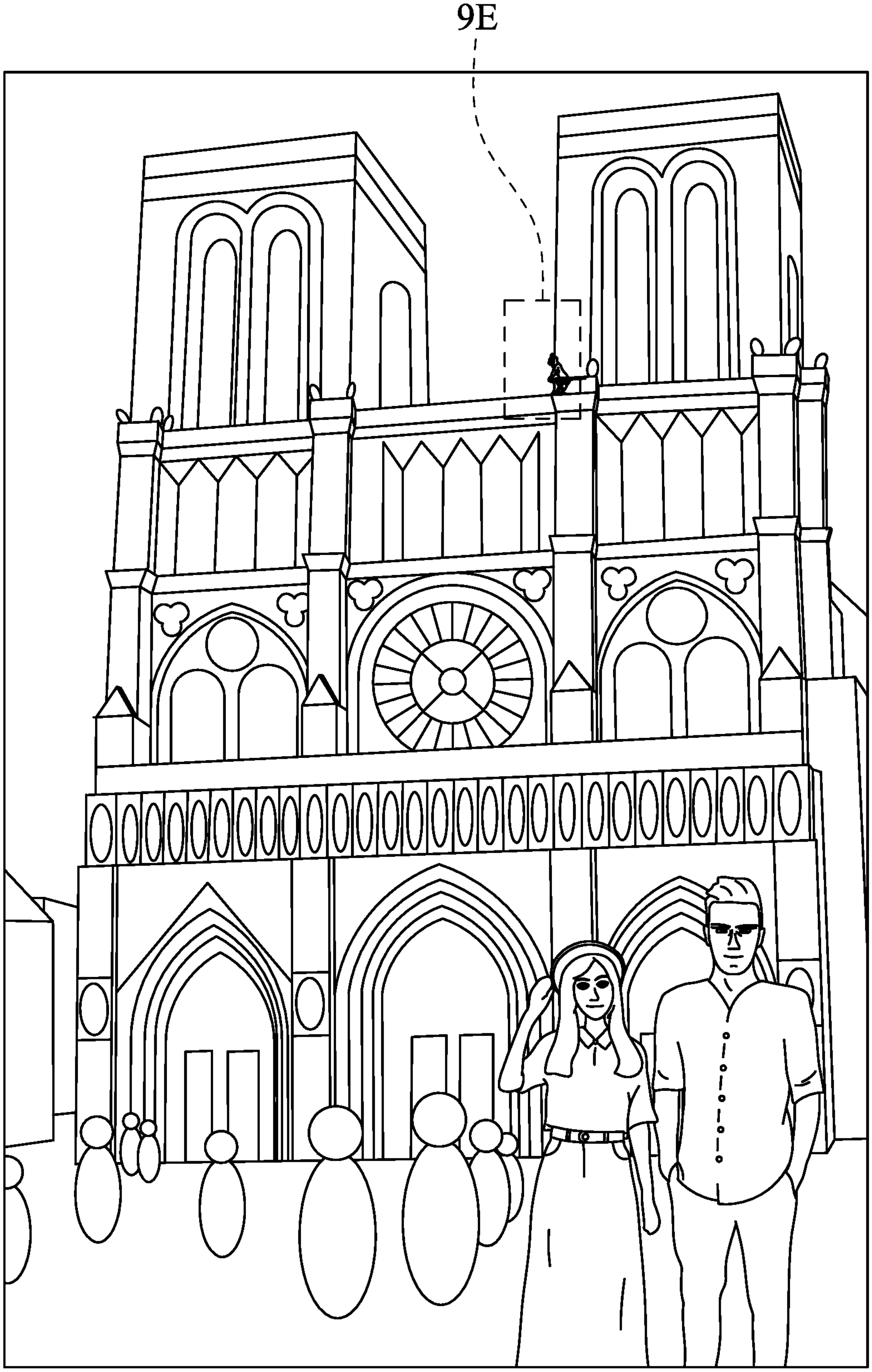
FIG. 9D is another schematic view of an image captured via the electronic device according to the 5th embodiment in FIG. 9A.

FIG. 9D is another schematic view of an image captured via the electronic device 50 according to the 5th embodiment in FIG. 9A. In FIG. 9D, the image of the certain range with the high resolution can be captured via the high resolution camera module 55, and the high resolution camera module 55 has the function of the high resolution and the low deformation.

Figure 9E:
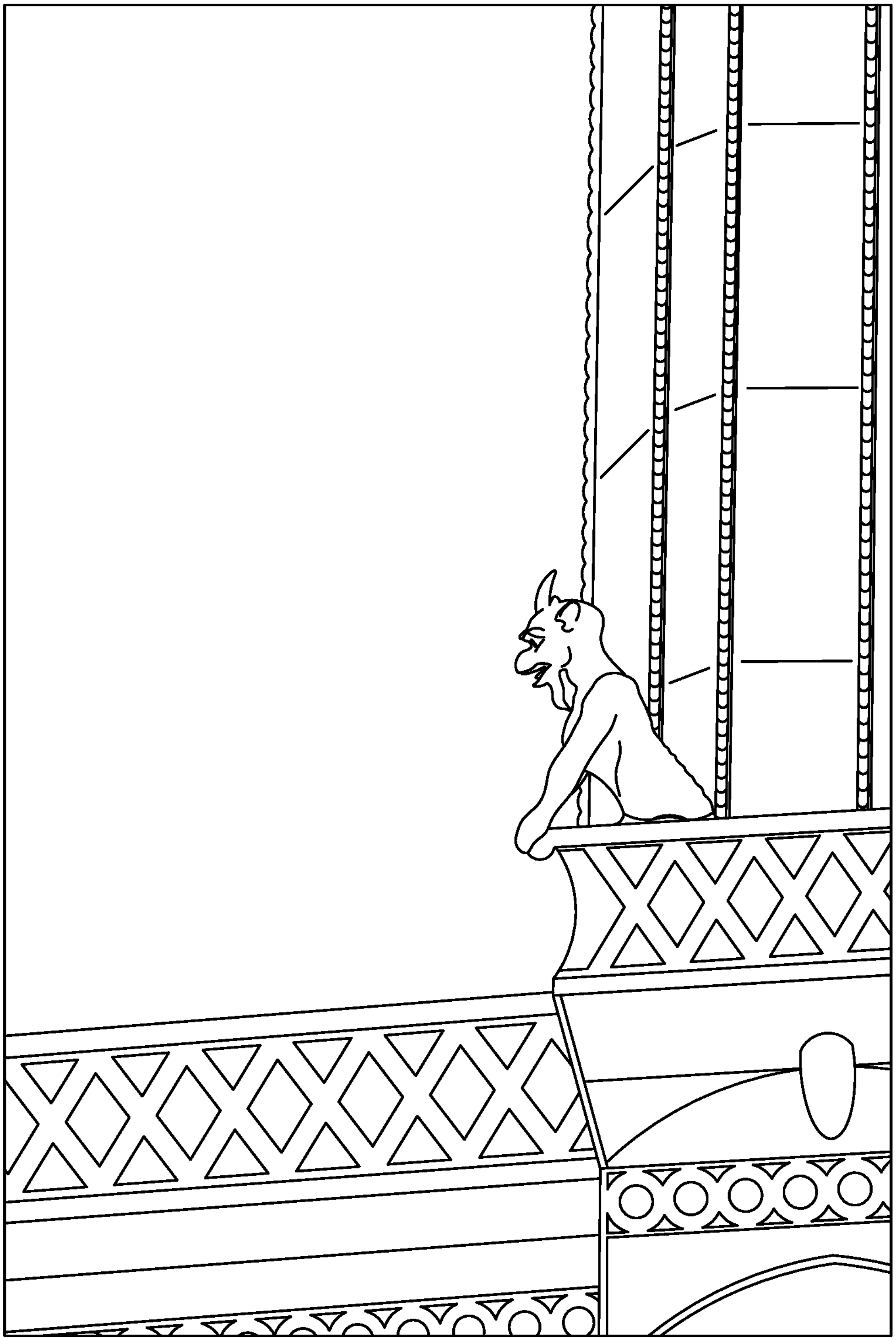
FIG. 9E is still another schematic view of an image captured via the electronic device according to the 5th embodiment in FIG. 9A.

FIG. 9E is still another schematic view of an image captured via the electronic device 50 according to the 5th embodiment in FIG. 9A. In FIG. 9E, the telephoto camera modules 53, 54 have the enlarging function of the high magnification, and the distant image can be captured and enlarged with high magnification via the telephoto camera modules 53, 54.

In FIG. 9C to FIG. 9E, the zooming function can be obtained via the electronic device 50, when the scene is captured via the camera module with different focal lengths cooperated with the function of image processing.

6th Embodiment

Figure 10:
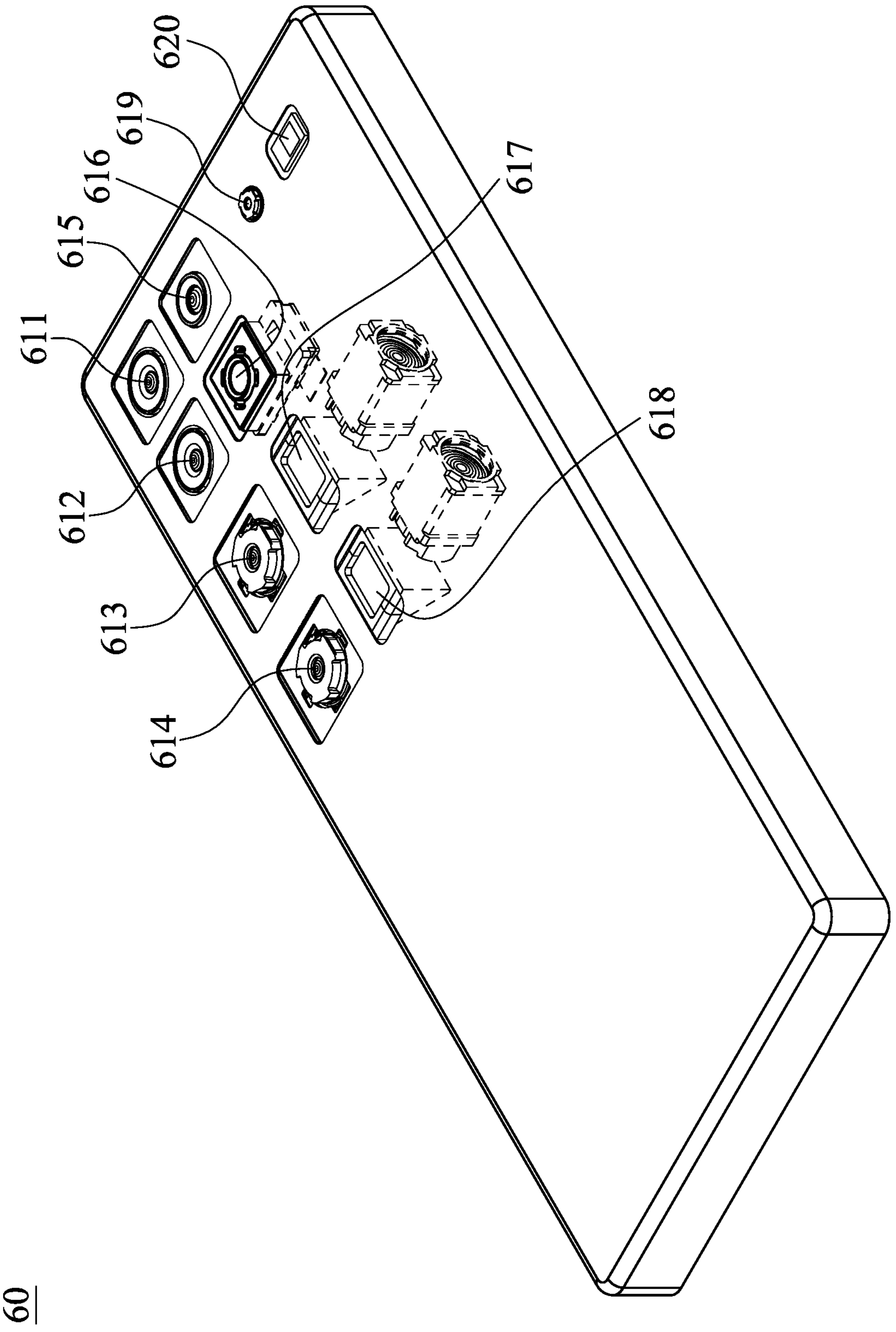
FIG. 10 is a schematic view of an electronic device according to the 6th embodiment of the present disclosure.

Please refer to FIG. 10. FIG. 10 is a schematic view of an electronic device 60 according to the 6th embodiment of the present disclosure. In FIG. 10, the electronic device 60 is a smart phone, and includes a camera module, and the camera module can be one of ultra-wide angle camera modules 611, 612, wide angle camera modules 613, 614, telephoto camera modules 615, 616, 617, 618 and a Time-Of-Flight (TOF) module 619. The TOF module 619 can be another type of the camera module, and the disposition is not limited thereto. In particular, the camera module can be one of the camera modules according to the aforementioned 1st embodiment to the 4th embodiment, but the present disclosure is not limited thereto.

Further, the telephoto camera modules 617, 618 are configured to fold the light, but the present disclosure is not limited thereto.

To meet a specification of the electronic device 60, the electronic device 60 can further include an optical anti-shake mechanism (not shown). Furthermore, the electronic device 60 can further include at least one focusing assisting module (not shown) and at least one sensing element (not shown). The focusing assisting module can be a flash module 620 for compensating a color temperature, an infrared distance measurement component, a laser focus module and so on. The sensing element can have functions for sensing physical momentum and kinetic energy, such as an accelerator, a gyroscope, a Hall Effect Element, to sense shaking or jitters applied by hands of the users or external environments. Accordingly, the camera module of the electronic device 60 is equipped with an auto-focusing mechanism and the optical anti-shake mechanism can be enhanced to achieve the superior image quality. Furthermore, the electronic device 60 according to the present disclosure can have a capturing function with multiple modes, such as taking optimized selfies, High Dynamic Range (HDR) under a low light condition, 4K resolution recording and so on.

Further, all of other structures and dispositions according to the 6th embodiment are the same as the structures and the dispositions according to the 5th embodiment, and will not be described again herein.

The foregoing description, for purpose of explanation, has been described with reference to specific embodiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens assembly, having an optical axis, and comprising:

a plurality of optical elements, wherein the optical axis passes through the optical elements, and the optical elements comprise:

a radial reduction lens element, wherein an appearance of the radial reduction lens element is non-circular observed along a direction parallel to the optical axis, and the radial reduction lens element comprises:

an optical effective portion, wherein the optical axis passes through the optical effective portion; and a peripheral portion extending from the optical effective portion towards a direction away from the optical axis, and disposed around the optical effective portion along a circumferential direction of the optical axis; and a radial reduction light blocking element, wherein an appearance of the radial reduction light blocking element is non-circular observed along the direction parallel to the optical axis, and the radial reduction light blocking element comprises:

a central opening, wherein the optical axis passes through the central opening; and a radial reduction part reducing from a surface of the radial reduction light blocking element towards the optical axis along a direction vertical to the optical axis, so that the central opening being non-circular, and the radial reduction part comprising:

a plurality of light blocking structures arranged along the direction vertical to the optical axis, and each of the light blocking structures extending toward a direction close to the optical axis;

wherein a number of the light blocking structures is Nr, and the following condition is satisfied:

$$50 < Nr < 250;$$

wherein an air gap is between the light blocking structures and one of the optical elements adjacent thereto.

2. The imaging lens assembly of claim 1, wherein a V-shaped groove is formed between each two of the light blocking structures, the V-shaped groove has an angle θ, and the following condition is satisfied:

$$0 \text{ degrees} < \theta < 90 \text{ degrees}.$$

3. The imaging lens assembly of claim 2, wherein the V-shaped groove has the angle θ, and the following condition is satisfied:

$$30 \text{ degrees} < \theta < 65 \text{ degrees}.$$

4. The imaging lens assembly of claim 1, wherein a radius structure is formed between each two of the light blocking structures, the radius structure has a radius R, and the following condition is satisfied:

$$0 \text{ mm} < R < 0.3 \text{ mm}.$$

5. The imaging lens assembly of claim 4, wherein the radius structure has the radius R, and the following condition is satisfied:

$$0 \text{ mm} < R < 0.15 \text{ mm}.$$

6. The imaging lens assembly of claim 1, wherein the radial reduction light blocking element further comprises:

a receiving portion comprising a receiving surface directly contacted with one of the optical elements adjacent thereto.

7. The imaging lens assembly of claim 6, wherein the receiving portion of the radial reduction light blocking element further comprises a plurality of auxiliary light blocking structures, and the receiving surface is farther away from the central opening than each of the auxiliary light blocking structures from the central opening.

8. The imaging lens assembly of claim 7, wherein an auxiliary V-shaped groove is formed between each two of the auxiliary light blocking structures, the auxiliary V-shaped groove has an angle θ', and the following condition is satisfied:

$$0 \text{ degrees} < \theta' < 90 \text{ degrees}.$$

9. The imaging lens assembly of claim 8, wherein the auxiliary V-shaped groove has the angle θ', and the following condition is satisfied:

$$30 \text{ degrees} < \theta' < 65 \text{ degrees}.$$

10. The imaging lens assembly of claim 1, wherein the radial reduction light blocking element is made of black plastic.

11. The imaging lens assembly of claim 1, wherein the radial reduction light blocking element is made of black plastic, and has at least one gate trace.

12. The imaging lens assembly of claim 11, wherein the radial reduction light blocking element and the light blocking structures are formed integrally.

13. A camera module, comprising:

the imaging lens assembly of claim 1; and an image sensor disposed on an image surface of the imaging lens assembly.

14. An electronic device, comprising:

the camera module of claim 13.

15. An imaging lens assembly, having an optical axis, and comprising:

a plurality of optical elements, wherein the optical axis passes through the optical elements, and the optical elements comprise:

a first radial reduction lens element, wherein an appearance of the first radial reduction lens element is non-circular observed along a direction parallel to the optical axis, and the first radial reduction lens element comprises:

a first optical effective portion, wherein the optical axis passes through the first optical effective portion; and a first peripheral portion extending from the first optical effective portion towards a direction away from the optical axis, disposed around the first optical effective portion along a circumferential direction of the optical axis, and the first peripheral portion comprising:

a first diameter contact surface disposed around the first peripheral portion;

a first radial reduction light blocking element, wherein an appearance of the first radial reduction light blocking element is non-circular observed along the direction parallel to the optical axis, and the first radial reduction light blocking element comprises:

a first central opening, wherein the optical axis passes through the first central opening; and a first radial reduction part reducing from a surface of the first radial reduction light blocking element towards the optical axis along a direction vertical to the optical axis, so that the first central opening being non-circular, and the first radial reduction part comprising:

a plurality of first light blocking structures arranged along the direction vertical to the optical axis, and each of the first light blocking structures extending toward a direction close to the optical axis; and a second radial reduction light blocking element configured to load the first radial reduction lens element, and the second radial reduction light blocking element comprising:

a second central opening, wherein the optical axis passes through the second central opening;

a second radial reduction part reducing from a surface of the second radial reduction light blocking element towards the optical axis along the direction vertical to the optical axis, so that the second central opening being non-circular, and the second radial reduction part comprising:

a plurality of second light blocking structures arranged along the direction vertical to the optical axis, and each of the second light blocking structures extending toward the direction close to the optical axis; and a first receiving side wall surface directly contacted with the first diameter contact surface of the first radial reduction lens element;

wherein a number of the first light blocking structures is Nr1, a number of the second light blocking structures is Nr2, and the following conditions are satisfied:

$$10 < Nr1 < 250; \text{ and}$$

$$10 < Nr2 < 250.$$

16. The imaging lens assembly of claim 15, wherein a radius structure is formed between each two of the first light blocking structures, the radius structure has a radius R, and the following condition is satisfied:

$$0 \text{ mm} < R < 0.3 \text{ mm}.$$

17. The imaging lens assembly of claim 16, wherein the radius structure has the radius R, and the following condition is satisfied:

$$0 \text{ mm} < R < 0.15 \text{ mm}.$$

18. The imaging lens assembly of claim 15, wherein a V-shaped groove is formed between each two of the second light blocking structures, the V-shaped groove has an angle θ, and the following condition is satisfied:

$$0 \text{ degrees} < \theta < 90 \text{ degrees}.$$

19. The imaging lens assembly of claim 18, wherein the V-shaped groove has the angle θ, and the following condition is satisfied:

$$30 \text{ degrees} < \theta < 65 \text{ degrees}.$$

20. The imaging lens assembly of claim 15, wherein the second radial reduction light blocking element loads the first radial reduction lens element and the first radial reduction light blocking element at the same time.

21. The imaging lens assembly of claim 15, wherein the number of the first light blocking structures is Nr1, and the following condition is satisfied:

$$50 < Nr1 < 250.$$

22. The imaging lens assembly of claim 15, wherein the number of the second light blocking structures is Nr2, and the following condition is satisfied:

$$50 < Nr2 < 250.$$

23. The imaging lens assembly of claim 15, wherein the optical elements further comprise:

a second radial reduction lens element, wherein an appearance of the second radial reduction lens element is non-circular observed along the direction parallel to the optical axis, and the second radial reduction lens element comprises:

a second optical effective portion, wherein the optical axis passes through the second optical effective portion; and a second peripheral portion extending from the second optical effective portion towards a direction away from the optical axis, disposed around the second optical effective portion along the circumferential direction of the optical axis, and the second peripheral portion comprising:

a second diameter contact surface disposed around the second peripheral portion; and a third radial reduction light blocking element configured to load the second radial reduction lens element, and comprising:

a third central opening, wherein the optical axis passes through the third central opening;

a third radial reduction part reducing from a surface of the third radial reduction light blocking element towards the optical axis along the direction vertical to the optical axis, so that the third central opening being non-circular, and the third radial reduction part comprising:

a plurality of third light blocking structures arranged along the direction vertical to the optical axis, and each of the third light blocking structures extending toward the direction close to the optical axis; and a second receiving side wall surface directly contacted with the second diameter contact surface of the second radial reduction lens element;

wherein a number of the third light blocking structures is Nr3, and the following condition is satisfied:

$$10 < Nr3 < 250.$$

24. The imaging lens assembly of claim 15, wherein the first radial reduction light blocking element is made of black plastic.

25. The imaging lens assembly of claim 15, wherein the second radial reduction light blocking element is made of black plastic, and has at least one gate trace.

* * * * *